(12) United States Patent
Kamiya et al.

(10) Patent No.: US 11,427,939 B2
(45) Date of Patent: Aug. 30, 2022

(54) FRP TUBULAR BODY AND METHOD FOR MANUFACTURING FRP TUBULAR BODY

(71) Applicant: KABUSHIKI KAISHA TOYOTA JIDOSHOKKI, Kariya (JP)

(72) Inventors: Ryuta Kamiya, Kariya (JP); Hayato Fukui, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 48 days.

(21) Appl. No.: 17/261,338

(22) PCT Filed: Jul. 17, 2019

(86) PCT No.: PCT/JP2019/028000
§ 371 (c)(1),
(2) Date: Jan. 19, 2021

(87) PCT Pub. No.: WO2020/026795
PCT Pub. Date: Feb. 6, 2020

(65) Prior Publication Data
US 2021/0262616 A1    Aug. 26, 2021

(30) Foreign Application Priority Data
Jul. 30, 2018  (JP) .............................. JP2018-142413

(51) Int. Cl.
*D03D 15/43* (2021.01)
*F17C 1/06* (2006.01)

(52) U.S. Cl.
CPC ............... *D03D 15/43* (2021.01); *F17C 1/06* (2013.01); *F17C 2201/0109* (2013.01);
(Continued)

(58) Field of Classification Search
CPC ... D03D 15/43; F17C 1/06; F17C 2201/0109; F17C 2203/0604; F17C 2203/0665;
(Continued)

(56) References Cited

U.S. PATENT DOCUMENTS

2019/0283363 A1*  9/2019  Shimono ................... B32B 7/03

FOREIGN PATENT DOCUMENTS

| JP | H11115064 A | * | 4/1999 |
| JP | 2002-128921 A | | 5/2002 |
| JP | 2002128921 A | * | 5/2002 |

OTHER PUBLICATIONS

Such, M., Ward, C., and Potter, K., Aligned Discontinuous Fibre Composites: A Short History, 2014, Journal of Multifunctional Composites, pp. 155-168 (Year: 2014).*
(Continued)

*Primary Examiner* — Valentin Neacsu
*Assistant Examiner* — Laura E. Parker
(74) *Attorney, Agent, or Firm* — Sughrue Mion, PLLC

(57) ABSTRACT

A FRP tubular body includes a tubular fiber structure formed by winding a reinforced fiber sheet made of fabric. The reinforced fiber sheet includes first reinforced fiber bundles arranged such that a yarn main axis direction extends in a circumferential direction of the fiber structure and second reinforced fiber bundles arranged such that a yarn main axis direction extends in an axial direction of the fiber structure. The reinforced fiber sheet includes a starting end, a finishing end, and a general portion located between the starting end and the finishing end. The general portion includes the first reinforced fiber bundles and the second reinforced fiber bundles. At least one of the starting end or the finishing end is a decreased portion that is smaller than the general portion in an amount of reinforced fibers per unit length in the circumferential direction of the fiber structure.

16 Claims, 22 Drawing Sheets

(52) U.S. Cl.
CPC ........... *F17C 2203/0604* (2013.01); *F17C 2203/0665* (2013.01); *F17C 2203/0668* (2013.01); *F17C 2203/0673* (2013.01); *F17C 2209/2154* (2013.01)

(58) Field of Classification Search
CPC ...... F17C 2203/0668; F17C 2203/0673; F17C 2209/2154; B29C 70/085; B29C 70/326
USPC ........................................................ 220/589
See application file for complete search history.

(56) References Cited

OTHER PUBLICATIONS

International Search Report of PCT/JP2019/028000 dated Oct. 15, 2019 [PCT/ISA/210].

* cited by examiner

FRP TUBULAR BODY AND METHOD FOR MANUFACTURING FRP TUBULAR BODY

CROSS REFERENCE TO RELATED APPLICATIONS

This application is a National Stage of International Application No. PCT/JP2019/028000, filed Jul. 17, 2019, claiming priority to Japanese Patent Application No. 2018-142413, filed Jul. 30, 2018.

TECHNICAL FIELD

The present disclosure relates to a FRP tubular body and a method for manufacturing a FRP tubular body.

BACKGROUND ART

Fiber-reinforced plastic (FRP) tubular bodies with carbon fibers or the like used as reinforcement fibers and synthetic resin used as matrix resin are widely used including sporting goods and automobile goods. FRP tubular bodies are manufactured through sheet winding molding in addition to filament winding molding. In sheet winding molding, a reinforced fiber sheet is wound a number of times with one end of the reinforced fiber sheet used as a starting end where winding is started and the other end of the reinforced fiber sheet used as a finishing end where winding is finished. In a fiber structure formed by winding the reinforced fiber sheet, steps are produced in a surface of the fiber structure due to the thicknesses of the starting end and the finishing end. To solve this problem, in a FRP tubular body described in Patent Document 1, a method for facing step prevention pre-pregs with the starting end and the finishing end is employed when the fiber structure is manufactured.

PRIOR ART DOCUMENTS

Patent Documents
  Patent Document 1: Japanese Laid-Open Patent Publication No. 2002-128921

SUMMARY OF THE INVENTION

Problems that the Invention is to Solve

However, the method disclosed in Patent Document 1 employs the step prevention pre-pregs, which are separate from the reinforced fiber sheet that forms components other than the starting end and the finishing end, in order to reduce the steps that occur due to the thicknesses of the starting end and the finishing end. Thus, the reinforced fiber sheet forming the components other than the starting end and the finishing end is prevented from being continuous with the step prevention pre-pregs and reinforced fibers. This may reduce the strength of the FRP tubular body in its circumferential direction (i.e., the direction in which the reinforced fibers are wound).

It is an object of the present disclosure to provide a FRP tubular body and a method for manufacturing a FRP tubular body that reduce steps produced in a surface of the FRP tubular body without a decrease in the strength in a circumferential direction.

Means for Solving the Problem

A FRP tubular body according to an aspect of the present disclosure includes a tubular fiber structure formed by winding a reinforced fiber sheet made of fabric, the fiber structure being combined with matrix resin. The reinforced fiber sheet includes first reinforced fiber bundles arranged such that a yarn main axis direction of the first reinforced fiber bundles extends in a circumferential direction of the fiber structure and second reinforced fiber bundles arranged such that a yarn main axis direction of the second reinforced fiber bundles extends in an axial direction of the fiber structure. The reinforced fiber sheet includes a starting end where winding is started in the circumferential direction of the fiber structure, the starting end extending in the axial direction of the fiber structure, a finishing end where winding is finished in the circumferential direction of the fiber structure, the finishing end extending in the axial direction of the fiber structure, and a general portion located between the starting end and the finishing end and connected to the starting end and the finishing end by the reinforced fibers. The general portion includes the first reinforced fiber bundles and the second reinforced fiber bundles, and at least one of the starting end or the finishing end is a decreased portion that is smaller than the general portion in an amount of the reinforced fibers per unit length in the circumferential direction of the fiber structure.

Further, a method for manufacturing a FRP tubular body according to an aspect of the present disclosure is provided. The FRP tubular body includes a fiber structure having a tubular wound member and a reinforced fiber sheet that covers an outer side of the wound member, the reinforced fiber sheet being made of fabric. The fiber structure includes first reinforced fiber bundles and second reinforced fiber bundles, the first reinforced fiber bundles being bundles of reinforced fibers arranged on the wound member such that a yarn main axis direction of the first reinforced fiber bundles extends in a circumferential direction of the wound member, the second reinforced fiber bundles being bundles of reinforced fibers and forming the fabric together with the first reinforced fiber bundles. The method includes stretching the first reinforced fiber bundles in a state of being arranged in an axial direction of the wound member, inserting the second reinforced fiber bundles in the axial direction of the wound member into sheds created between adjacent ones of the first reinforced fiber bundles in the axial direction of the wound member, pushing the second reinforced fiber bundles toward the wound member through a beat-up motion to weave the fabric of the first reinforced fiber bundles and the second reinforced fiber bundles, and rotating the wound member about a central axis of the wound member to wind the woven fabric onto the wound member. The reinforced fiber sheet includes a starting end where winding onto the wound member is started in the circumferential direction of the wound member, the starting end extending in the axial direction of the wound member, a finishing end where winding onto the wound member is finished in the circumferential direction of the wound member, the finishing end extending in the axial direction of the wound member, and a general portion located between the starting end and the finishing end and connected to the starting end and the finishing end by the reinforced fibers. The method includes weaving the general portion using, as warp yarns, the first reinforced fiber bundles arranged on the wound member such that the yarn main axis direction of the first reinforced fiber bundles extends in the circumferential direction of the wound member and using, as weft yarns, the second reinforced fiber bundles arranged on the wound member such that a yarn main axis direction of the second reinforced fiber bundles extends in the axial direction of the wound member, and weaving at least one of the starting end or the finishing end as a decreased portion that is smaller than the general portion in an amount of the reinforced fibers per unit length in the circumferential direction of the wound member.

Furthermore, a method for manufacturing a FRP tubular body according to another aspect of the present disclosure is provided. The FRP tubular body includes a fiber structure having a tubular wound member and a reinforced fiber sheet that covers an outer side of the wound member, the reinforced fiber sheet being made of fabric. The fiber structure includes first reinforced fiber bundles and second reinforced fiber bundles, the first reinforced fiber bundles being bundles of reinforced fibers arranged on the wound member such that a yarn main axis direction of the first reinforced fiber bundles extends in a circumferential direction of the wound member, the second reinforced fiber bundles being bundles of reinforced fibers and forming the fabric together with the first reinforced fiber bundles. The reinforced fiber sheet made of the woven fabric includes a starting end where winding onto the wound member is started in the circumferential direction of the wound member, the starting end extending in the axial direction of the wound member, a finishing end where winding onto the wound member is finished in the circumferential direction of the wound member, the finishing end extending in the axial direction of the wound member, and a general portion located between the starting end and the finishing end and connected to the starting end and the finishing end by the reinforced fibers. The method includes using blended yarns of reinforced fibers and thermoplastic fibers for at least one of the first reinforced fiber bundles or the second reinforced fiber bundles, heating at least one of the starting end or the finishing end to melt the thermoplastic fibers so that the at least one of the starting end or the finishing end becomes a decreased portion that is smaller than the general portion in an amount of the reinforced fibers per unit length in the circumferential direction of the fiber structure, and pressurizing the at least one of the starting end or the finishing end to become smaller in thickness than the general portion.

In each of the above-described structures, the thickness of the decreased portion, which is at least one of the starting end and the finishing end, is smaller than the thickness of the general portion in the reinforced fiber sheet. Further, in the circumferential direction of the fiber structure, the reinforced fiber sheet increases in thickness from the ends such as the starting end and the finishing end to the general portion. Thus, in the circumferential direction of the fiber structure, as compared with when the thickness is fixed from these ends to the general portion, the steps in the fiber layers of the reinforced fiber sheet are reduced. This reduces the steps produced in the surface of such a FRP tubular body. In order to reduce the steps, the thickness is reduced by setting the decreased portion, which is at least one of the starting end and the finishing end, to be smaller than the general portion in the amount of reinforced fibers. Thus, a reinforced fiber sheet with a reduced thickness does not need to be attached to reduce the steps. Even if the steps are reduced, the continuity of the reinforced fibers in the circumferential direction is maintained. This prevents a decrease in the strength of the fiber structure in the circumferential direction. Additionally, in each of the above-described structures, the thickness can be adjusted by weaving the reinforced fiber sheet. Thus, a thickness-adjusting step does not need to be added to the steps for manufacturing the fiber structure. This limits an increase in the manufacturing steps.

In the FRP tubular body, the reinforced fiber sheet may further include first auxiliary yarns arranged so as to be adjacent to the first reinforced fiber bundles in the axial direction of the fiber structure and second auxiliary yarns arranged so as to be adjacent to the second reinforced fiber bundles in the circumferential direction of the fiber structure. The general portion may further include the first auxiliary yarns and the second auxiliary yarns in addition to the first reinforced fiber bundles and the second reinforced fiber bundles. At least one of the starting end or the finishing end may be smaller than the general portion in a total number of the first reinforced fiber bundles, the first auxiliary yarns, the second reinforced fiber bundles, and the second auxiliary yarns per unit length in the circumferential direction of the fiber structure.

In the above-described structure, even if the fiber structure includes the first reinforced fiber bundles, the first auxiliary yarns, the second reinforced fiber bundles, and the second auxiliary yarns, the thickness of the decreased portion can be set to be smaller than the thickness of the general portion by reducing the total number of the bundles and yarns and reducing the amount of reinforced fibers.

In the FRP tubular body, the decreased portion can include the second reinforced fiber bundles and the first auxiliary yarns.

In the above-described structure, the first reinforced fiber bundles and the second auxiliary yarns are not arranged in the decreased portion. Thus, the decreased portion is smaller than the general portion in the amount of reinforced fibers and the number of auxiliary yarns per unit length in the circumferential direction of the fiber structure. Such decrease in the amount of reinforced fibers and the number of auxiliary yarns allows the thickness of decreased portion to be smaller than the thickness of the general portion.

In the FRP tubular body, an arrangement pitch size of adjacent ones of the second reinforced fiber bundles in the decreased portion may be greater than or equal to an arrangement pitch size of the second reinforced fiber bundle and the second auxiliary yarn adjacent to each other in the general portion. The arrangement pitch size of the adjacent ones of the second reinforced fiber bundles in the decreased portion may decrease as the general portion becomes closer in the circumferential direction of the fiber structure.

Generally, when the arrangement pitch size of woven yarns is small, the pressing of adjacent yarns with each other causes the arranged yarns to have a narrow shape and have a relatively large thickness. When the arrangement pitch size of woven yarns is large, adjacent yarns are pressed with each other to a small extent. This causes the arranged yarns to have a wide shape and have a relatively small thickness.

In the above-described structure, as the extremity of the decreased portion in the circumferential direction of the fiber structure becomes closer to the general portion, the arrangement pitch size of adjacent ones of the second reinforced fiber bundles becomes smaller and thus the decreased portion becomes thicker. This causes the thickness to gradually decrease from the decreased portion to the general portion in the circumferential direction of the fiber structure. Thus, the steps produced in the surface of the FRP tubular body are further reduced.

In the FRP tubular body, the decreased portion can include the second reinforced fiber bundles, the first auxiliary yarns, and the second auxiliary yarns.

In the above-described structure, the first reinforced fiber bundles are not arranged in the decreased portion. Thus, the decreased portion is smaller than the general portion in the amount of reinforced fibers per unit length in the circumferential direction of the fiber structure. Such decrease in the amount of reinforced fibers allows the thickness of the decreased portion to be smaller than the decreased portion.

In the FRP tubular body, the decreased portion can include the first reinforced fiber bundles and the second auxiliary yarns.

In the above-described structure, the second reinforced fiber bundles and the second auxiliary yarns are not arranged in the decreased portion. Thus, the decreased portion is smaller than the general portion in the amount of reinforced fibers and the number of auxiliary yarns per unit length in the circumferential direction of the fiber structure. Such decrease in and the number of yarns allows the thickness of the decreased portion to be smaller than the general portion.

In the FRP tubular body, the decreased portion may include a first decreased portion and a second decreased portion, the first decreased portion being located closer to an extremity of the decreased portion in the circumferential direction of the fiber structure, the second decreased portion being located closer to the general portion in the circumferential direction of the fiber structure. The second decreased portion may be larger than the first decreased portion in the number of the first reinforced fiber bundles per unit length in the circumferential direction of the fiber structure.

In the above-described structure, the thickness in the circumferential direction of the fiber structure gradually increases in the order of the first decreased portion, the second decreased portion, and the general portion. Thus, as compared with when the first decreased portion and the second decreased portion are set as a decreased portion having a fixed thickness, the steps produced in the surface of the FRP tubular body are reduced.

In the FRP tubular body, the decreased portion can include the first reinforced fiber bundles, the first auxiliary yarns, and the second auxiliary yarns.

In the above-described structure, the second reinforced fiber bundles are not arranged in the decreased portion. Thus, the decreased portion is smaller than the general portion in the amount of reinforced fibers per unit length in the circumferential direction of the fiber structure. Such decrease in the amount of reinforced fibers allows the thickness of the decreased portion to be smaller than the decreased portion.

The method for manufacturing the FRP tubular body may further include impregnating, with matrix resin, the fabric wound onto the wound member to combine the fiber structure and the matrix resin.

In the fiber structure, gaps are defined by the starting end, the outer circumferential surface of the wound member, and the part of the general portion overlapping the starting end as an upper layer of the starting end. When the reinforced fiber sheet is wound onto the wound member and then impregnated with the matrix resin, the gaps are filled with the matrix resin. In order to reduce the amount of the matrix resin used, it is desired that the gaps be smaller. In the above-described structure, the thickness of the reinforced fiber sheet is different the starting end and the general portion. Thus, as compared with when the thickness is hypothetically fixed from the starting end to the general portion, the volumes of the gaps are smaller. Accordingly, the decrease in the amount of the matrix resin filling the gaps reduces the amount of the matrix resin used.

In the FRP tubular body, in the fiber structure, the reinforced fiber sheet may be wound onto an outer circumferential surface of a liner, having a cylindrical body, in a circumferential direction of the liner and an outer side of the liner is covered by the reinforced fiber sheet. The FRP tubular body may be a pressure vessel.

In the FRP tubular body, the decreased portion may be shaped using blended yarns of reinforced fibers and thermoplastic fibers for at least one of the first reinforced fiber bundles or the second reinforced fiber bundles. The decreased portion may include cured resin around which the thermoplastic fibers have been melted and cured.

In the above-described structure, heating blended yarns and pressurizing the blended yarns with thermoplastic fibers molten causes the thermoplastic fibers to become cured resin. Thus, the decreased portion includes no thermoplastic fibers and only includes reinforced fibers. As a result, the decreased portion is smaller than the general portion in the amount of reinforced fibers per unit length in the circumferential direction of the fiber structure. Such decrease in the amount of reinforced fibers allows the thickness of the decreased portion to be smaller than the decreased portion.

In the method for manufacturing the FRP tubular body the wound member may be a liner including a cylindrical body. The FRP tubular body may be a pressure vessel.

Examples of the FRP tubular body include a pressure vessel that contains gas such as compressed natural gas (CNG) and liquefied natural gas (LNG), namely, a high-pressure tank. The pressure vessel generally includes a cylindrical body and a liner (inner shell) having gas barrier properties. The outer side of the liner is covered with a fiber-reinforced composite material layer resistant to pressure. While the pressure vessel is filled with gas so as to have a pressure of several tens of MPa, the liner is reinforced by the fiber-reinforced composite material layer. In such a pressure vessel, if the outer side of the liner is covered by a reinforced fiber sheet, steps occurring due to the thicknesses of the starting end and the finishing end of the reinforced fiber sheet may be produced in the surface in the same manner. When such gaps are large, the stress resulting from the inner pressure of the pressure vessel may concentrate in the parts where the gaps are formed with the pressure vessel filled with gas. The concentration of stress may reduce the pressure resistance of the pressure vessel. The above-described structure reduces the gaps in the fiber layers of the reinforced fiber sheet in such a pressure vessel, and thus limits the concentration of stress and limits a decrease in the pressure resistance.

MODES FOR CARRYING OUT THE INVENTION

First Embodiment

The first embodiment of a FRP tubular body and a method for manufacturing a FRP tubular body applied to a pressure vessel and a method for manufacturing a pressure vessel will now be described with reference to FIGS. 1 to 11.

Figure 1:
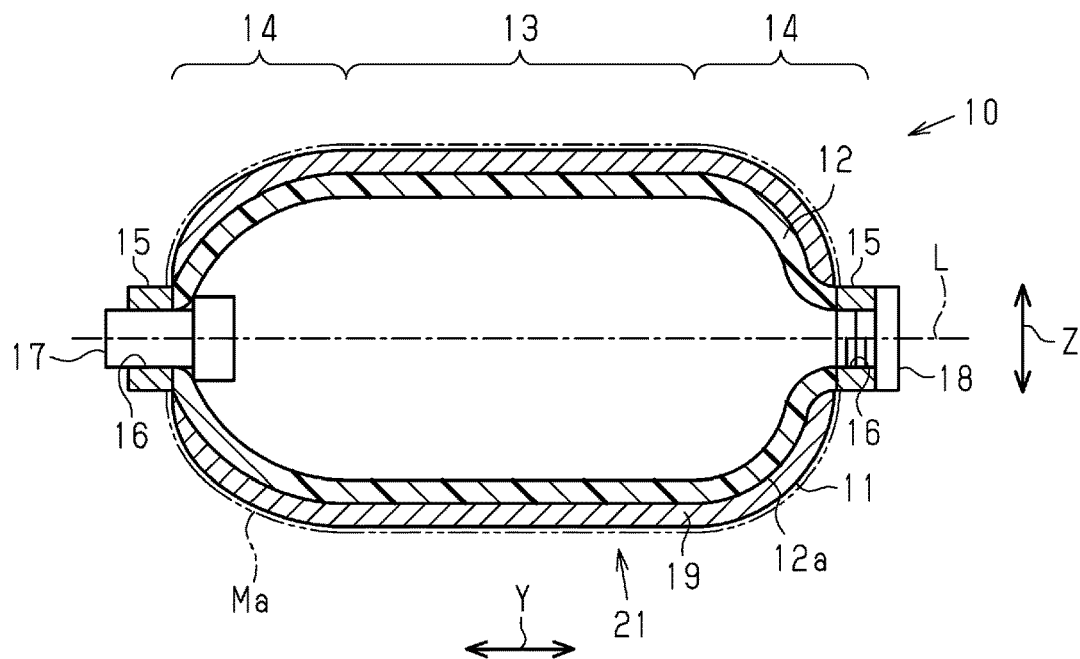
FIG. 1 is a cross-sectional view schematically showing a high-pressure tank according to a first embodiment.

As shown in FIG. 1, a high-pressure tank 10, which serves as a pressure vessel, is formed by impregnating a fiber structure 21 with matrix resin Ma. The fiber structure 21 includes an elongated hollow liner 12 and a reinforced fiber sheet 19, which covers the outer side of the liner 12. In the high-pressure tank 10, a fiber-reinforced composite material layer 11, which includes the reinforced fiber sheet 19 impregnated with the matrix resin Ma, reinforces the liner 12 to ensure the heat resistance (mechanical strength) of the high-pressure tank 10. The high-pressure tank 10 is mounted on an automobile using a fuel cell as a power source, and contains hydrogen gas serving as fuel of the fuel cell.

The liner 12 is made of plastic and includes a cylindrical body 13. The direction in which the central axis L of the liner 12 is referred to as an axial direction Y. The central axis of the body 13 coincides with the central axis L of the liner 12. The central axis of the fiber structure 21 coincides with the central axis L of the liner 12. Thus, the axial direction of the fiber structure 21 is the same as the axial direction Y of the liner 12. Further, the circumferential direction of the fiber structure 21 is the same as a circumferential direction Z of the liner 12. The liner 12 includes dorm portions 14 at the opposite ends of the body 13 in the axial direction. The axial direction of the dorm portions 14 coincides with the axial direction Y of the liner 12. The liner 12 includes spinnerets 15, which respectively protrude outward in the axial direction from the dorm portions 14. Each spinneret 15 is made of metal (for example, stainless steel). Each spinneret 15 includes a hole 16, which connects to the space in the liner 12. A valve 17 is attached to the hole 16 of the spinneret 15 at one end of the liner 12 in the axial direction Y. A screw 18 is fastened to the hole 16 of the spinneret 15 at the other end of the liner 12 in the axial direction Y.

Figure 2:
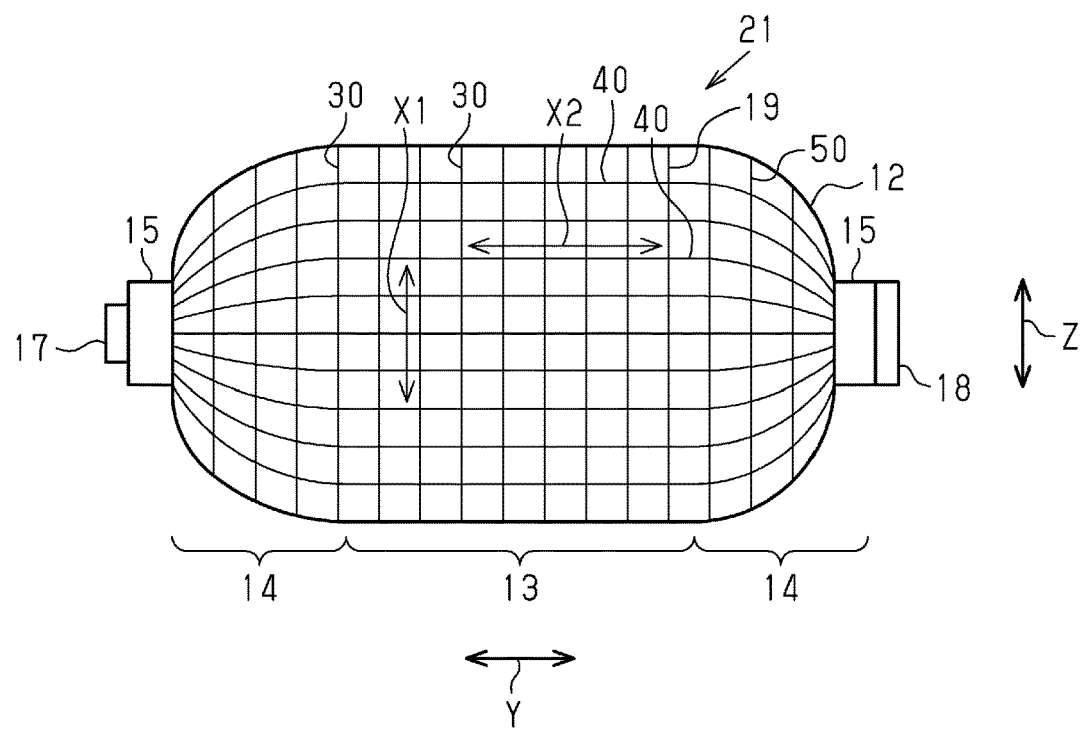
FIG. 2 is a diagram schematically showing the fiber construct according to the first embodiment.
Figure 3:
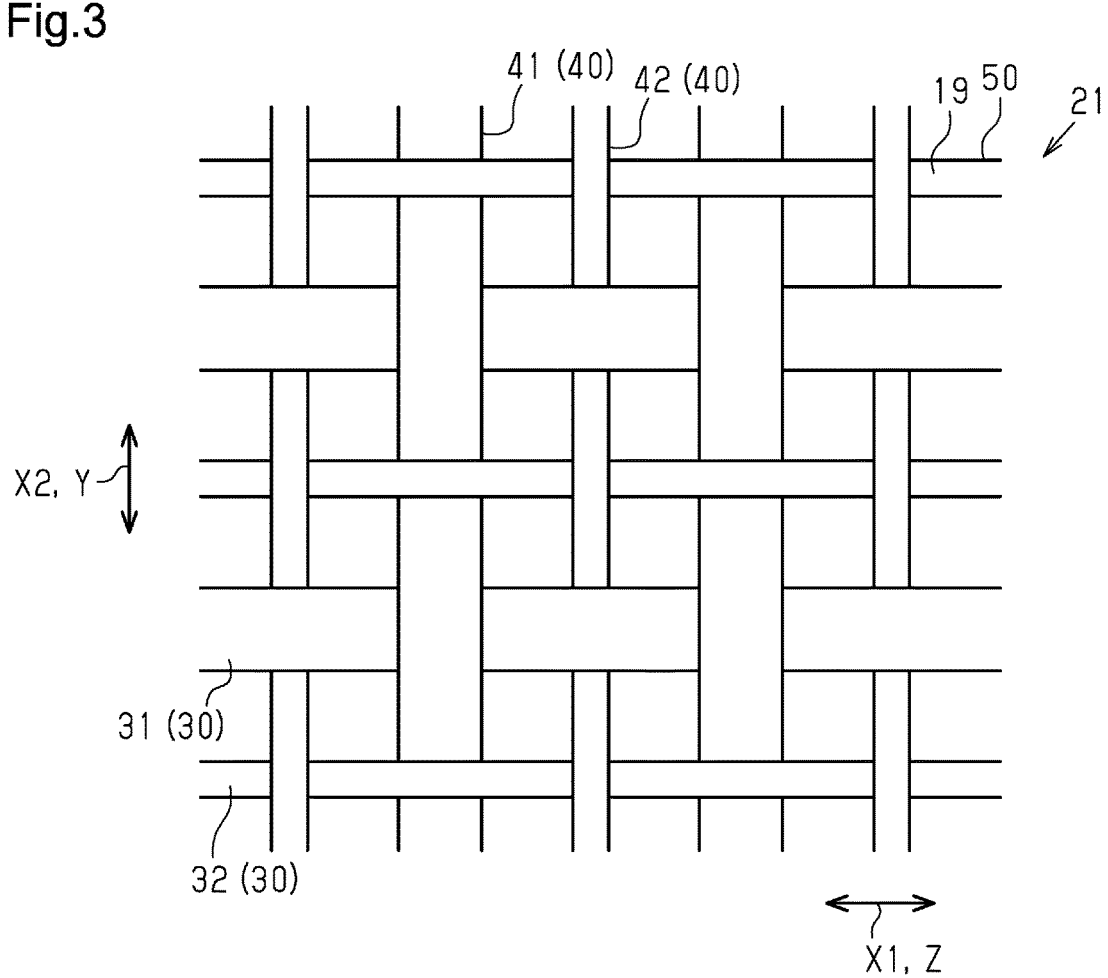
FIG. 3 is an enlarged view showing the reinforced fiber sheet according to the first embodiment.

As shown in FIGS. 2 and 3, the reinforced fiber sheet 19 is a fabric 50, which is plainly woven by weaving warp yarns 30 and weft yarns 40. The warp yarns 30 and the weft yarns 40 are arranged to be orthogonal to each other. The warp yarns 30 are arranged in parallel to each other on the body 13 and the dorm portions 14 in the axial direction Y of the liner 12. The warp yarns 30 have a yarn main axis direction X1, which extends straight in the body 13 and the dorm portions 14 in the circumferential direction Z of the liner 12. Further, the radial direction of the liner 12 is orthogonal to the yarn main axis direction X1 of the warp yarns 30.

The weft yarns 40 are arranged in parallel to each other on the body 13 and the dorm portions 14 in the circumferential direction Z of the liner 12. In the weft yarns 40, the weft yarns 40 arranged on the body 13 have a yarn main axis direction X2 that extends in the axial direction of the body 13 in the liner 12. In the weft yarns 40, the weft yarns 40 arranged on the dorm portions 14 have a yarn main axis direction X2 that extends in the axial direction Y of the liner 12 and is curved along the curved surfaces of the dorm portions 14.

The warp yarns 30 and the weft yarns 40 are arranged to be orthogonal to each other and the direction in which the yarn main axis direction X1 of the warp yarns 30 extends is coincided with the circumferential direction Z of the liner 12 to reinforce the liner 12 in the radial direction of the liner 12. Further, the yarn main axis direction X2 of the weft yarns 40 is coincided with the axial direction Y of the liner 12 to reinforce the liner 12 in the axial direction Y of the liner 12.

Figure 4:
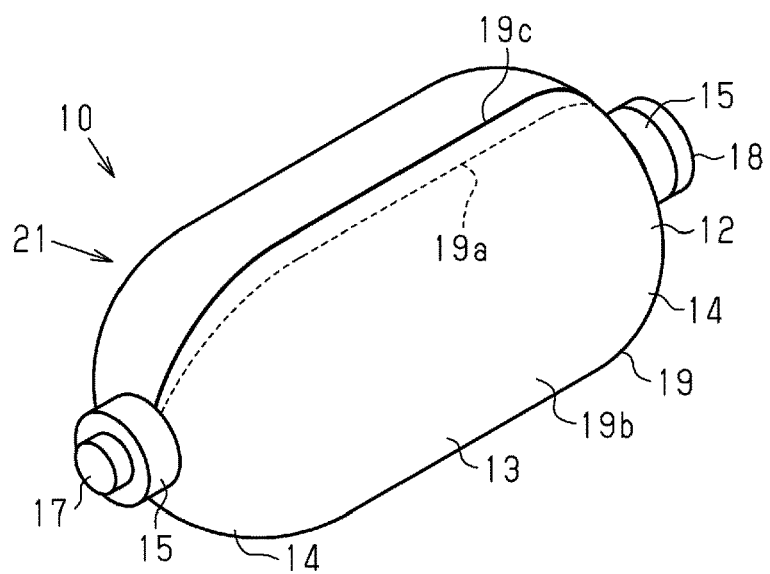
FIG. 4 is a perspective view schematically showing the high-pressure tank according to the first embodiment.
Figure 5:
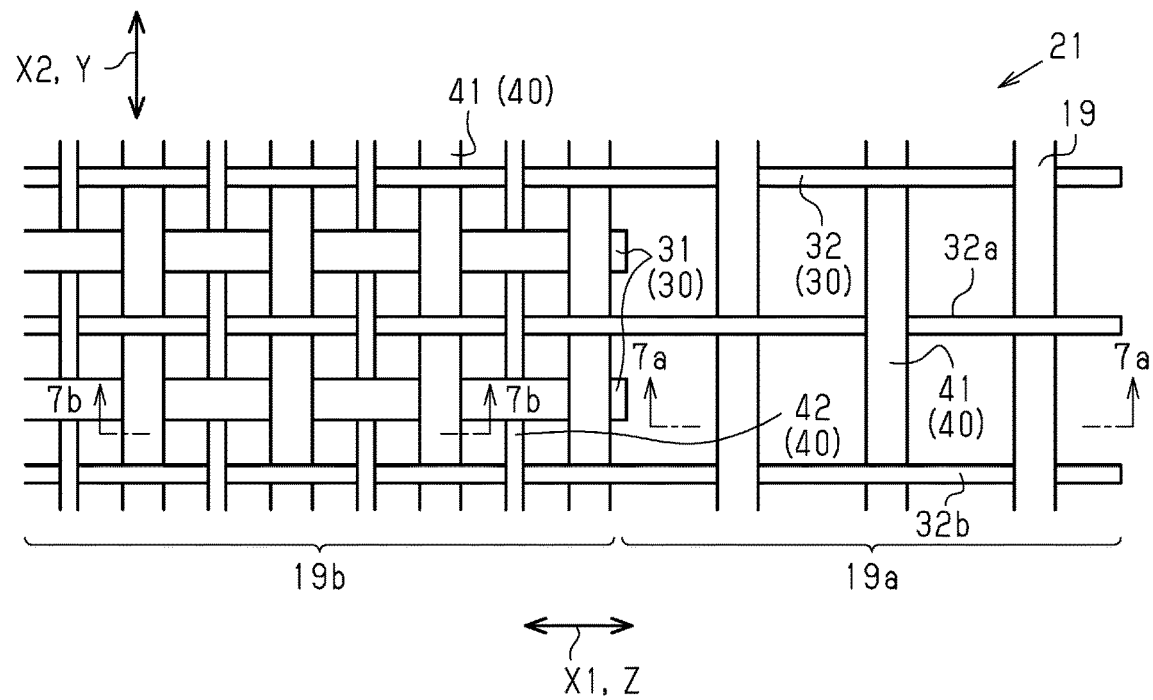
FIG. 5 is a diagram schematically showing the starting end and the general portion of the reinforced fiber sheet according to the first embodiment.

As shown in FIGS. 4 and 5, the reinforced fiber sheet 19 has an elongated shape and is wound onto an outer circumferential surface 12a (FIG. 1) of the liner 12 such that the longitudinal direction of the reinforced fiber sheet 19 extends in the circumferential direction Z of the liner 12. Further, the reinforced fiber sheet 19 includes a starting end 19a at one end of the liner 12 in the circumferential direction Z. The starting end 19a is an end where winding of the reinforced fiber sheet 19 onto the liner 12 is started. In addition, the starting end 19a extends over the entire liner 12 in the axial direction Y and extends in a predetermined range in the circumferential direction Z of the liner 12.

Figure 6:
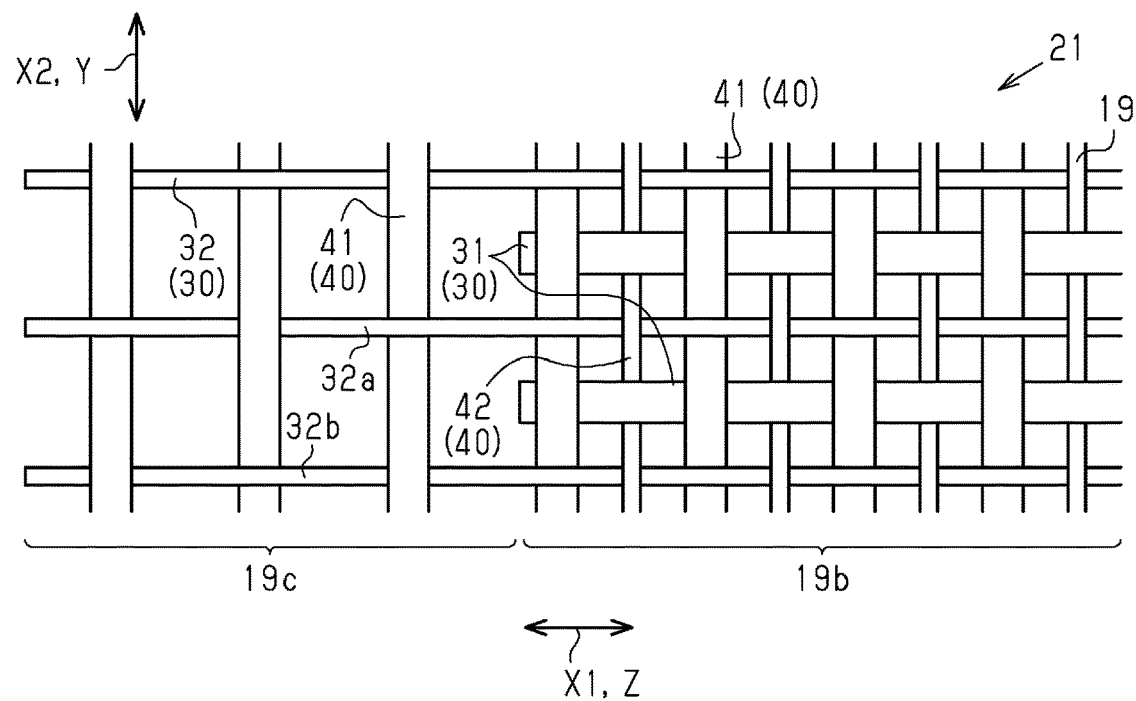
FIG. 6 is a diagram schematically showing the general portion and the finishing end of the reinforced fiber sheet according to the first embodiment.

As shown in FIGS. 4 and 6, the reinforced fiber sheet 19 includes a finishing end 19c at the other end of the liner 12 in the circumferential direction Z. The finishing end 19c is an end where winding of the reinforced fiber sheet 19 onto the liner 12 is finished. In addition, the finishing end 19c extends over the entire liner 12 in the axial direction Y and extends in a predetermined range in the circumferential direction Z of the liner 12. The part of the reinforced fiber sheet 19 between the starting end 19a and the finishing end 19c is a general portion 19b. In the same manner as the starting end 19a and the finishing end 19c, the general portion 19b extends over the entire liner 12 in the axial direction Y.

As shown in FIGS. 5 and 6, the general portion 19b includes, as the warp yarns 30, first reinforced fiber bundles 31 and first auxiliary yarns 32. In the general portion 19b, the first reinforced fiber bundles 31 and the first auxiliary yarns 32 are alternately arranged in the axial direction Y of the liner 12 so that the first reinforced fiber bundles 31 and the first auxiliary yarns 32 are arranged adjacent to each other in the axial direction Y of the liner 12. In the general portion 19b, the first reinforced fiber bundles 31 are arranged in parallel to each other, the first auxiliary yarns 32 are arranged in parallel to each other, and the first reinforced fiber bundles 31 and first auxiliary yarns 32 are arranged in parallel to each other. Further, the general portion 19b includes, as the weft yarns 40, second reinforced fiber bundles 41 and second auxiliary yarns 42. In the general portion 19b, the second reinforced fiber bundles 41 and the second auxiliary yarns 42 are alternately arranged in the circumferential direction Z of the liner 12 so that the second reinforced fiber bundles 41 and the second auxiliary yarns 42 are arranged adjacent to each other in the circumferential direction Z of the liner 12. In the general portion 19b, the second reinforced fiber bundles 41 are arranged in parallel to each other, the second auxiliary yarns 42 are arranged in parallel to each other, and the second reinforced fiber bundles 41 and second auxiliary yarns 42 are arranged in parallel to each other.

As shown in FIG. 5, the starting end 19a includes, as the warp yarns 30, the first auxiliary yarns 32. In the starting end 19a, the first auxiliary yarns 32 are arranged in parallel to each other. The starting end 19a also includes, as the weft yarns 40, the second reinforced fiber bundles 41. In the starting end 19a, the second reinforced fiber bundles 41 are arranged in parallel to each other in the circumferential direction Z of the liner 12. As shown in FIG. 6, the finishing end 19c of the present embodiment has the first auxiliary yarns 32 and the second reinforced fiber bundles 41 that are arranged in the same manner as the starting end 19a.

In the present embodiment, the first reinforced fiber bundles 31, the second reinforced fiber bundles 41, the first auxiliary yarns 32, and the second auxiliary yarns 42 are formed by binding carbon fibers that serve as reinforced fibers. The first reinforced fiber bundles 31, the second reinforced fiber bundles 41, the first auxiliary yarns 32, and the second auxiliary yarns 42 do not have to be formed using carbon fibers. Instead, they may be formed using other fibers that generally have high elasticity and high strength, such as glass fibers, silicon carbide fibers, aramid fibers, or ultra-high-molecular-weight polyethylene fibers. In the present embodiment, the first reinforced fiber bundle 31 and the second reinforced fiber bundle 41 have the same thickness. The first auxiliary yarn 32 and the second auxiliary yarn 42 include finer fiber bundles than the first reinforced fiber bundle 31 and the second reinforced fiber bundle 41.

In the starting end 19a and the finishing end 19c, the first reinforced fiber bundles 31 and the second auxiliary yarns 42 are not arranged. Thus, the starting end 19a and the finishing end 19c are smaller than the general portion 19b in the total number N of the first reinforced fiber bundles 31, the first auxiliary yarns 32, the second reinforced fiber bundles 41, and the second auxiliary yarns 42 that exist per unit length in the circumferential direction Z of the liner 12. That is, in the comparison about the amount of reinforced fibers that exist per unit length in the circumferential direction Z of the liner 12, the starting end 19a and the finishing end 19c have no reinforced fiber bundles and thus have a smaller amount of reinforced fibers than the general portion 19b. In the present embodiment, the starting end 19a and the finishing end 19c are both decreased portions, which have a smaller total number N than the general portion 19b.

Figure 7A:
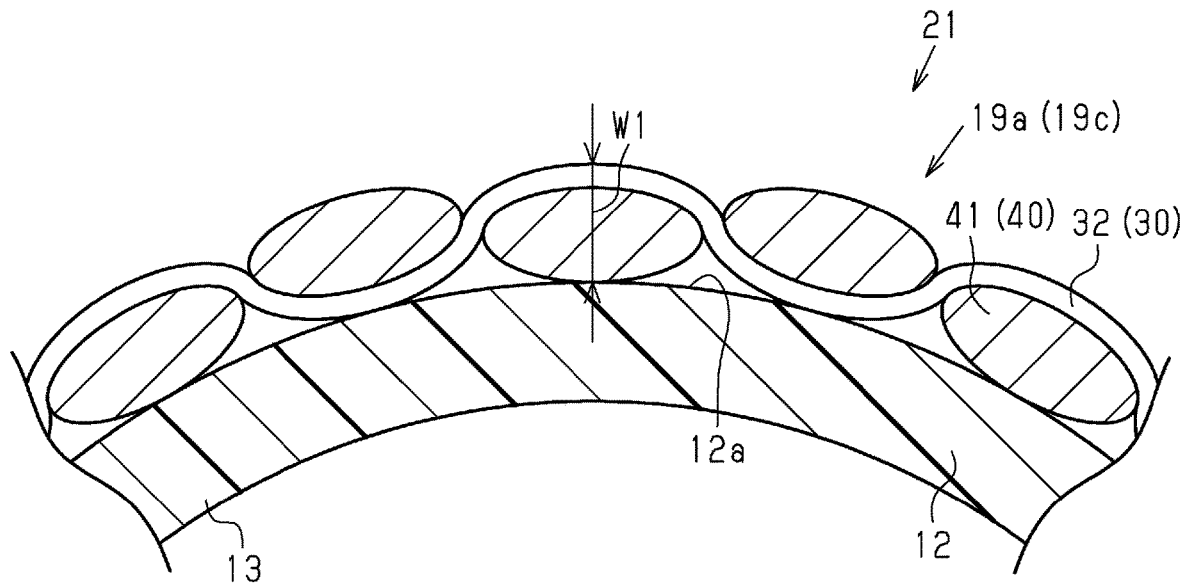
FIG. 7A is an enlarged cross-sectional view taken along line 7a-7a in FIG. 5, showing the starting end and the finishing end covering the liner according to the first embodiment.
Figure 7B:
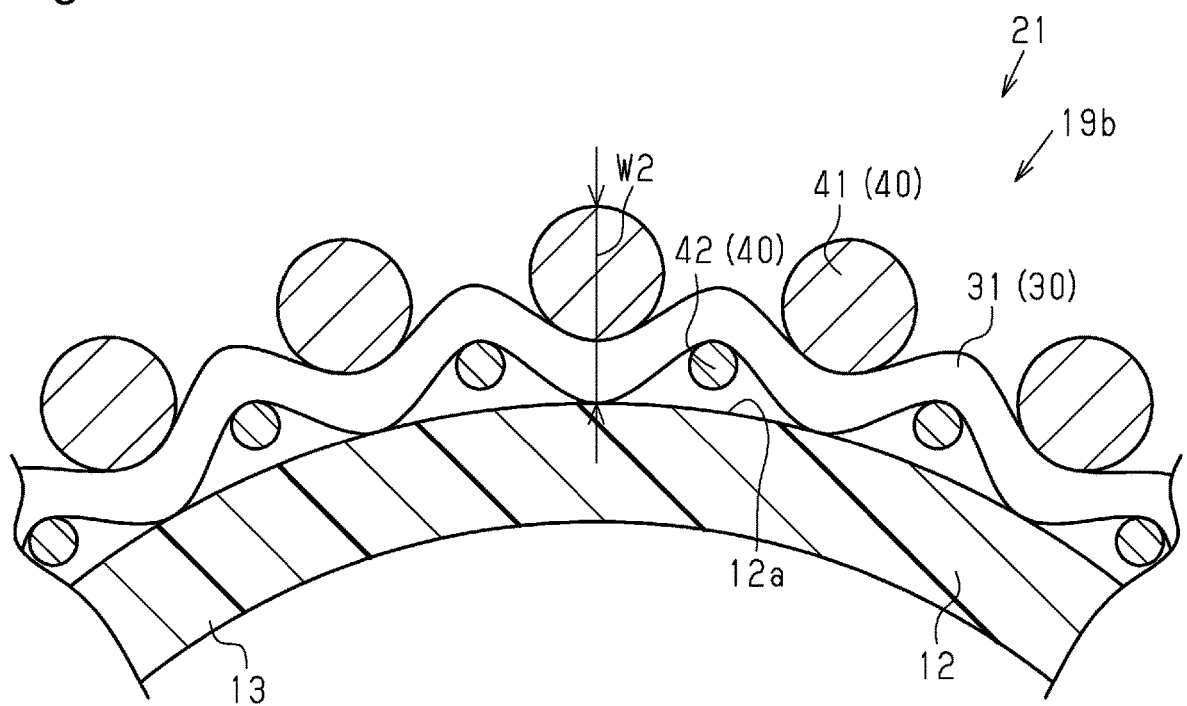
FIG. 7B is an enlarged cross-sectional view taken along line 7b-7b in FIG. 5, showing the general portion covering the liner according to the first embodiment.

As shown in FIG. 7A, the second reinforced fiber bundles 41 of the starting end 19a and the finishing end 19c are flat, thin, and wide. In contrast, as shown in FIG. 7B, the second reinforced fiber bundles 41 of the general portion 19b are thicker and narrower than those of the starting end 19a and the finishing end 19c. As shown in FIGS. 7A and 7B, the first reinforced fiber bundles 31 arranged as the warp yarns 30 of the general portion 19b are thicker than the first auxiliary yarns 32 arranged as the warp yarns 30 of the starting end 19a and the finishing end 19c.

Figure 8:
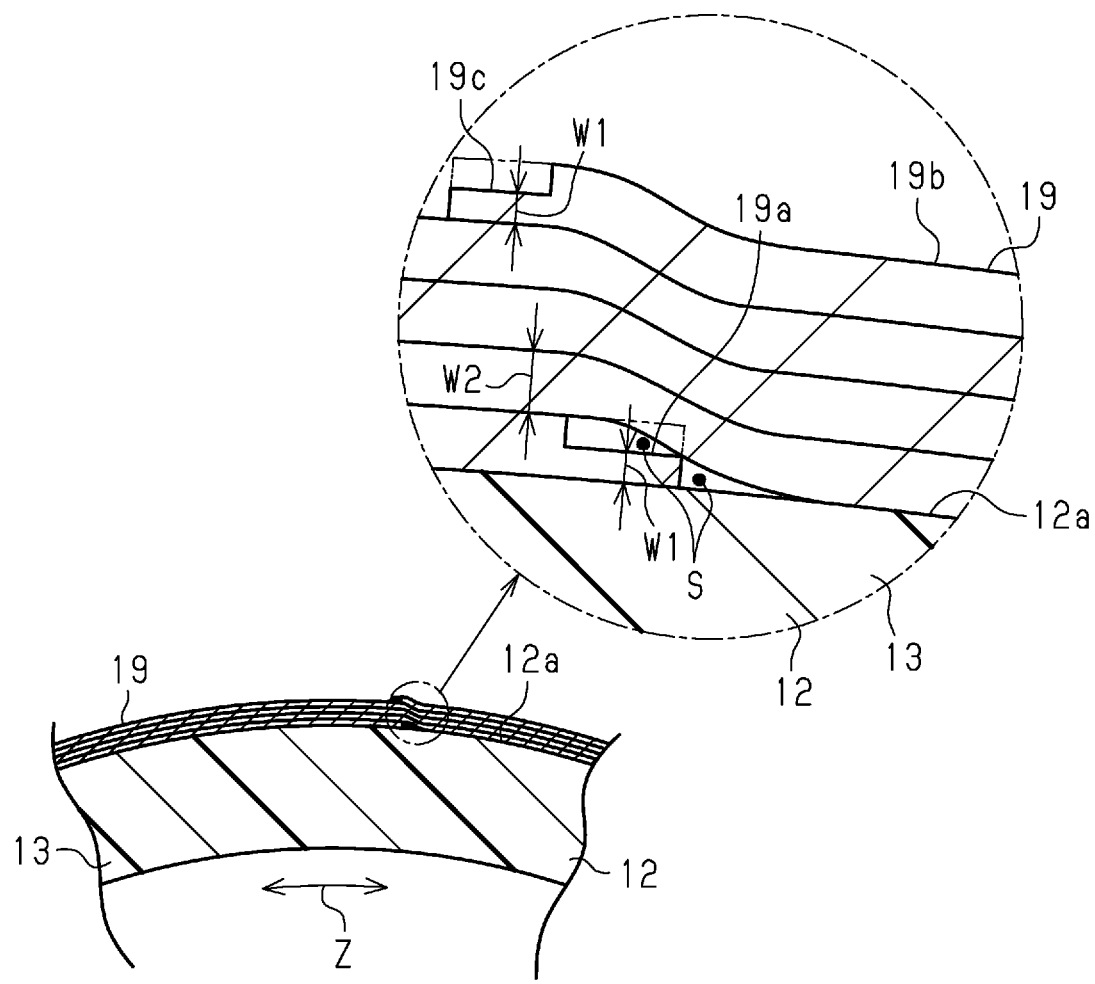
FIG. 8 is an enlarged partial cross-sectional view showing the winding start part and the winding finish part of the reinforced fiber sheet onto the liner according to the first embodiment.

As shown in FIG. 8, in the reinforced fiber sheet 19, the thickness W1 of the starting end 19a and the finishing end 19c is smaller than the thickness W2 of the general portion 19b. Thus, the thickness of the reinforced fiber sheet 19 increases from the starting end 19a toward the general portion 19b and decreases from the general portion 19b toward the finishing end 19c in the circumferential direction Z of the liner 12. The thickness of the reinforced fiber sheet 19 gradually changes in the circumferential direction Z of the liner 12 between the thickness W1 of the starting end 19a and the finishing end 19c and the thickness W2 of the general portion 19b.

The method for manufacturing the high-pressure tank 10 according to the first embodiment will now be described.

To manufacture the high-pressure tank 10, the warp yarns 30 and the weft yarns 40 are plainly woven and the woven fabric 50 is wound onto the liner 12. The liner 12 functions as a wound member.

Figure 9:
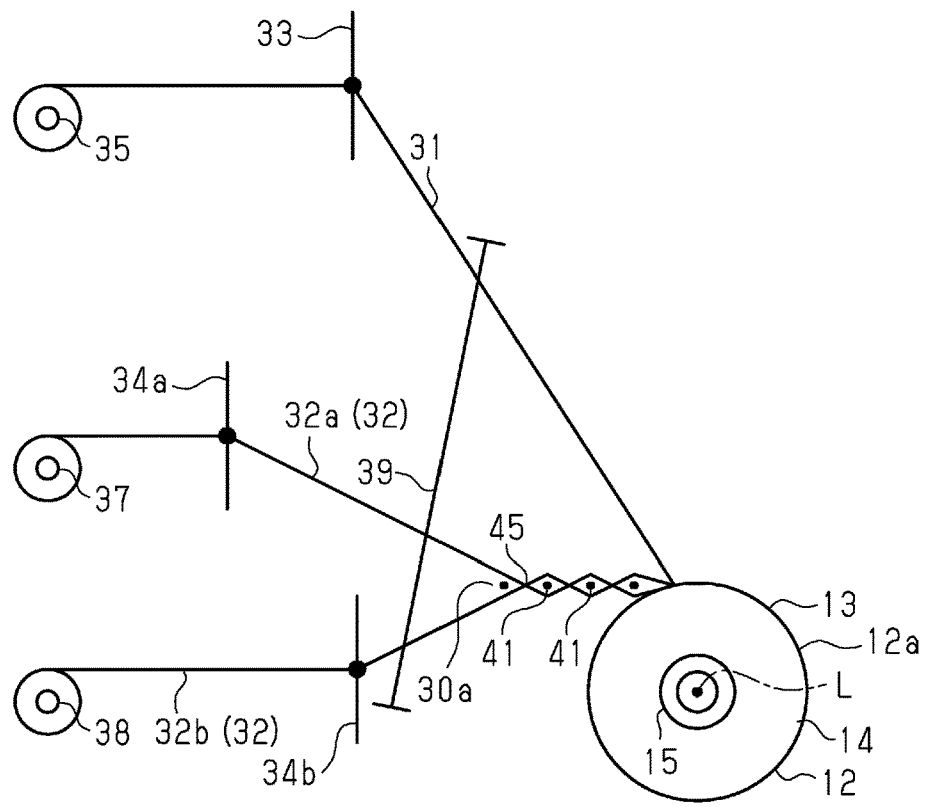
FIG. 9 is a diagram schematically showing a method for manufacturing the starting end using a loom according to the first embodiment.

As shown in FIG. 9, the fabric 50 is woven using a plain weave loom. The plain weave loom includes a reinforced fiber heddle frame 33, which creates a shed in the first reinforced fiber bundle 31, of the first reinforced fiber bundle 31 and the first auxiliary yarn 32 serving as the warp yarns 30. The plain weave loom also includes two auxiliary heddle frames 34a, 34b, which create sheds in first auxiliary yarns 32a, 32b arranged on the upper and lower sides, respectively.

The plain weave loom has a structure in which a warp beam 35 is arranged to supply the first reinforced fiber bundle 31. Shedding is performed by the reinforced fiber heddle frame 33 for the first reinforced fiber bundle 31, which is let off from the warp beam 35. The plain weave loom also has a structure in which a warp beam 37 and a warp beam 38 are arranged. The warp beam 37 supplies one of the first auxiliary yarns 32a, 32b, namely, the first auxiliary yarn 32a. The warp beam 38 supplies the other one of the first auxiliary yarns 32a, 32b, namely, the first auxiliary yarn 32b. Shedding is performed by the auxiliary heddle frame 34a for the first auxiliary yarn 32a, which is let off from the warp beam 37. Shedding is performed by the auxiliary heddle frame 34b for the first auxiliary yarn 32b, which is let off from the warp beam 38. The eyes of the reinforced fiber heddle frame 33 and the auxiliary heddle frames 34a, 34b are shown by black circles in the drawings.

A reed 39 is disposed between the reinforced fiber heddle frame 33 and auxiliary heddle frames 34a, 34b and a cloth fell 45. The reed 39 is a member extending straight in the axial direction Y of the liner 12. The second reinforced fiber bundle 41 and the second auxiliary yarn 42, which serve as the weft yarn 40, are inserted into the sheds of the first reinforced fiber bundle 31 and the first auxiliary yarns 32a, 32b by a weft insertion mechanism (not shown). In the let-off direction of the first reinforced fiber bundle 31 and the first auxiliary yarn 32a, 32b, the liner 12 is rotationally supported ahead of the cloth fell 45. The liner 12 is rotated about the central axis L.

To weave the reinforced fiber sheet 19 using the above-described plain weave loom, the ends of the first reinforced fiber bundles 31 pulled out of the warp beam 35 and the ends of the first auxiliary yarns 32a, 32b pulled out of the warp beams 37, 38 are fixed to the outer circumferential surface 12a of the liner 12 using, for example, adhesive. This causes the first reinforced fiber bundles 31 and the first auxiliary yarns 32a, 32b to stretch in a state of being arranged on the body 13 and the dorm portions 14 in the axial direction Y of the liner 12 (the direction perpendicular to the sheet of FIG. 9). The first reinforced fiber bundles 31 and the first auxiliary yarns 32a, 32b extend so as to line up in the order of the first reinforced fiber bundle 31, the first auxiliary yarn 32a, the first reinforced fiber bundle 31, and the first auxiliary yarn 32b in the axial direction Y of the liner 12. The adhesive to be used may be preferably made of material that melts when heated by impregnating the reinforced fiber sheet 19 with the matrix resin Ma and curing the matrix resin Ma, and also may be made of material that does not melt.

To weave the starting end 19a (winding start part of the reinforced fiber sheet 19), the auxiliary heddle frames 34a, 34b are alternately moved in the up-down direction such that the liner 12 does not rotate. This moves the auxiliary heddle frame 34a and the auxiliary heddle frame 34b in opposite directions. The reinforced fiber heddle frame 33 is provided, for example, above the auxiliary heddle frames 34a, 34b so as not to interfere with the movement of the first auxiliary yarns 32a, 32b in the up-down direction. Unlike the auxiliary heddle frames 34a, 34b, the reinforced fiber heddle frame 33 is not moved in the up-down direction. This causes the warp yarn shed 30a to be created only by the first auxiliary yarns 32a, 32b. Every time adjacent ones of the first auxiliary yarns 32a, 32b are alternately opened up and down, the warp yarn shed 30a is created. Every time the warp yarn shed 30a is created, the second reinforced fiber bundle 41 is inserted into the warp yarn shed 30a.

Figure 11A:
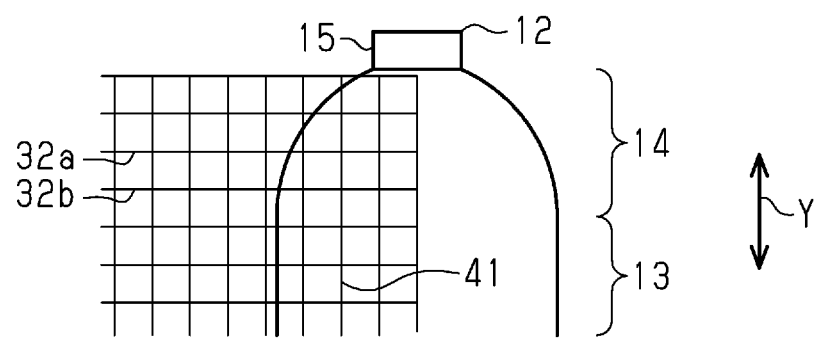
FIG. 11A is a diagram schematically showing a state in which the weft yarns are inserted in the third embodiment.
Figure 11B:
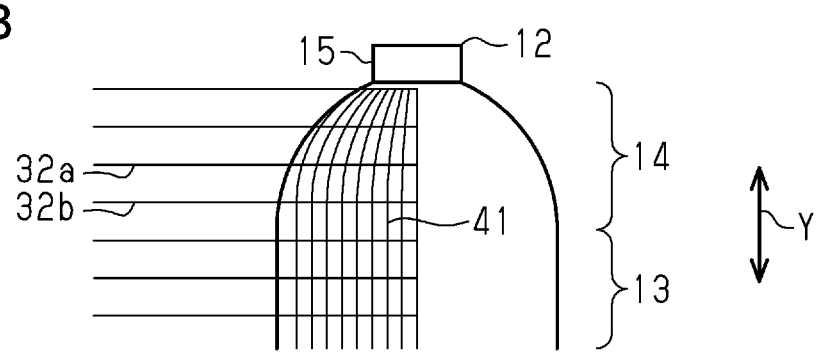
FIG. 11B is a diagram schematically showing a state after a beat-up motion in the first embodiment.

As shown in FIG. 11A, the creation of the warp yarn sheds 30a and the insertion of the second reinforced fiber bundles 41 into the warp yarn sheds 30a are performed a predetermined number of times. Then, as shown in FIG. 11B, a beat-up motion of the reed 39 is performed. The beat-up motion with the reed 39 causes the second reinforced fiber bundles 41 to be delivered toward the ends of the first auxiliary yarns 32a, 32b fixed on the outer circumferential surface 12a of the liner 12. Subsequently, the auxiliary heddle frames 34a, 34b are moved in the opposite directions to change the shedding states and perform the next weft insertion. Repeating these motions weaves the starting end 19a of the reinforced fiber sheet 19 in which the first auxiliary yarns 32a, 32b and the second reinforced fiber bundles 41 are plainly woven and causes the starting end 19a to be integrated with the liner 12. Such weaving of the starting end 19a is continued until the starting end 19a enters a state of extending in the predetermined range in the circumferential direction Z of the liner 12. The first reinforced fiber bundles 31 do not contribute to the weaving of the starting end 19a. The first reinforced fiber bundles 31 extend in a state of fibers along the surface of the starting end 19a.

The woven fabric 50 is wound onto the liner 12 by rotating the liner 12 about the central axis L. While the fabric 50 is wound onto the liner 12, the fabric 50 is then woven in the same manner as described above. As a result, the fabric 50 (i.e., reinforced fiber sheet 19) covering the entire dorm portions 14 and the body 13 is wound onto the liner 12.

Figure 10:
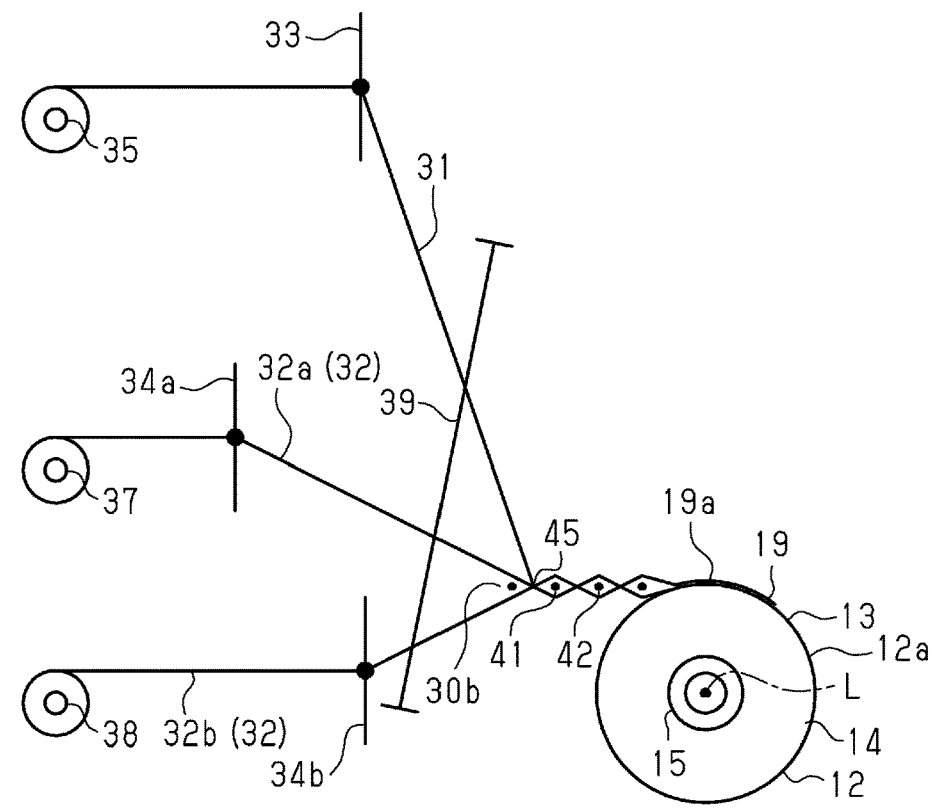
FIG. 10 is a diagram schematically showing a method for manufacturing the general portion using the loom according to the first embodiment.

After the starting end 19a enters the state of extending in the predetermined range in the circumferential direction Z of the liner 12 as shown in FIG. 10, the weaving of the starting end 19a shifts to the weaving of the general portion 19b of the reinforced fiber sheet 19. To weave the general portion 19b of the reinforced fiber sheet 19, in addition to the movement of the auxiliary heddle frames 34a, 34b in the up-down direction, the reinforced fiber heddle frame 33 is moved in the up-down direction such that the liner 12 does not rotate. This causes the first auxiliary yarns 32a, 32b and the first reinforced fiber bundle 31 to create a warp yarn shed 30b. Every time the first reinforced fiber bundle 31 and the first auxiliary yarns 32a, 32b are alternately opened up and down, the warp yarn shed 30a is created. Every time the warp yarn shed 30b is created, one of the second reinforced fiber bundle 41 and the second auxiliary yarn 42 is inserted into the warp yarn shed 30b. More specifically, when the first reinforced fiber bundle 31 is upwardly opened, the first auxiliary yarns 32a, 32b are downwardly opened. The second auxiliary yarn 42 is inserted into the warp yarn shed 30b created in such a manner. When the first reinforced fiber bundle 31 is downwardly opened, the first auxiliary yarns 32a, 32b are upwardly opened. The second reinforced fiber bundle 41 is inserted into the warp yarn shed 30b created in such a manner. After the creation of the warp yarn sheds 30b and the insertion of the second reinforced fiber bundle 41 and the second auxiliary yarn 42 into the warp yarn sheds 30b are performed a predetermined number of times, the beat-up motion of the reed 39 is performed.

In the weaving of the general portion 19b, the beat-up motion is performed with a larger number of warp yarns 30 than in the weaving of the starting end 19a by an amount corresponding to the number of the first reinforced fiber bundles 31. Thus, the above-described total number N in the general portion 19b is larger than the total number N in the starting end 19a in the circumferential direction Z of the liner 12. That is, the amount of reinforced fibers of the general portion 19b is larger than the amount of reinforced fibers of the starting end 19a. Further, in the general portion 19b, arranging many weft yarns 40 causes adjacent ones of the weft yarns 40 to press each other. This changes the shapes of the weft yarns 40 so as to become thicker. Thus, the second reinforced fiber bundles 41 are thicker and narrower in the general portion 19b than in the starting end 19a. Further, in the reinforced fiber sheet 19, the thickness W1 of the starting end 19a is smaller than the thickness W2 of the general portion 19b.

The beat-up motion of the reed 39 causes the second reinforced fiber bundles 41 and the second auxiliary yarns 42 to be delivered toward the ends of the first reinforced fiber bundles 31 and the first auxiliary yarns 32a, 32b fixed on the outer circumferential surface 12a of the liner 12. Subsequently, the reinforced fiber heddle frame 33 and the auxiliary heddle frames 34a, 34b are moved in the opposite directions to change the shedding states and perform the next weft insertion. Repeating these motions weaves the general portion 19b of the reinforced fiber sheet 19 in which the first reinforced fiber bundles 31 and first auxiliary yarns 32a, 32b and the second reinforced fiber bundles 41 and second auxiliary yarns 42 are plainly woven and causes the general portion 19b to be integrated with the liner 12. Such weaving of the general portion 19b is continued until the general portion 19b enters the state of extending in the predetermined range in the circumferential direction Z of the liner 12. At the start of the weaving of the general portion 19b, the first reinforced fiber bundles 31 extend in a state of fibers along the surface of the starting end 19a between the general portion 19b and the section where the first reinforced fiber bundles 31 are fixed on the outer circumferential surface 12a of the liner 12. When the weaving of the general portion 19b has progressed to a certain extent, the first reinforced fiber bundles 31 arranged between the general portion 19b and the section where the first reinforced fiber bundles 31 are fixed on the outer circumferential surface 12a of the liner 12 are removed through, for example, cutting.

Figure 11C:
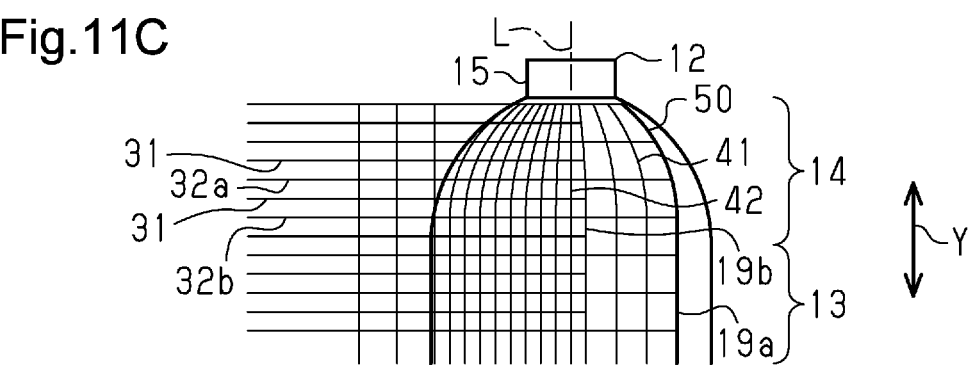
FIG. 11C is a diagram schematically showing a state in which the reinforced fiber sheet is wound onto the liner in the first embodiment.

As shown in FIG. 11C, the woven fabric 50 is wound onto the liner 12 to cause the starting end 19a and the general portion 19b to be wound adjacently on the outer circumferential surface 12a of the liner 12. The weaving of the general portion 19b is continued until the number of laminated layers becomes a necessary one for the fabric 50 wound onto the outer circumferential surface 12a of the liner 12.

When the number of laminated layers becomes the necessary one for the fabric 50 wound onto the outer circumferential surface 12a of the liner 12, the weaving of the general portion 19b shifts to the weaving of the finishing end 19c of the reinforced fiber sheet 19. To weave the finishing end 19c of the reinforced fiber sheet 19, in the same manner as the weaving of the starting end 19a, the auxiliary heddle frames 34a, 34b are moved in the up-down direction while the reinforced fiber heddle frame 33 is not moved in the up-down direction. This causes the warp yarn shed 30a to be created only by the first auxiliary yarns 32a, 32b. Every time the warp yarn shed 30a is created, the second reinforced fiber bundle 41 is inserted into the warp yarn shed 30a. After the creation of the warp yarn shed 30a and the insertion of the second reinforced fiber bundle 41 into the warp yarn sheds 30a are performed a predetermined number of times, the beat-up motion of the reed 39 is performed. The woven fabric 50 is wound onto the liner 12 to cause the general portion 19b and the finishing end 19c to be wound adjacently in the circumferential direction Z of the liner 12. The first reinforced fiber bundles 31 do not contribute to the weaving of the finishing end 19c. For example, when the weaving of the general portion 19b is finished, the first reinforced fiber bundles 31 are removed from the reinforced fiber sheet 19 through cutting or the like of the first reinforced fiber bundle 31 at the end of the general portion 19b closer to the finishing end 19c.

The above-described predetermined number of times in the case of weaving the finishing end 19c is the same as the predetermined number of times in the case of weaving the starting end 19a. Thus, the total number N in the general portion 19b is larger than the total number N in the finishing end 19c in the circumferential direction Z of the liner 12. That is, the amount of reinforced fibers of the general portion 19b is larger than the amount of reinforced fibers of the finishing end 19c. In the reinforced fiber sheet 19, the thickness W1 of the finishing end 19c is smaller than the thickness W2 of the general portion 19b.

The weaving of the finishing end 19c is continued until the finishing end 19c enters the state of extending in the predetermined range in the circumferential direction Z of the liner 12. In this manner, the fiber structure 21 is manufactured including the reinforced fiber sheet 19 on the outer circumferential surface 12a of the liner 12.

Impregnating the above-described fiber structure 21 with the matrix resin Ma and curing the matrix resin Ma causes the fiber-reinforced composite material layer 11 to be formed from the reinforced fiber sheet 19 and manufactures the high-pressure tank 10 with the outer side of the liner 12 covered by the fiber-reinforced composite material layer 11. The impregnation and curing of the matrix resin Ma are performed using, for example, resin transfer molding (RTM).

The operation of the high-pressure tank 10 will now be described.

As shown in FIG. 8, the thickness of the reinforced fiber sheet 19 gradually increases from the starting end 19a toward the general portion 19b in the circumferential direction Z of the liner 12. This prevents the formation of large steps from the outer circumferential surface 12a of the liner 12 to the starting end 19a. This also prevents the formation of large steps from the starting end 19a to the general portion 19b in the circumferential direction Z of the liner 12. Thus, in the fiber structure 21, the parts of the general portion 19b that form the second and subsequent layers are slightly twisted due to the steps from the outer circumferential surface 12a of the liner 12 to the starting end 19a and the steps from the starting end 19a to the general portion 19b. Additionally, the thickness of the reinforced fiber sheet 19 decreases from the general portion 19b toward the finishing end 19c in the circumferential direction Z of the liner 12. This prevents the formation of large steps from the general portion 19b to the finishing end 19c. This also prevents the formation of large steps from the finishing end 19c to the general portion 19b, which is located at a lower layer of the finishing end 19c, in the circumferential direction Z of the liner 12.

Furthermore, in the fiber structure 21, the winding start part of the reinforced fiber sheet 19 onto the liner 12 includes gaps S, which are defined by the starting end 19a, the outer circumferential surface 12a of the liner 12, and the part of the general portion 19b overlapping the starting end 19a as an upper layer of the starting end 19a. The gaps S are filled with the matrix resin Ma.

The above-described embodiment provides the following advantages.

(1-1) The reinforced fiber sheet 19 becomes thicker from the starting end 19a and the finishing end 19c toward the general portion 19b in the circumferential direction Z of the liner 12. Thus, the steps in the fiber layers of the reinforced fiber sheet 19 are smaller than when the thicknesses of the starting end 19a and finishing end 19c and the thickness of the general portion 19b are hypothetically fixed in the circumferential direction Z of the liner 12 (shown by the broken line in FIG. 8). This reduces the steps produced in the surface of the high-pressure tank 10. Further, in the above-described embodiment, the weaving of the reinforced fiber sheet 19 allows the thicknesses to be adjusted. Thus, for example, unlike a case where the reinforced fiber sheet 19 with a reduced thickness is attached, the continuity of the reinforced fibers in the circumferential direction Z of the liner 12 is maintained even with reduced steps. This prevents a decrease in the strength of the fiber structure 21 in the circumferential direction Z. Furthermore, a thickness-adjusting step does not need to be added to the steps for manufacturing the fiber structure 21. This limits an increase in the manufacturing steps.

(1-2) The first reinforced fiber bundles 31 and the second auxiliary yarns 42 are not arranged in the starting end 19a and the finishing end 19c. Thus, the starting end 19a and the finishing end 19c are smaller than the general portion 19b in the amount of reinforced fibers and the number of auxiliary yarns per unit length in the circumferential direction Z of the liner 12. Such decrease in the amount of reinforced fibers and the number of auxiliary yarns allows the thickness of the starting end 19a and the finishing end 19c to be smaller than that of the general portion 19b.

(1-3) When the reinforced fiber sheet 19 is wound onto the liner 12 and then impregnated with the matrix resin Ma, the gaps S are filled with the matrix resin Ma. In order to reduce the amount of the matrix resin Ma used, it is desired that the gaps S be smaller. In the above-described embodiment, the thickness of the reinforced fiber sheet 19 gradually increases from the starting end 19a toward the general portion 19b in the circumferential direction Z of the liner 12. Thus, as compared with when the starting end 19a and the general portion 19b hypothetically have a fixed thickness, the volumes of the gaps S are smaller. This decreases the amount of the matrix resin Ma filling the gaps S and thus reduces the amount of the matrix resin Ma used.

(1-4) In the high-pressure tank 10, the gaps in the fiber layers of the reinforced fiber sheet 19 are decreased. This limits situations in which the stress resulting from the inner pressure of the high-pressure tank 10 concentrates in the parts where the gaps are formed. Accordingly, a decrease in the pressure resistance of the high-pressure tank 10 is limited.

Second Embodiment

The second embodiment of the FRP tubular body and the method for manufacturing the FRP tubular body applied to the pressure vessel and the method for manufacturing the pressure vessel will now be described with reference to FIGS. 12 to 14. The components that are the same as those of the first embodiment, including the high-pressure tank 10, the liner 12, and the general portion 19b, will not be described.

Figure 12:
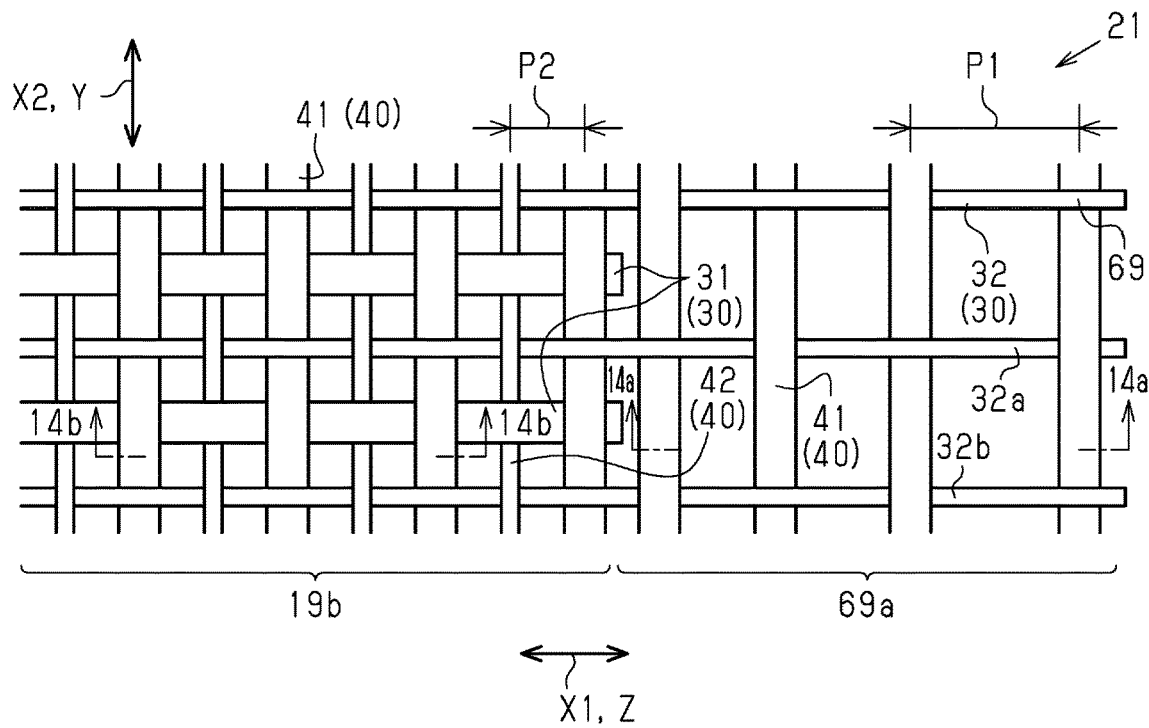
FIG. 12 is a diagram schematically showing the starting end and the general portion of the reinforced fiber sheet according to a second embodiment.
Figure 13:
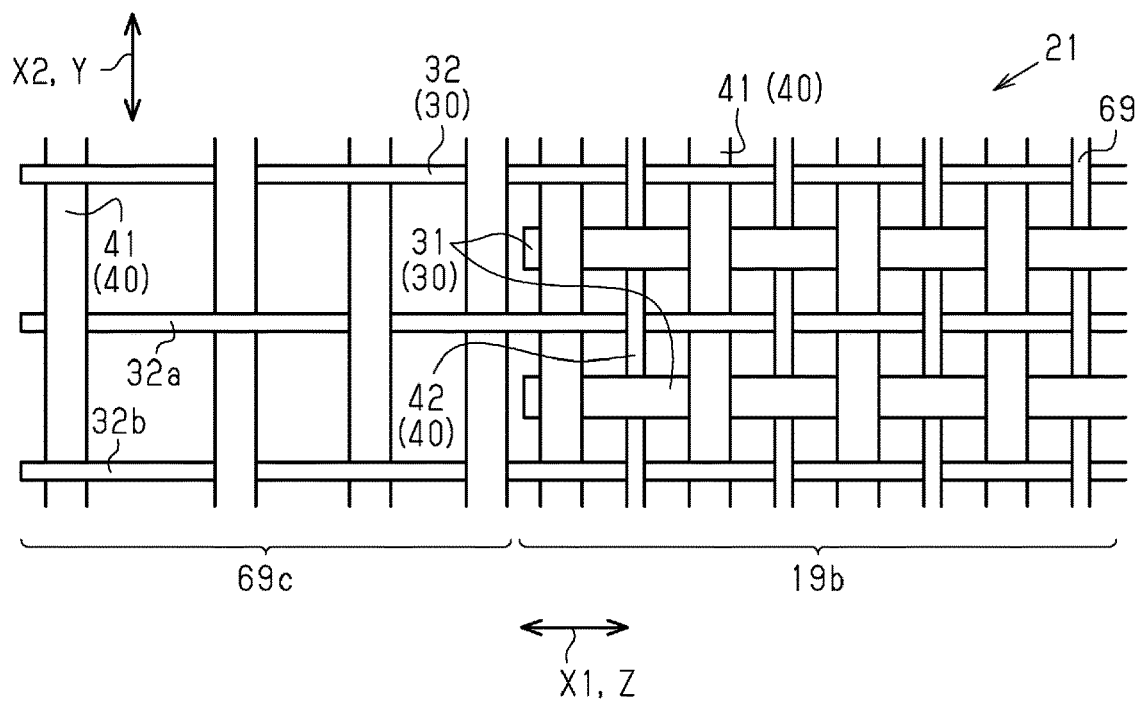
FIG. 13 is a diagram schematically showing the general portion and the finishing end of the reinforced fiber sheet according to the second embodiment.

As shown in FIGS. 12 and 13, the second embodiment includes a reinforced fiber sheet 69 with a starting end 69a and a finishing end 69c. In the same manner as the starting end 19a and the finishing end 19c of the reinforced fiber sheet 19 in the first embodiment, the starting end 69a and the finishing end 69c include the first auxiliary yarns 32 as the warp yarns 30 and the second reinforced fiber bundles 41 as the weft yarns 40. In the starting end 69a and the finishing end 69c, the first reinforced fiber bundles 31 and the second auxiliary yarns 42 are not arranged. Thus, the total number N of the first reinforced fiber bundles 31, the first auxiliary yarns 32, the second reinforced fiber bundles 41, and the second auxiliary yarns 42 that exist per unit length in the circumferential direction Z of the liner 12 is smaller in the starting end 69a and the finishing end 69c than in the general portion 19b. That is, the amount of reinforced fibers in the starting end 69a and the finishing end 69c is smaller than in the reinforced fibers in the general portion 19b. In the present embodiment, the starting end 69a and the finishing end 69c are both the decreased portions, which have a smaller total number N than the general portion 19b.

Further, an arrangement pitch size P1 between the second reinforced fiber bundles 41 adjacent to each other in the entire starting end 69a and finishing end 69c is larger than an arrangement pitch size P2 between the second reinforced fiber bundle 41 and the second auxiliary yarn 42 adjacent to each other in the general portion 19b. In addition, the arrangement pitch size P1 between the second reinforced fiber bundles 41 adjacent to each other decreases in the starting end 69a and the finishing end 69c toward the general portion 19b in the circumferential direction Z of the liner 12. The arrangement pitch sizes P1, P2 refer to the distance between the central axes of adjacent yarns.

Figure 14A:
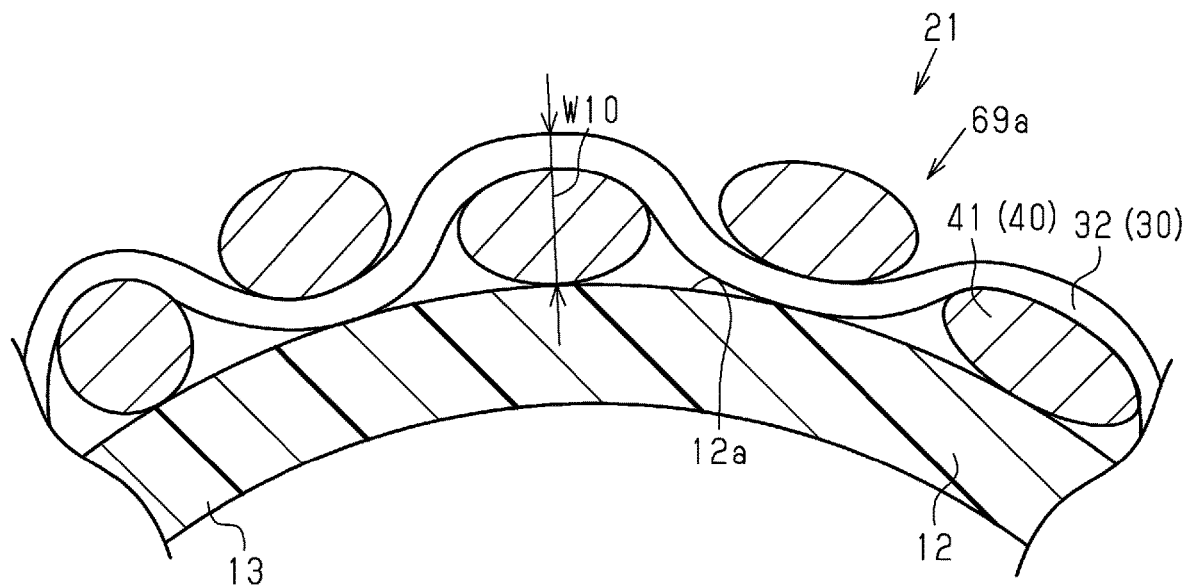
FIG. 14A is an enlarged cross-sectional view taken along line 14a-14a in FIG. 12, showing the starting end covering the liner according to the second embodiment.
Figure 14B:
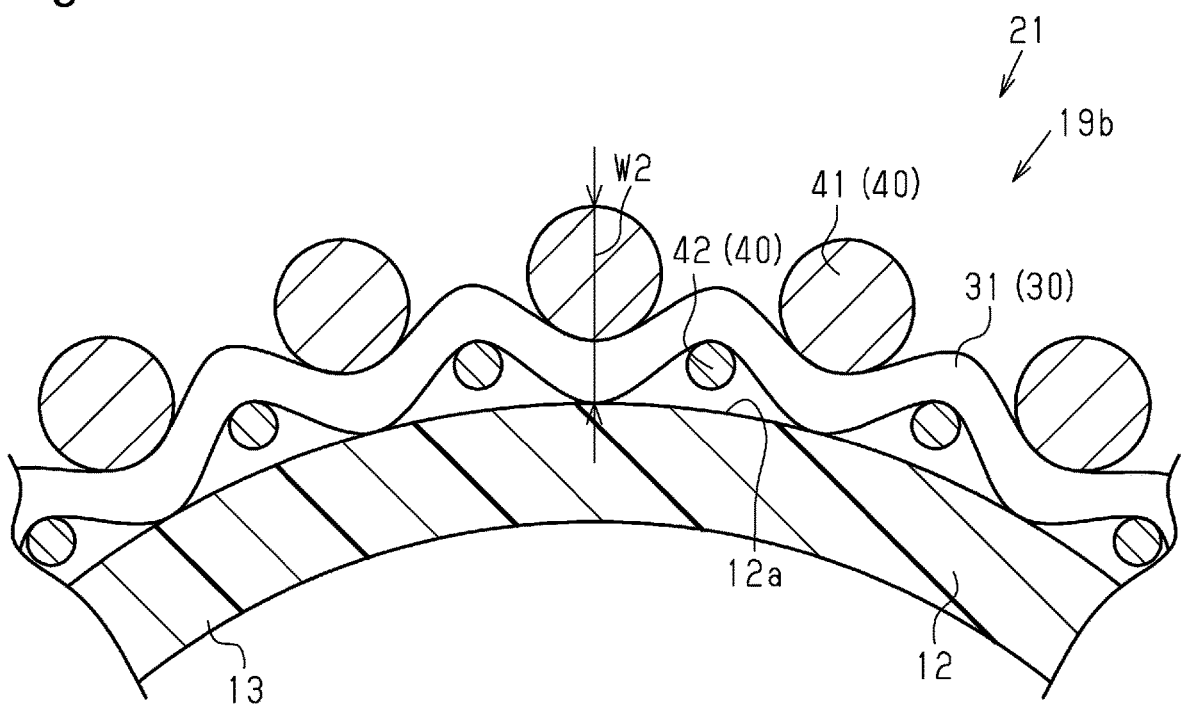
FIG. 14B is an enlarged cross-sectional view taken along line 14b-14b in FIG. 12, showing the general portion covering the liner according to the second embodiment.

As shown in FIG. 14A, in the starting end 69a, the second reinforced fiber bundle 41 located away from the general portion 19b in the circumferential direction Z of the liner 12 (located at the right side in FIG. 14A) is flat, thin, and wide. Further, in the starting end 69a, the second reinforced fiber bundle 41 becomes thicker and narrower toward the general portion 19b in the circumferential direction Z of the liner 12 (toward the left side in FIG. 14A). In the same manner, in the finishing end 69c, the second reinforced fiber bundle 41 located away from the general portion 19b in the circumferential direction Z of the liner 12 is flat, thin, and wide (not shown). Further, in the finishing end 69c, the second reinforced fiber bundle 41 becomes thicker and narrower toward the general portion 19b in the circumferential direction Z of the liner 12 (not shown). As shown in FIG. 14B, the second reinforced fiber bundles 41 in the general portion 19b is thicker and narrower than the second reinforced fiber bundles 41 of the starting end 69a and the finishing end 69c. As shown in FIGS. 14A and 14B, the first reinforced fiber bundles 31 arranged as the warp yarns 30 in the general portion 19b are thicker than the first auxiliary yarns 32 arranged as the warp yarns 30 in the starting end 69a and the finishing end 69c.

The thickness W10 of the starting end 69a and the finishing end 69c of the reinforced fiber sheet 69 is smaller than the thickness W2 of the general portion 19b. In the starting end 69a and the finishing end 69c, the thickness W10 increases toward the general portion 19b in the circumferential direction Z of the liner 12. Thus, in the circumferential direction Z of the liner 12, the thickness of the reinforced fiber sheet 69 gradually increases from the starting end 69a toward the general portion 19b and gradually decreases from the general portion 19b toward the finishing end 69c.

The method for manufacturing the high-pressure tank 10 according to the second embodiment will now be described.

To manufacture the high-pressure tank 10 in the second embodiment, the plain weave loom shown in FIGS. 9 and 10 is used to plainly weave the warp yarns 30 and the weft yarns 40 and wind the woven fabric 50 onto the liner 12 in the same manner as the first embodiment. The present embodiment differs from the first embodiment in the point in time where the beat-up motion of the reed 39 is performed. Such difference from the first embodiment will be mainly described.

The beat-up motion of the reed 39 in the weaving of the starting end 69a and the finishing end 69c is performed after the creation of the warp yarn sheds 30a and the insertion of the second reinforced fiber bundles 41 into the warp yarn sheds 30a are performed a predetermined number of times. The number of times of weft insertion is changed in the starting end 69a and the finishing end 69c so that the number of times of weft insertion increases as the general portion 19b becomes closer in the circumferential direction Z of the liner 12. In the starting end 69a and the finishing end 69c, weft insertion is performed a smaller number of times at a position located away from the general portion 19b than at a position close to the general portion 19b in the circumferential direction Z of the liner 12. This increases the arrangement pitch sizes of adjacent ones of the second reinforced fiber bundles 41. Thus, adjacent ones of the second reinforced fiber bundles 41 press each other to a small extent at the position located away from the general portion 19b in the circumferential direction Z of the liner 12. This causes the arranged second reinforced fiber bundles 41 to have a wide shape and have a relatively small thickness.

In the starting end 69a and the finishing end 69c, weft insertion is performed a larger number of times at the position located close to the general portion 19b than at the position located away from the general portion 19b in the circumferential direction Z of the liner 12. This decreases the arrangement pitch sizes of adjacent ones of the second reinforced fiber bundles 41. Thus, the arrangement pitch size between the second reinforced fiber bundles 41 adjacent to each other decreases toward the general portion 19b in the circumferential direction Z of the liner 12 in the starting end 69a and the finishing end 69c. Thus, the pressing of adjacent ones of the second reinforced fiber bundles 41 with each other causes the second reinforced fiber bundle 41 to have a narrower shape and have a relatively larger thickness toward the general portion 19b in the circumferential direction Z of the liner 12 in the starting end 69a and the finishing end 69c.

In the same manner, the beat-up motion of the reed 39 in the weaving of the general portion 19b is performed after the creation of the warp yarn sheds 30b and the insertion of the second reinforced fiber bundles 41 and the second auxiliary yarns 42 into the warp yarn sheds 30b are performed a predetermined number of times. Weft insertion is performed a larger number of times in the general portion 19b than in the starting end 69a and the finishing end 69c. Thus, the arrangement pitch size between the second reinforced fiber bundle 41 and the second auxiliary yarn 42 adjacent to each other in the general portion 19b is smaller than the arrangement pitch size between the second reinforced fiber bundles 41 in the starting end 69a and the finishing end 69c. Thus, in the general portion 19b, the pressing of adjacent ones of the second reinforced fiber bundle 41 and the second auxiliary yarn 42 with each other causes the arranged second reinforced fiber bundles 41 to have a narrow shape and have a relatively large thickness.

The second embodiment provides the same advantages as the first embodiment. Further, the second embodiment provides the following advantage in addition to the same advantages as advantages (1-1) to (1-4) of the first embodiment.

(2-1) In the circumferential direction Z of the liner 12, the thickness gradually increases from the starting end 69a and the finishing end 69c toward the general portion 19b. This further reduces the gaps produced in the surface of the high-pressure tank 10.

Third Embodiment

The third embodiment of the FRP tubular body and the method for manufacturing the FRP tubular body applied to the pressure vessel and the method for manufacturing the pressure vessel will now be described with reference to FIGS. 15 to 17. The components that are the same as those of the first embodiment, including the high-pressure tank 10, the liner 12, and the general portion 19b, will not be described.

Figure 15:
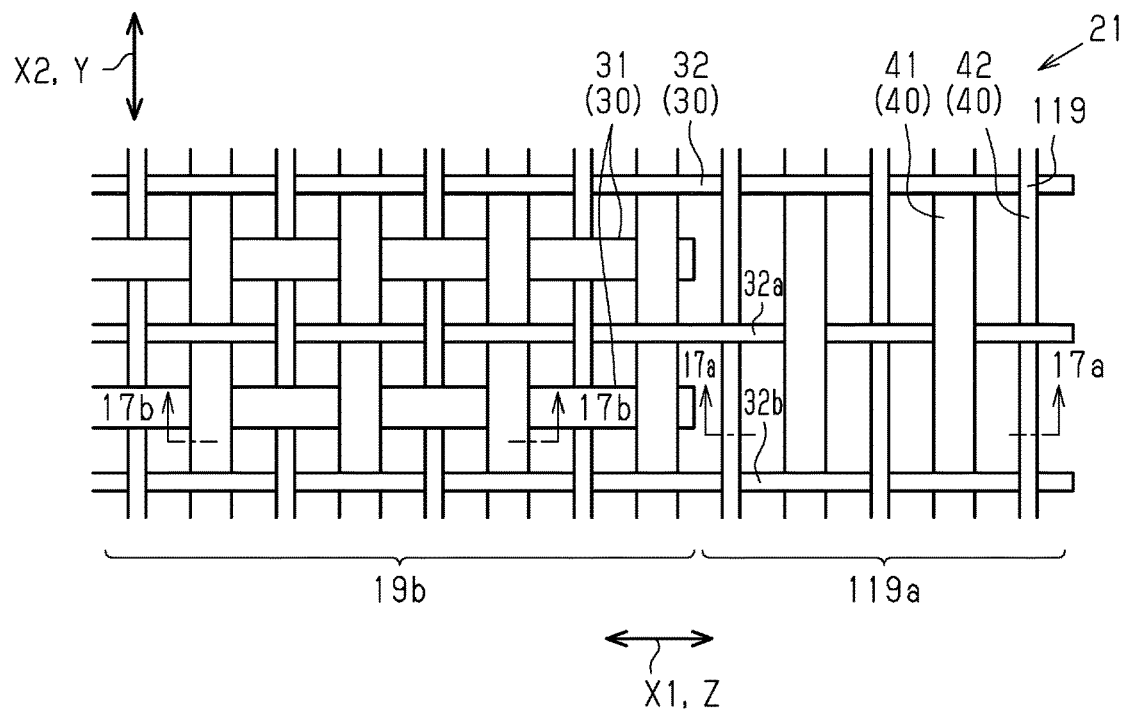
FIG. 15 is a diagram schematically showing the starting end and the general portion of the reinforced fiber sheet according to a third embodiment.
Figure 16:
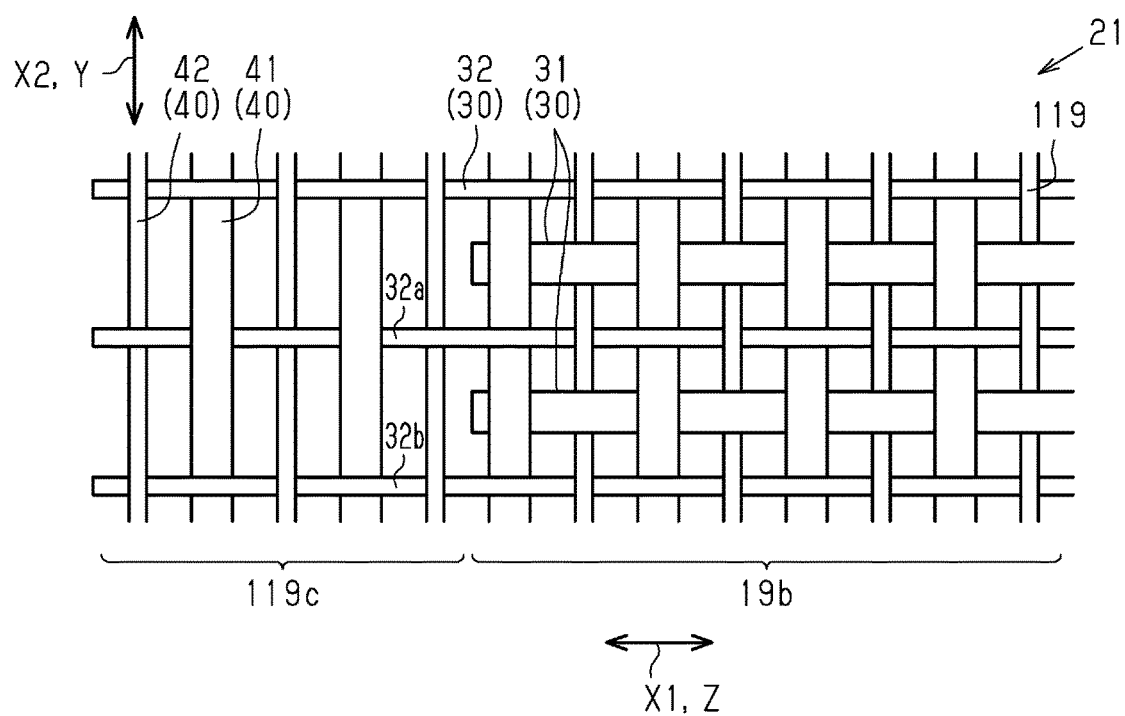
FIG. 16 is a diagram schematically showing the general portion and the finishing end of the reinforced fiber sheet according to the third embodiment.

As shown in FIGS. 15 and 16, the third embodiment includes a reinforced fiber sheet 119 with a starting end 119a and a finishing end 119c. In the same manner as the starting end 19a and the finishing end 19c of the reinforced fiber sheet 19 in the first embodiment, the starting end 119a and the finishing end 119c include the first auxiliary yarns 32 as the warp yarns 30. The starting end 119a and the finishing end 119c include the second auxiliary yarns 42 as the weft yarns 40 in addition to the second reinforced fiber bundles 41. In the starting end 119a and the finishing end 119c, the first reinforced fiber bundles 31 are not arranged. Thus, the total number N of the first reinforced fiber bundles 31, the first auxiliary yarns 32, the second reinforced fiber bundles 41, and the second auxiliary yarns 42 per unit length in the circumferential direction Z of the liner 12 is smaller in the starting end 119a and the finishing end 119c than in the general portion 19b. That is, the starting end 119a and the finishing end 119c are smaller than the general portion 19b in the amount of reinforced fibers per unit length in the circumferential direction Z of the liner 12. In the present embodiment, the starting end 119a and the finishing end 119c are both the decreased portions, which have a smaller total number N and a smaller amount of reinforced fibers than the general portion 19b.

Figure 17A:
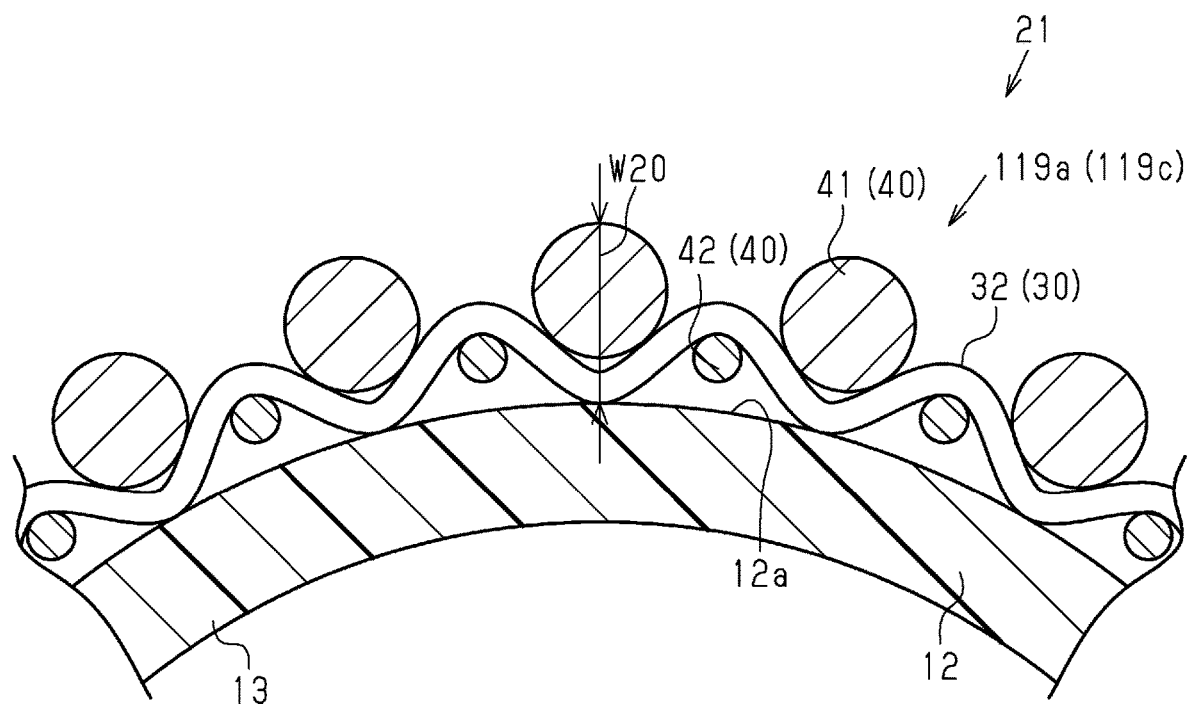
FIG. 17A is an enlarged cross-sectional view taken along line 17a-17a in FIG. 15, showing the starting end and the finishing end covering the liner according to the third embodiment.
Figure 17B:
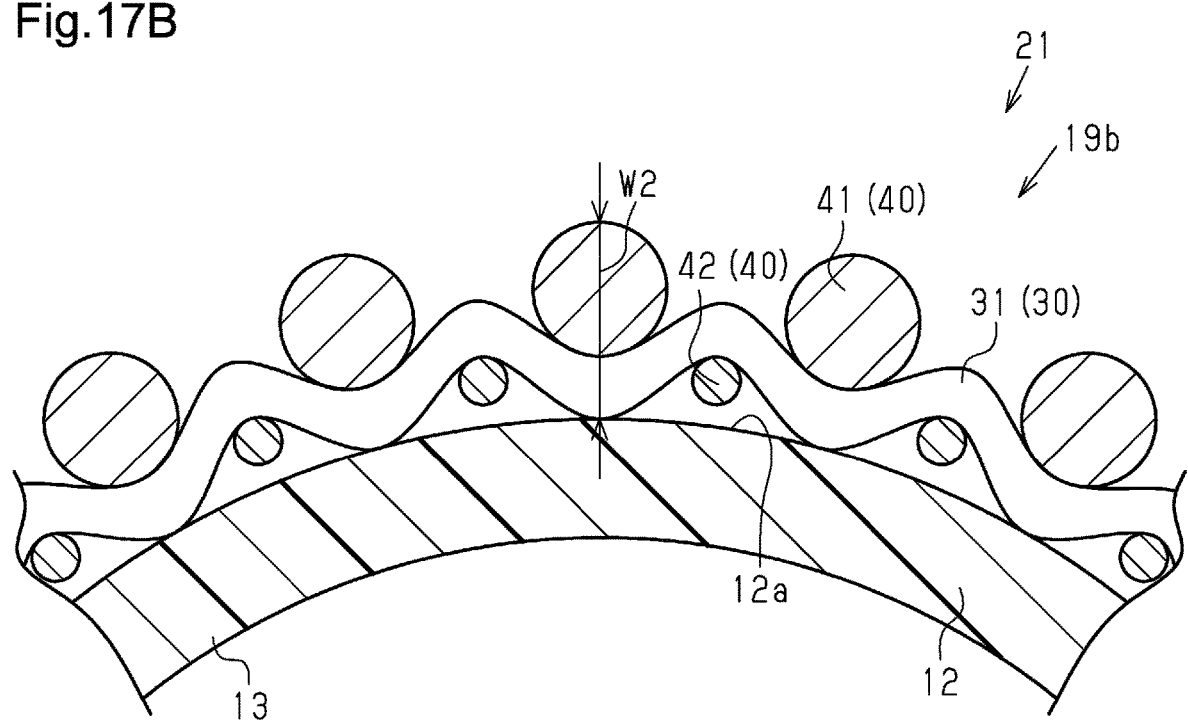
FIG. 17B is an enlarged cross-sectional view taken along line 17b-17b in FIG. 15, showing the general portion covering the liner according to the third embodiment.

As shown in FIGS. 17A and 17B, the first reinforced fiber bundles 31 arranged as the warp yarns 30 in the general portion 19b are thicker than the first auxiliary yarns 32 arranged as the warp yarns 30 in the starting end 119a and the finishing end 119c. Thus, in the reinforced fiber sheet 119, the thickness W20 of the starting end 119a and the finishing end 119c is smaller than the thickness W2 of the general portion 19b. Accordingly, the thickness of the reinforced fiber sheet 119 increases from the starting end 119a toward the general portion 19b and decreases from the general portion 19b toward the finishing end 119c in the circumferential direction Z of the liner 12. The thickness of the reinforced fiber sheet 119 gradually changes in the circumferential direction Z of the liner 12 between the thickness of the starting end 119a and the finishing end 119c and the thickness of the general portion 19b.

The method for manufacturing the high-pressure tank 10 according to the third embodiment will now be described.

To manufacture the high-pressure tank 10 in the third embodiment, the plain weave loom shown in FIGS. 9 and 10 is used to plainly weave the warp yarns 30 and the weft yarns 40 and wind the woven fabric 50 onto the liner 12 in the same manner as the first embodiment. The present embodiment differs from the first embodiment in that the insertion of the second auxiliary yarns 42 is performed in the weaving of the starting end 119a and the finishing end 119c. Such difference from the first embodiment will be mainly described.

In the weaving of the starting end 119a and the finishing end 119c, every time the first auxiliary yarns 32a, 32b are opened up and down, the warp yarn shed 30a is created. Every time the warp yarn shed 30a is created, one of the second reinforced fiber bundle 41 and the second auxiliary yarn 42 is inserted into the warp yarn shed 30a. After the creation of the warp yarn sheds 30b and the insertion of the second reinforced fiber bundle 41 and the second auxiliary yarn 42 into the warp yarn sheds 30a are performed a predetermined number of times, the beat-up motion of the reed 39 is performed. Thus, in the starting end 119a and the finishing end 119c, the second reinforced fiber bundle 41 and the second auxiliary yarn 42 are alternately arranged in the circumferential direction Z of the liner 12.

In the general portion 19b, in the same manner as the first embodiment, the warp yarn sheds 30b are created using the first reinforced fiber bundles 31 and the first auxiliary yarns 32a, 32b, and the second reinforced fiber bundles 41 or the second auxiliary yarns 42 are inserted into the warp yarn sheds 30b. After the creation of the warp yarn sheds 30b and the insertion of the second reinforced fiber bundle 41 and the second auxiliary yarn 42 into the warp yarn sheds 30b are performed a predetermined number of times, the beat-up motion of the reed 39 is performed. Weft insertion is performed in the weaving of the general portion 19b the same number of times as in the weaving of the starting end 119a and the finishing end 119c.

The third embodiment provides the same advantages as the first embodiment. Further, the third embodiment provides the following advantage in addition to the same advantages as advantages (1-1), (1-3), and (1-4) of the first embodiment.

(3-1) The first reinforced fiber bundles 31 are not arranged in the starting end 119a and the finishing end 119c. Thus, the starting end 119a and the finishing end 119c are smaller than the general portion 19b in the amount of reinforced fibers per unit length in the circumferential direction Z of the liner 12. Such decrease in the amount of reinforced fibers allows the thickness of the starting end 119a and the finishing end 119c to be smaller than that of the general portion 19b.

Fourth Embodiment

The fourth embodiment of the FRP tubular body and the method for manufacturing the FRP tubular body applied to the pressure vessel and the method for manufacturing the pressure vessel will now be described with reference to FIGS. 18 to 22. The components that are the same as those of the first embodiment, including the high-pressure tank 10, the liner 12, and the general portion 19b, will not be described.

Figure 18:
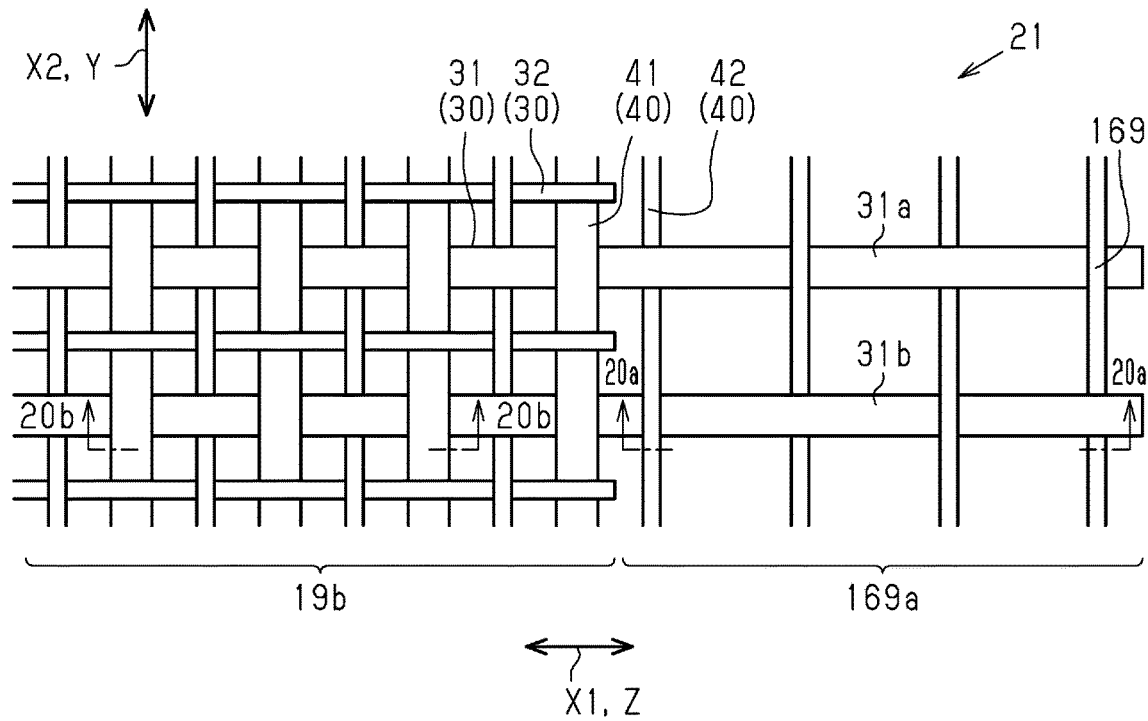
FIG. 18 is a diagram schematically showing the starting end and the general portion of the reinforced fiber sheet according to a fourth embodiment.
Figure 19:
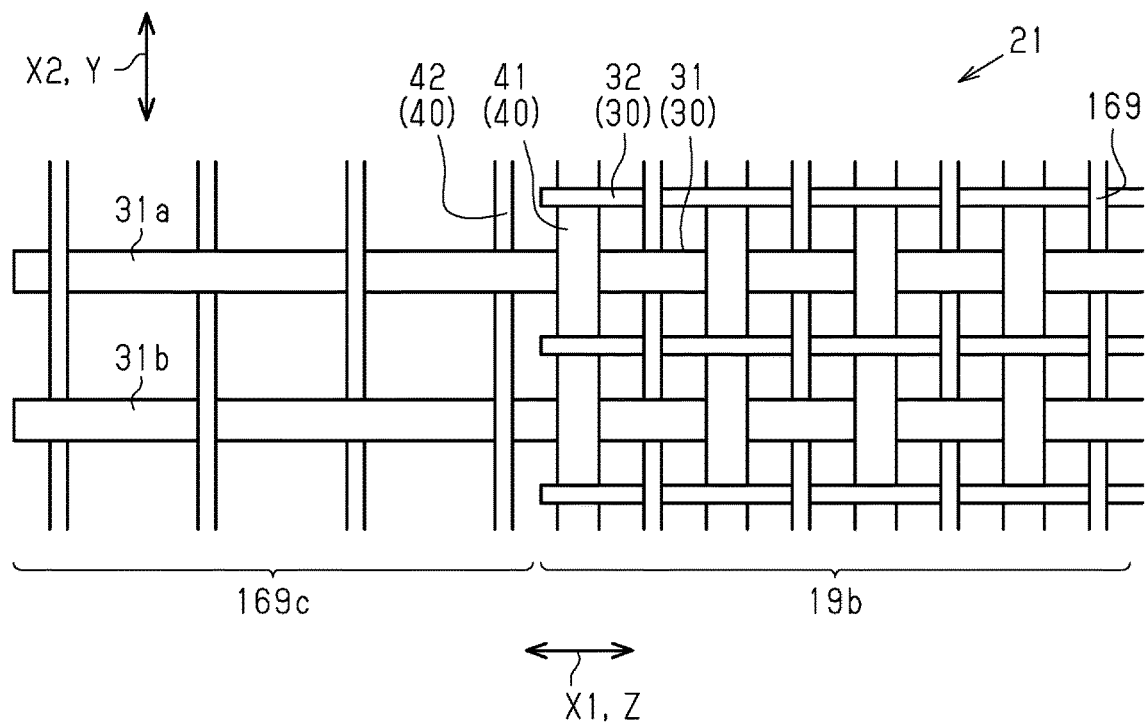
FIG. 19 is a diagram schematically showing the general portion and the finishing end of the reinforced fiber sheet according to the fourth embodiment.

As shown in FIGS. 18 and 19, the fourth embodiment includes a reinforced fiber sheet 169 with a starting end 169a and a finishing end 169c. The starting end 169a and the finishing end 169c include the first reinforced fiber bundles 31 as the warp yarns 30 and the second auxiliary yarns 42 as the weft yarns 40. In the starting end 169a and the finishing end 169c, the first auxiliary yarns 32 and the second reinforced fiber bundles 41 are not arranged. Thus, the total number N of the first reinforced fiber bundles 31, the first auxiliary yarns 32, the second reinforced fiber bundles 41, and the second auxiliary yarns 42 that exist per unit length in the circumferential direction Z of the liner 12 is smaller in the starting end 169a and the finishing end 169c than in the general portion 19b. That is, the starting end 169a and the finishing end 169c are smaller than the general portion 19b in the amount of reinforced fibers that exist per unit length in the circumferential direction Z of the liner 12. In the present embodiment, the starting end 169a and the finishing end 169c are both the decreased portions, which have a smaller total number N than the general portion 19b.

Figure 20A:
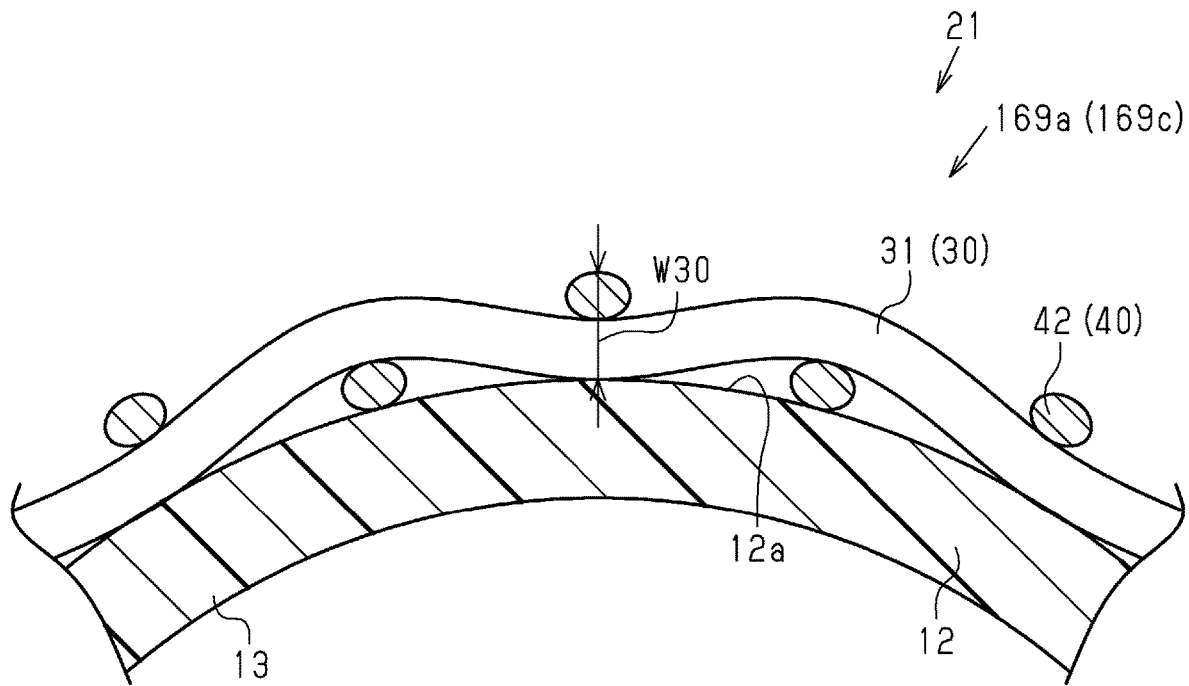
FIG. 20A is an enlarged cross-sectional view taken along line 20a-20a in FIG. 18, showing the starting end and the finishing end covering the liner according to the fourth embodiment.
Figure 20B:
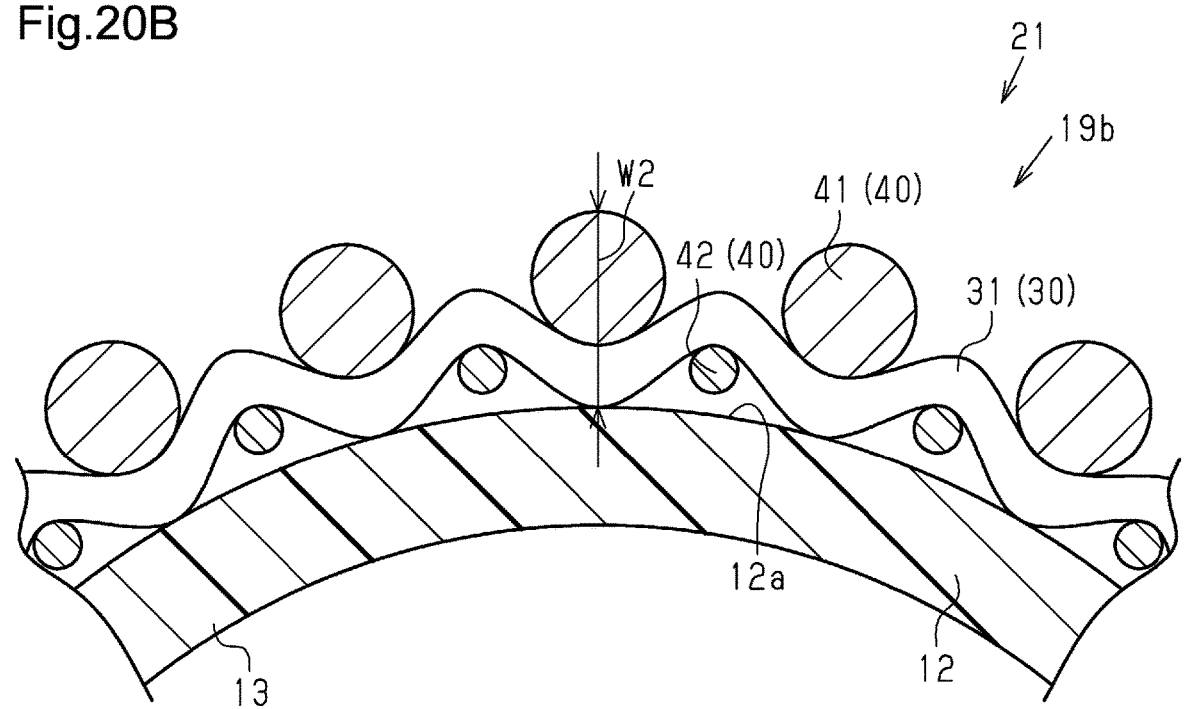
FIG. 20B is an enlarged cross-sectional view taken along line 20b-20b in FIG. 18, showing the general portion covering the liner according to the fourth embodiment.

As shown in FIG. 20A, in the starting end 169a and the finishing end 169c, the second reinforced fiber bundles 42 are flat, thin, and wide. In contrast, as shown in FIG. 20B, the second reinforced fiber bundles 42 of the general portion 19b are thicker and narrower than those of the starting end 169a and the finishing end 169c. As shown in FIGS. 20A and 20B, the second reinforced fiber bundles 41 arranged as the weft yarns 40 in the general portion 19b are thicker than the second auxiliary yarns 42 arranged as the weft yarns 40 in the starting end 169a and the finishing end 169c. Thus, in the reinforced fiber sheet 169, the thickness W30 of the starting end 169a and the finishing end 169c is smaller than the thickness W2 of the general portion 19b. Accordingly, the thickness of the reinforced fiber sheet 169 increases from the starting end 169a toward the general portion 19b and decreases from the general portion 19b toward the finishing end 169c in the circumferential direction Z of the liner 12. The thickness of the reinforced fiber sheet 169 gradually changes in the circumferential direction Z of the liner 12 between the thickness W30 of the starting end 169a and the finishing end 169c and the thickness W2 of the general portion 19b.

The method for manufacturing the high-pressure tank 10 according to the fourth embodiment will now be described.

Figure 21:
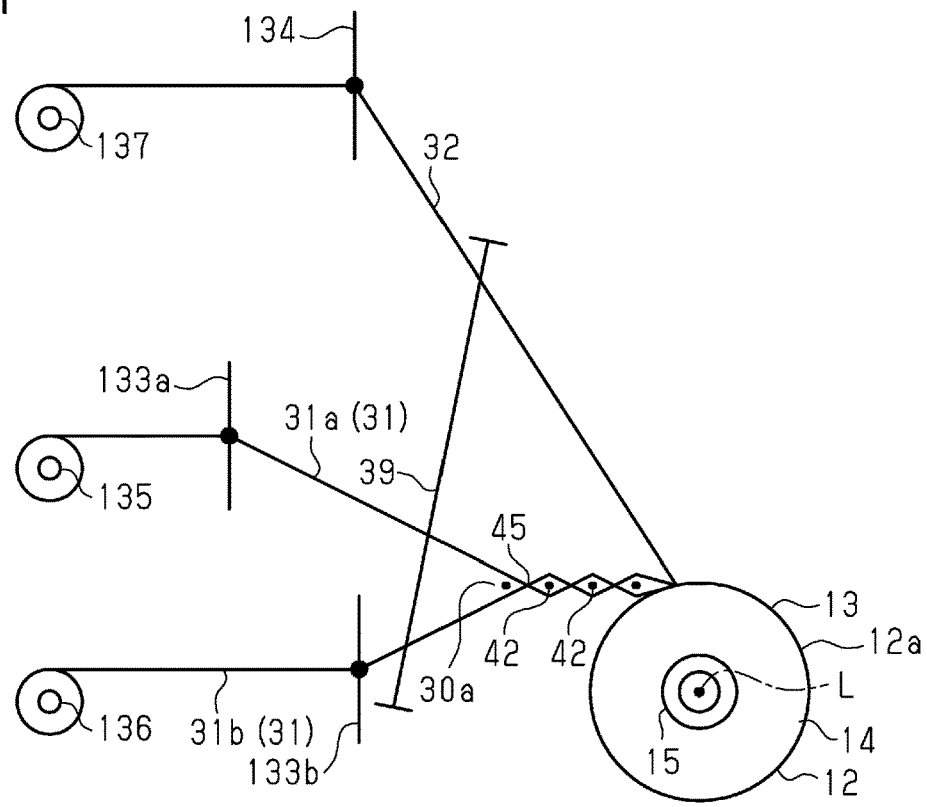
FIG. 21 is a diagram schematically showing a method for manufacturing the starting end using the loom according to the fourth embodiment.
Figure 22:
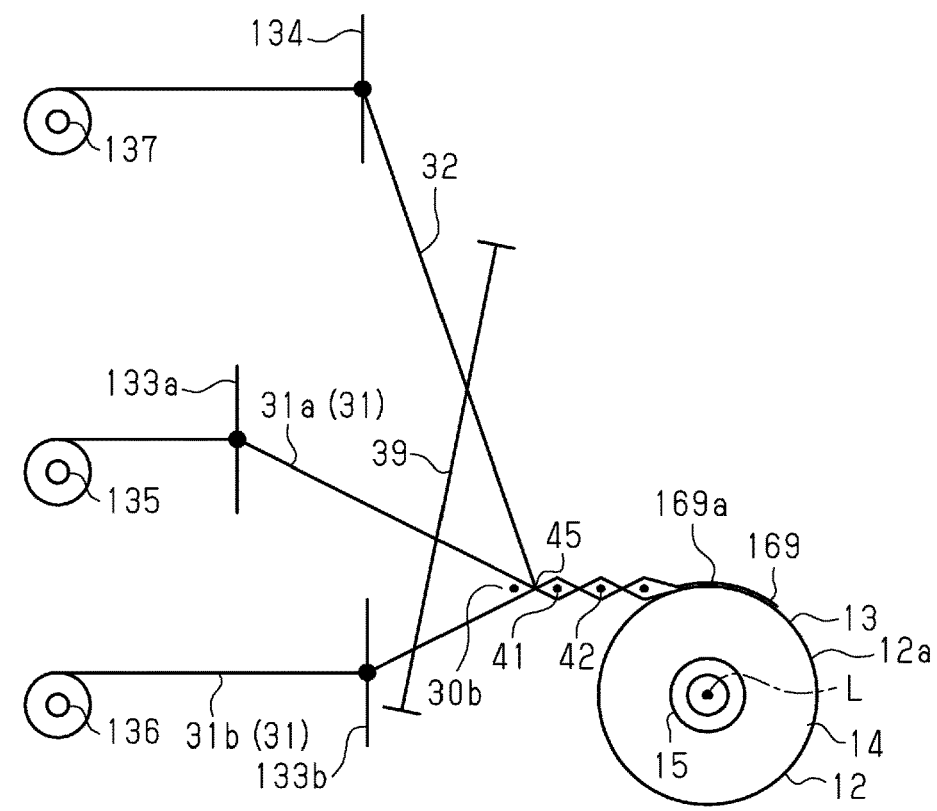
FIG. 22 is a diagram schematically showing a method for manufacturing the general portion using the loom according to the fourth embodiment.

To manufacture the high-pressure tank 10 in the fourth embodiment, the plain weave loom shown in FIGS. 21 and 22 is used to plainly weave the warp yarns 30 and the weft yarns 40 and wind the woven fabric 50 onto the liner 12 in the same manner as the first embodiment. The present embodiment differs from the first embodiment in that the first reinforced fiber bundles 31 are employed as the warp yarns 30 and the second auxiliary yarns 42 are employed as the second auxiliary yarns 42 to weave the starting end 169a and the finishing end 169c. Such difference from the first embodiment will be mainly described.

As shown in FIG. 21, the plain weave loom of the present embodiment includes two reinforced fiber heddle frames 133a, 133b, which create sheds in first reinforced fiber bundles 31a, 31b of the first reinforced fiber bundle 31 and the first auxiliary yarn 32. The first reinforced fiber bundles 31a, 31b are arranged on the upper and lower sides, respectively. The plain weave loom also includes an auxiliary yarn heddle frame 134, which creates a shed in the first auxiliary yarn 32.

The plain weave loom has a structure in which a warp beam 135 and a warp beam 136 are arranged. The warp beam 135 supplies one of the first reinforced fiber bundles 31a, 31b, namely, the first reinforced fiber bundle 31a. The warp beam 38 supplies the other one of the first reinforced fiber bundles 31a, 31b, namely, the first reinforced fiber bundle 31b. Shedding is performed by the reinforced fiber heddle frame 133a for the first reinforced fiber bundle 31a, which is let off from the warp beam 135. Shedding is performed by the reinforced fiber heddle frame 133b for the first reinforced fiber bundle 31b, which is let off from the warp beam 136. The plain weave loom also has a structure in which a warp beam 137, which supplies the first auxiliary yarn 32. Shedding is performed by the auxiliary yarn heddle frame 134 for the first auxiliary yarn 32, which is let off from the warp beam 137. The eyes of the reinforced fiber heddle frames 133a, 133b and the auxiliary yarn heddle frame 134 are shown by black circles in the drawings.

To weave the reinforced fiber sheet 169 using the above-described plain weave loom, the ends of the first reinforced fiber bundles 31a, 31b pulled out of the warp beams 135, 136 and the ends of the first auxiliary yarns 32 pulled out of the warp beams 137 are fixed to the outer circumferential surface 12a of the liner 12 using, for example, adhesive. This causes the first reinforced fiber bundles 31a, 31b and the first auxiliary yarns 32 to stretch in a state of being arranged on the body 13 and the dorm portions 14 in the axial direction Y of the liner 12 (the direction perpendicular to the sheet of FIG. 21). The first reinforced fiber bundles 31a, 31b and the first auxiliary yarns 32 extend so as to line up in the order of the first reinforced fiber bundle 31a, the first auxiliary yarn 32, the first reinforced fiber bundle 31b, and the first auxiliary yarn 32 in the axial direction Y of the liner 12.

To weave the starting end 169a, the reinforced fiber heddle frames 133a, 133b are alternately moved in the up-down direction such that the liner 12 does not rotate. This moves the reinforced fiber heddle frame 133a and the reinforced fiber heddle frame 133b in opposite directions. The reinforced fiber heddle frame 134 is provided, for example, above the reinforced fiber heddle frames 133a, 133b so as not to interfere with the movement of the first reinforced fiber bundles 31a, 31b in the up-down direction.

Unlike the reinforced fiber heddle frames 133a, 133b, the auxiliary yarn heddle frame 134 is not moved in the up-down direction. This causes the warp yarn shed 30a to be created only by the first reinforced fiber bundles 31a, 31b. Every time adjacent ones of the first reinforced fiber bundles 31a, 31b are alternately opened up and down, the warp yarn shed 30a is created. Every time the warp yarn shed 30a is created, the second auxiliary yarn 42 is inserted into the warp yarn shed 30a. After the creation of the warp yarn sheds 30a and the insertion of the second auxiliary yarns 42 into the warp yarn sheds 30a are performed a predetermined number of times, the beat-up motion of the reed 39 is performed. The first auxiliary yarns 32 do not contribute to the weaving of the starting end 169a. The first auxiliary yarns 32 extend in a state of fibers along the surface of the starting end 169a.

After the starting end 169a enters the state of extending in the predetermined range in the circumferential direction Z of the liner 12 as shown in FIG. 22, the weaving of the starting end 169a shifts to the weaving of the general portion 19b of the reinforced fiber sheet 169. To weave the general portion 19b of the reinforced fiber sheet 169, in addition to the movement of the reinforced fiber heddle frames 133a, 133b in the up-down direction, the auxiliary yarn heddle frame 134 is moved in the up-down direction such that the liner 12 does not rotate. As a result, the first reinforced fiber bundles 31a, 31b and the first auxiliary yarn 32 create the warp yarn shed 30b. Every time the first reinforced fiber bundles 31a, 31b and the first auxiliary yarn 32 are alternately opened up and down, the warp yarn shed 30a is created. Every time the warp yarn shed 30b is created, one of the second reinforced fiber bundle 41 and the second auxiliary yarn 42 is inserted into the warp yarn shed 30b. More specifically, when the first reinforced fiber bundles 31a, 31b are upwardly opened, the first auxiliary yarn 32 is downwardly opened. The second auxiliary yarn 42 is inserted into the warp yarn shed 30b created in such a manner. When the first reinforced fiber bundles 31a, 31b are downwardly opened, the first auxiliary yarn 32 is upwardly opened. The second reinforced fiber bundle 41 is inserted into the warp yarn shed 30b created in such a manner. After the creation of the warp yarn sheds 30b and the insertion of the second reinforced fiber bundle 41 and the second auxiliary yarn 42 into the warp yarn sheds 30b are performed a predetermined number of times, the beat-up motion of the reed 39 is performed.

In the weaving of the general portion 19b, the beat-up motion is performed with a larger number of warp yarns 30 than in the weaving of the starting end 169a by an amount corresponding to the number of the first auxiliary yarns 32. Thus, the total number N in the general portion 19b is larger than the total number N in the starting end 169a in the circumferential direction Z of the liner 12. That is, the general portion 19b is larger than the starting end 169a in the amount of reinforced fibers that exist per unit length in the circumferential direction Z of the liner 12.

The second reinforced fiber bundles 41, which are thicker than the second reinforced fiber bundles 41, are arranged in the general portion 19b. This increases the thickness of the general portion 19b. Thus, in the reinforced fiber sheet 169, the thickness W30 of the starting end 169a is smaller than the thickness W2 of the general portion 19b.

Further, at the start of the weaving of the general portion 19b, the first auxiliary yarns 32 in a state of fibers extend along the surface of the starting end 169a between the general portion 19b and the section where the first auxiliary yarns 32 are fixed on the outer circumferential surface 12a of the liner 12. When the weaving of the general portion 19b has progressed to a certain extent, the first auxiliary yarns 32 arranged between the general portion 19b and the section where the first auxiliary yarns 32 are fixed on the outer circumferential surface 12a of the liner 12 are removed.

When the number of laminated layers becomes the necessary one for the fabric 50 wound onto the outer circumferential surface 12a of the liner 12, the weaving of the general portion 19b shifts to the weaving of the finishing end 169c of the reinforced fiber sheet 169. To weave the finishing end 169c of the reinforced fiber sheet 169, in the same manner as the weaving of the starting end 169a, the reinforced fiber heddle frames 133a, 133b are moved in the up-down direction while the auxiliary yarn heddle frame 134 is not moved in the up-down direction. This causes the warp yarn shed 30a to be created only by the first reinforced fiber bundles 31a, 31b. Every time the warp yarn shed 30a is created, the second auxiliary yarn 42 is inserted into the warp yarn shed 30a. After the creation of the warp yarn sheds 30a and the insertion of the second auxiliary yarns 42 into the warp yarn sheds 30a are performed a predetermined number of times, the beat-up motion of the reed 39 is performed. Thus, the above-described total number N in the finishing end 169c is the same as the above-described total number N in the starting end 169a. Accordingly, the total number N in the general portion 19b is larger than the total number N in the finishing end 169c in the circumferential direction Z of the liner 12. That is, the general portion 19b is larger than the finishing end 169c in the amount of reinforced fibers that exist per unit length in the circumferential direction Z of the liner 12.

In the reinforced fiber sheet 169, the thickness W30 of the finishing end 169c is smaller than the thickness W2 of the general portion 19b. The first auxiliary yarns 32 do not contribute to the weaving of the finishing end 169c. For example, when the weaving of the general portion 19b is finished, the first auxiliary yarns 32 are removed from the reinforced fiber sheet 19 through cutting or the like of the first auxiliary yarns 32 at the end of the general portion 19b closer to the finishing end 169c.

The fourth embodiment provides the same advantages as the first embodiment. Further, the fourth embodiment provides the following advantage in addition to the same advantages as advantages (1-1), (1-3), and (1-4) of the first embodiment.

(4-1) The second reinforced fiber bundles 41 and the first auxiliary yarns 32 are not arranged in the starting end 169a and the finishing end 169c. Thus, the starting end 169a and the finishing end 169c are smaller than the general portion 19b in the amount of reinforced fibers and the number of auxiliary yarns per unit length in the circumferential direction Z of the liner 12. That is, the starting end 169a and the finishing end 169c are smaller than the general portion 19b in the amount of reinforced fibers per unit length in the circumferential direction Z of the liner 12. Such decrease in the amount of reinforced fibers and the number of auxiliary yarns allows the thickness of the starting end 169a and the finishing end 169c to be smaller than that of the general portion 19b.

Fifth Embodiment

The fifth embodiment of the FRP tubular body and the method for manufacturing the FRP tubular body applied to the pressure vessel and the method for manufacturing the pressure vessel will now be described with reference to FIGS. 23 to 27. The components that are the same as those of the fourth embodiment, including the high-pressure tank 10, the liner 12, and the general portion 19b, will not be described.

Figure 23:
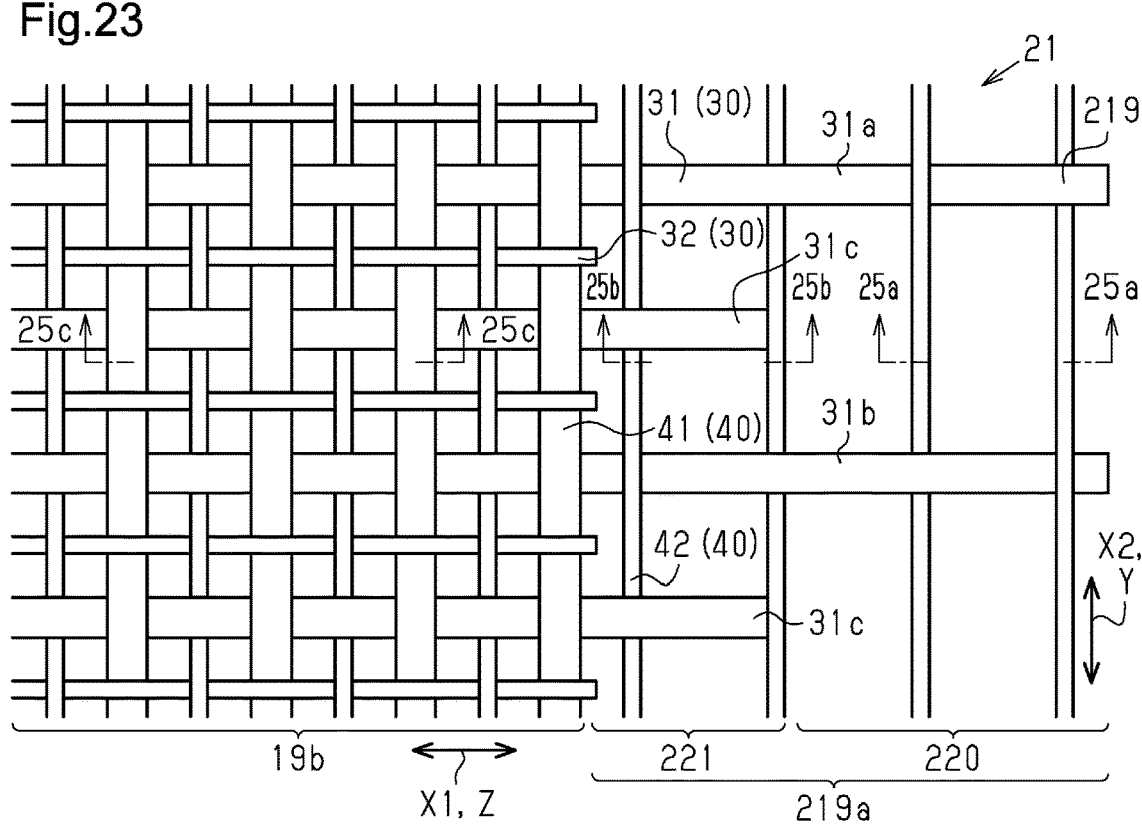
FIG. 23 is a diagram schematically showing the starting end and the general portion of the reinforced fiber sheet according to a fifth embodiment.
Figure 24:
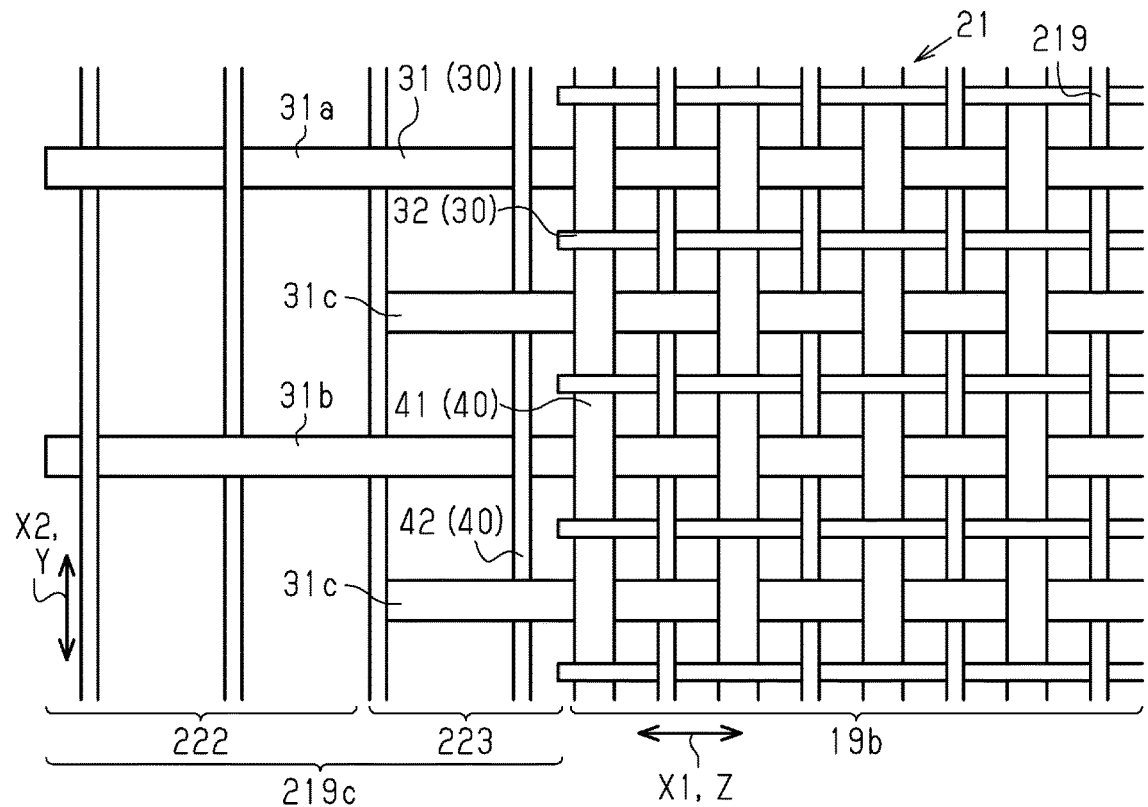
FIG. 24 is a diagram schematically showing the general portion and the finishing end of the reinforced fiber sheet according to the fifth embodiment.

As shown in FIGS. 23 and 24, the fifth embodiment includes a reinforced fiber sheet 219 with a starting end 219a and a finishing end 219c. In the same manner as the fourth embodiment, the starting end 219a and the finishing end 219c include the first reinforced fiber bundles 31 as the warp yarns 30 and the second auxiliary yarns 42 as the weft yarns 40. In the starting end 219a and the finishing end 219c, the first auxiliary yarns 32 and the second reinforced fiber bundles 41 are not arranged. Thus, the total number N of the first reinforced fiber bundles 31, the first auxiliary yarns 32, the second reinforced fiber bundles 41, and the second auxiliary yarns 42 that exist per unit length in the circumferential direction Z of the liner 12 is smaller in the starting end 219a and the finishing end 219c than in the general portion 19b. That is, the starting end 219a and the finishing end 219c are smaller than the general portion 19b in the amount of reinforced fibers per unit length in the circumferential direction Z of the liner 12.

The range from the middle of the starting end 219a to the extremity of the starting end 219a located closer to the general portion 19b in the circumferential direction Z of the liner 12 has a larger number of the first reinforced fiber bundles 31 that exist per unit length than the range from the middle of the starting end 219a to the extremity of the starting end 219a located on the side opposite from the general portion 19b in the circumferential direction Z of the liner 12. The starting end 219a includes a first starting end 220, which is from the middle of the starting end 219a to the extremity of the starting end 219a located on the side opposite from the general portion 19b in the circumferential direction Z of the liner 12 and has a small number of the first reinforced fiber bundles 31 that exist per unit length in the circumferential direction Z of the liner 12. The starting end 219a includes a second starting end 221, which is from the middle of the starting end 219a to the extremity of the starting end 219a located closer to the general portion 19b in the circumferential direction Z of the liner 12 and has a large number of the first reinforced fiber bundles 31 (i.e., a large amount of reinforced fibers) that exist per unit length in the circumferential direction Z of the liner 12.

The same applies to the finishing end 219c. The range from the middle of the finishing end 219c to the extremity of the finishing end 219c located closer to the general portion 19b in the circumferential direction Z of the liner 12 has a larger number of the first reinforced fiber bundles 31 that exist per unit length than the range from the middle of the finishing end 219c to the extremity of the finishing end 219c located on the side opposite from the general portion 19b in the circumferential direction Z of the liner 12. The starting end 219a includes a first finishing end 222, which is from the middle of the finishing end 219c to the extremity of the finishing end 219c located on the side opposite from the general portion 19b in the circumferential direction Z of the liner 12 and has a small number of the first reinforced fiber bundles 31 (i.e., a small amount of reinforced fibers) that exist per unit length in the circumferential direction Z of the liner 12. The finishing end 219c includes a second finishing end 223, which is from the middle of the finishing end 219c to the extremity of the finishing end 219c located closer to the general portion 19b in the circumferential direction Z of the liner 12 and has a large number of the first reinforced fiber bundles 31 (i.e., a large amount of reinforced fibers) that exist per unit length in the circumferential direction Z of the liner 12. In the present embodiment, the starting end 219a and the finishing end 219c are both the decreased portions, which have a smaller total number N than the general portion 19b. The first starting end 220 and the first finishing end 222 correspond to first decreased portions, and the second starting end 221 and the second finishing end 223 correspond to second decreased portions.

Figure 25A:
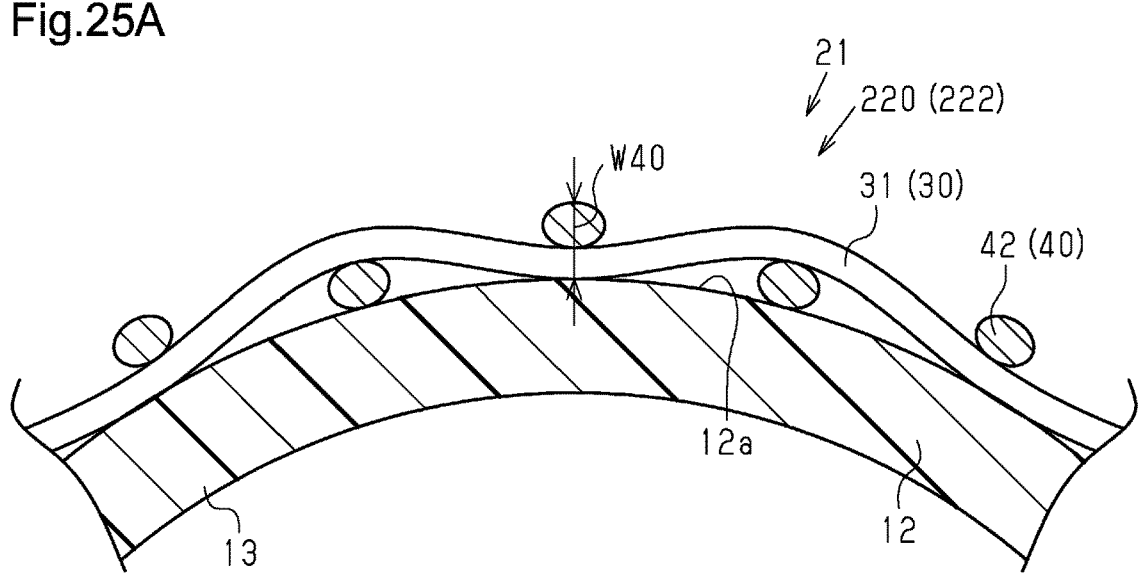
FIG. 25A is an enlarged cross-sectional view taken along line 25a-25a in FIG. 23, showing the first starting end and the first finishing end covering the liner according to the fifth embodiment.
Figure 25B:
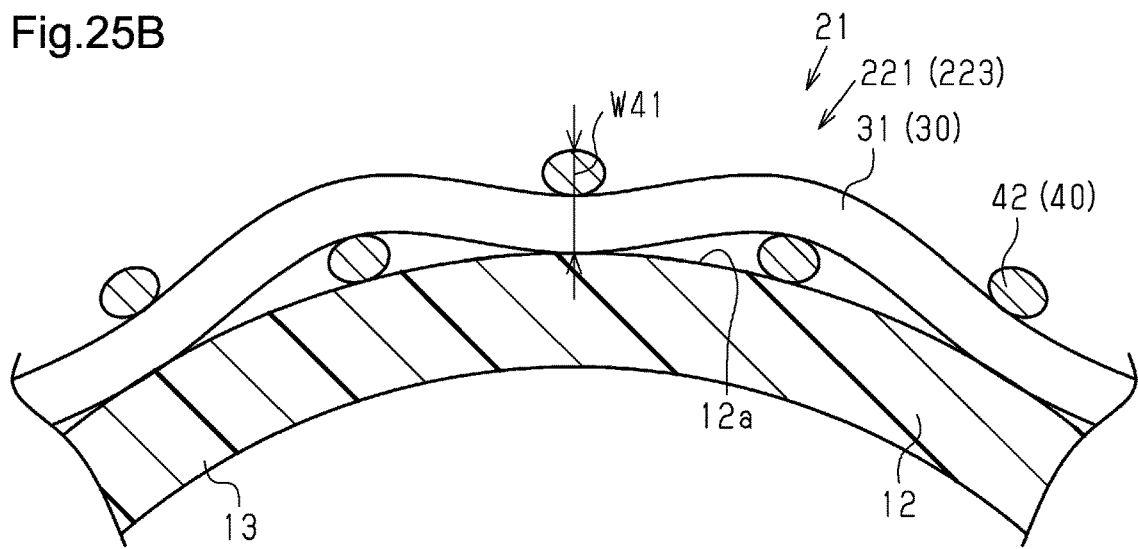
FIG. 25B is an enlarged cross-sectional view taken along line 25b-25b in FIG. 23, showing the second starting end and the second finishing end covering the liner according to the fifth embodiment.
Figure 25C:
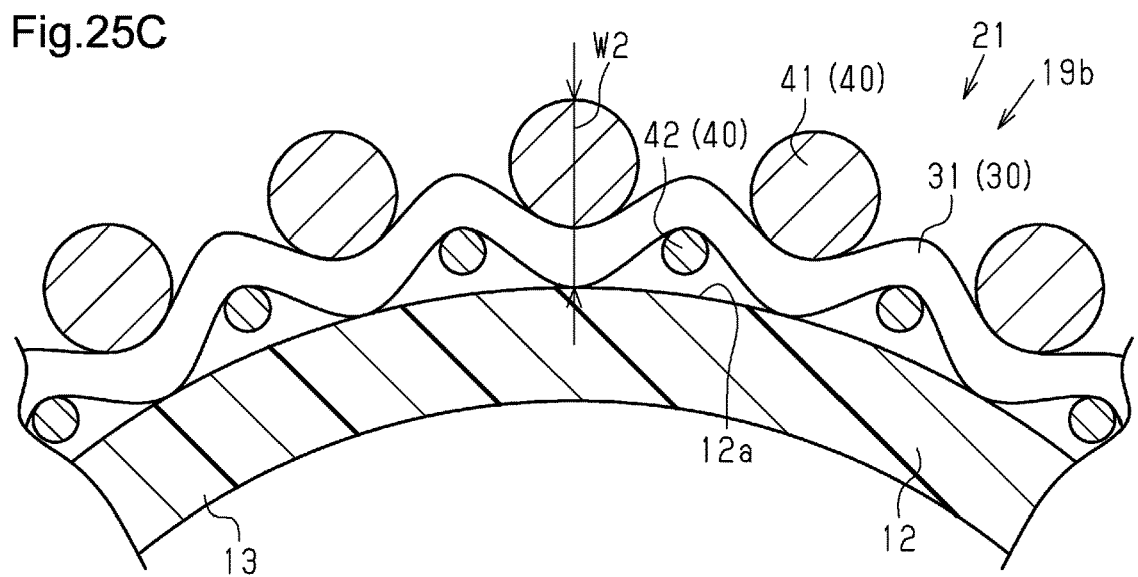
FIG. 25C is an enlarged cross-sectional view taken along line 20c-20c in FIG. 23, showing the general portion covering the liner according to the fifth embodiment.

In the first starting end 220 and the first finishing end 222 shown in FIG. 25A and the second starting end 221 and the second finishing end 223 shown in FIG. 25B, the second auxiliary yarns 42 are thin and wide. As shown in FIG. 25C, the second auxiliary yarns 42 of the general portion 19b are thicker and narrower than the second auxiliary yarns 42 of the first starting end 220 and the first finishing end 222 and the second auxiliary yarns 42 of the second starting end 221 and the second finishing end 223. Further, as shown in FIGS. 25A to 25C, the second reinforced fiber bundles 41 arranged as the weft yarns 40 in the general portion 19b are thicker than the second auxiliary yarns 42 arranged as the weft yarns 40 in the first starting end 220, the first finishing end 222, the second starting end 221, and the second finishing end 223. Thus, in the reinforced fiber sheet 219, the thickness W40 of the first starting end 220 and the first finishing end 222 and the thickness W41 of the second starting end 221 and the second finishing end 223 are smaller than the thickness W2 of the general portion 19b.

In addition, the second starting end 221 and the second finishing end 223 shown in FIG. 25B are larger than the first starting end 220 and the first finishing end 222 shown in FIG. 25A in the number of the first reinforced fiber bundles 31 that exist per unit length in the circumferential direction Z of the liner 12. The thicknesses of the second starting end 221 and the second finishing end 223 are accordingly increased by the pressing of adjacent ones of the first reinforced fiber bundles 31 to each other. Thus, the thickness W41 is larger than the thickness W40. Accordingly, the thickness of the reinforced fiber sheet 219 gradually increases from the starting end 219a toward the general portion 19b and gradually decreases from the general portion 19b toward the finishing end 219c in the circumferential direction Z of the liner 12.

The method for manufacturing the high-pressure tank 10 according to the fifth embodiment will now be described.

Figure 26:
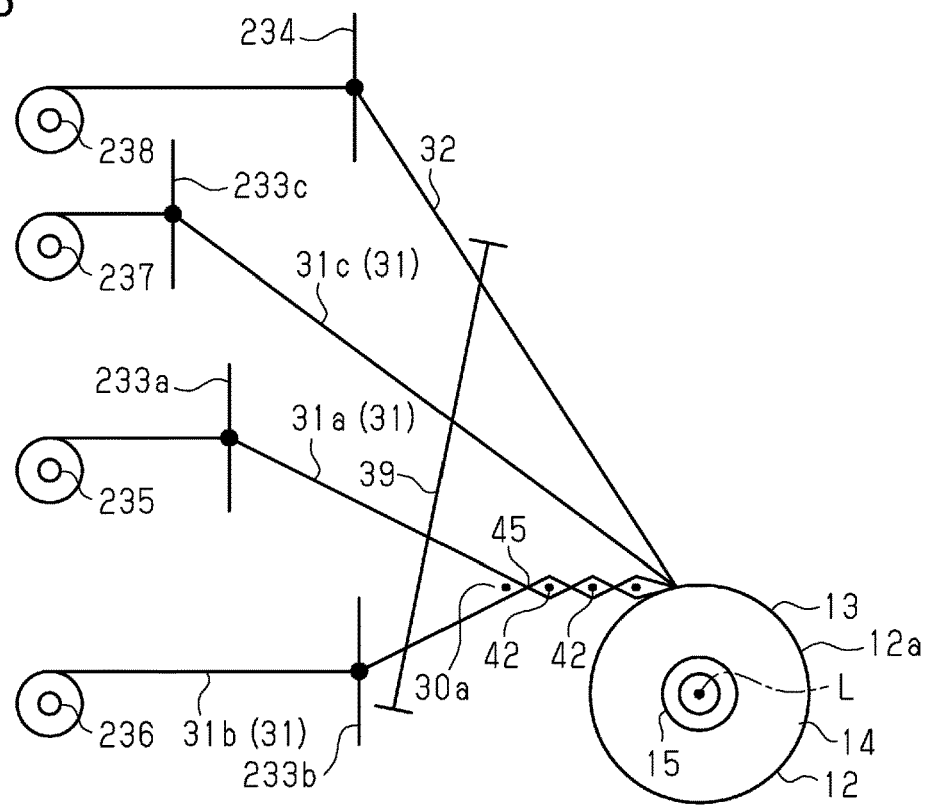
FIG. 26 is a diagram schematically showing a method for manufacturing the starting end using the loom according to the fifth embodiment.
Figure 27:
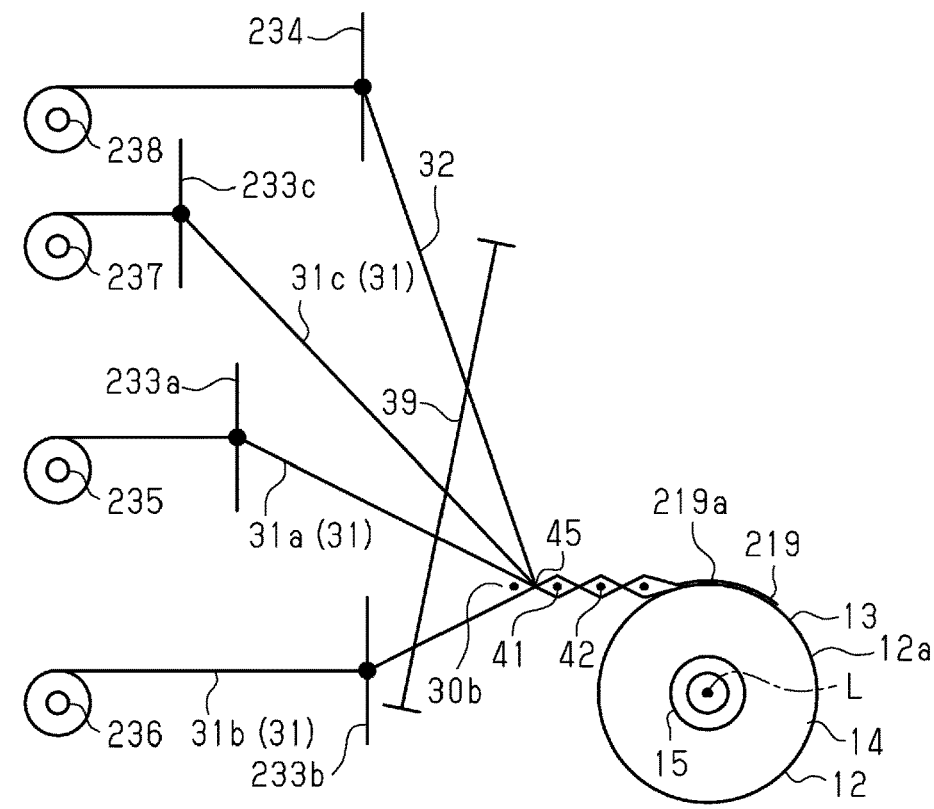
FIG. 27 is a diagram schematically showing a method for manufacturing the general portion using the loom according to the fifth embodiment.

To manufacture the high-pressure tank 10 in the fifth embodiment, the plain weave loom shown in FIGS. 26 and 27 is used to plainly weave the warp yarns 30 and the weft yarns 40 and wind the woven fabric 50 onto the liner 12. The present embodiment differs from the fourth embodiment in that the number of the first reinforced fiber bundles 31 arranged as the warp yarns 30 is changed from the middle of the starting end 219a and the finishing end 219c in the circumferential direction Z of the liner 12 in the weaving of the starting end 219a and the finishing end 219c. Such difference from the fourth embodiment will be mainly described.

As shown in FIG. 26, the plain weave loom of the present embodiment includes three reinforced fiber heddle frames 233a, 233b, 233c, which create sheds in first reinforced fiber bundles 31a, 31b, 31c of the first reinforced fiber bundle 31 and the first auxiliary yarn 32. The first reinforced fiber bundles 31a, 31b, 31c are vertically arranged in a separate manner. The plain weave loom also includes an auxiliary yarn heddle frame 234, which creates a shed in the first auxiliary yarn 32.

The plain weave loom has a structure in which a warp beam 235, a warp beam 236, and a warp beam 237 are arranged. Of the first reinforced fiber bundles 31a, 31b, 31c, the warp beam 235 supplies the first reinforced fiber bundle 31a, the warp beam 236 supplies the first reinforced fiber bundle 31b, and the warp beam 237 supplies the first reinforced fiber bundle 31c. Shedding is performed by the reinforced fiber heddle frame 233a for the first reinforced fiber bundle 31a, which is let off from the warp beam 235. Shedding is performed by the reinforced fiber heddle frame 233b for the first reinforced fiber bundle 31b, which is let off from the warp beam 236. Shedding is performed by the reinforced fiber heddle frame 233c for the first reinforced fiber bundle 31c, which is let off from the warp beam 237. The plain weave loom also has a structure in which a warp beam 238, which supplies the first auxiliary yarn 32. Shedding is performed by the auxiliary yarn heddle frame 234 for the first auxiliary yarn 32, which is let off from the warp beam 238. The eyes of the reinforced fiber heddle frames 233a, 233b, 233c and the auxiliary yarn heddle frame 234 are shown by black circles in the drawings.

To weave the reinforced fiber sheet 219 using the above-described plain weave loom, the ends of the first reinforced fiber bundles 31a, 31b, 31c pulled out of the warp beams 235, 236, 237 and the ends of the first auxiliary yarns 32 pulled out of the warp beam 238 are fixed to the outer circumferential surface 12a of the liner 12 using, for example, adhesive. This causes the first reinforced fiber bundles 31a, 31b, 31c and the first auxiliary yarns 32 to stretch in a state of being arranged on the body 13 and the dorm portions 14 in the axial direction Y of the liner 12 (the direction perpendicular to the sheet of FIG. 26). The first reinforced fiber bundles 31a, 31b, 31c and the first auxiliary yarns 32 extend so as to line up in the order of the first reinforced fiber bundle 31a, the first auxiliary yarn 32, the first reinforced fiber bundle 31c, the first auxiliary yarn 32, the first reinforced fiber bundle 31b, the first auxiliary yarn 32, the first reinforced fiber bundle 31c, and the first auxiliary yarn 32 in the axial direction Y of the liner 12.

To weave the first starting end 220 of the starting end 219a, the reinforced fiber heddle frames 233a, 233b are alternately moved in the up-down direction such that the liner 12 does not rotate. This moves the reinforced fiber heddle frame 233a and the reinforced fiber heddle frame 233b in opposite directions. The reinforced fiber heddle frame 233c and the auxiliary yarn heddle frame 234 are provided, for example, above the reinforced fiber heddle frames 233a, 233b so as not to interfere with the movement of the first reinforced fiber bundles 31a, 31b in the up-down direction. Unlike the reinforced fiber heddle frames 233a, 233b, the reinforced fiber heddle frame 233c and auxiliary yarn heddle frame 234 are not moved in the up-down direction. This causes the warp yarn shed 30a to be created only by the first reinforced fiber bundles 31a, 31b. Every time adjacent ones of the first reinforced fiber bundles 31a, 31b are alternately opened up and down, the warp yarn shed 30a is created. Every time the warp yarn shed 30a is created, the second auxiliary yarn 42 is inserted into the warp yarn shed 30a. After the creation of the warp yarn sheds 30a and the insertion of the second auxiliary yarns 42 into the warp yarn sheds 30a are performed a predetermined number of times, the beat-up motion of the reed 39 is performed. The first reinforced fiber bundles 31c and the first auxiliary yarns 32 do not contribute to the weaving of the first starting end 220. The first reinforced fiber bundles 31c and the first auxiliary yarns 32 extend in a state of fibers along the surface of the first starting end 220.

After the first starting end 220 enters the state of extending in the predetermined range in the circumferential direction Z of the liner 12, the weaving of the first starting end 220 shifts to the weaving of the second starting end 221. To weave the second starting end 221, in addition to the movement of the reinforced fiber heddle frames 233a, 233b in the up-down direction, the reinforced fiber heddle frame 233c is moved in the up-down direction such that the liner 12 does not rotate. This causes the warp yarn shed 30a to be created only by the first reinforced fiber bundles 31a, 31b, 31c. Every time the first reinforced fiber bundles 31a, 31b, 31c are alternately opened up and down, the warp yarn shed 30a is created. For example, when the first reinforced fiber bundles 31a, 31b are upwardly opened, the first reinforced fiber bundle 31c is downwardly opened. When the first reinforced fiber bundles 31a, 31b are downwardly opened, the first reinforced fiber bundle 31c is upwardly opened. Every time the warp yarn shed 30a is created, the second auxiliary yarn 42 is inserted into the warp yarn shed 30a. After the creation of the warp yarn sheds 30a and the insertion of the second auxiliary yarns 42 into the warp yarn sheds 30a are performed a predetermined number of times, the beat-up motion of the reed 39 is performed.

Further, at the start of the weaving of the second starting end 221, the first reinforced fiber bundles 31c and the first auxiliary yarns 32 in a state of fibers extend along the surface of the first starting end 220 between the second starting end 221 and the section where the first reinforced fiber bundles 31c and the first auxiliary yarns 32 are fixed on the outer circumferential surface 12a of the liner 12. When the weaving of the second starting end 221 has progressed to a certain extent, the first reinforced fiber bundles 31c arranged between the second starting end 221 and the section where the first reinforced fiber bundles 31c are fixed on the outer circumferential surface 12a of the liner 12 are removed through, for example, cutting. The first auxiliary yarns 32 are not removed in a state of extending along the surface of the second starting end 221.

After the second starting end 221 enters the state of extending in the predetermined range in the circumferential direction Z of the liner 12 as shown in FIG. 27, the weaving of the second starting end 221 shifts to the weaving of the general portion 19b of the reinforced fiber sheet 219. To weave the general portion 19b of the reinforced fiber sheet 219, in addition to the movement of the reinforced fiber heddle frames 233a, 233b, 233c in the up-down direction, the auxiliary yarn heddle frame 234 is moved in the up-down direction such that the liner 12 does not rotate. As a result, the first reinforced fiber bundles 31a, 31b, 31c and the first auxiliary yarn 32 create the warp yarn shed 30b. Every time the first reinforced fiber bundles 31a, 31b, 31c and the first auxiliary yarn 32 are alternately opened up and down, the warp yarn shed 30a is created. Every time the warp yarn shed 30b is created, one of the second reinforced fiber bundle 41 and the second auxiliary yarn 42 is inserted into the warp yarn shed 30b. More specifically, when the first reinforced fiber bundles 31a, 31b, 31c are upwardly opened, the first auxiliary yarn 32 is downwardly opened. The second auxiliary yarn 42 is inserted into the warp yarn shed 30b created in such a manner. When the first reinforced fiber bundles 31a, 31b, 31c are downwardly opened, the first auxiliary yarn 32 is upwardly opened. The second reinforced fiber bundle 41 is inserted into the warp yarn shed 30b created in such a manner. After the creation of the warp yarn sheds 30b and the insertion of the second reinforced fiber bundle 41 and the second auxiliary yarn 42 into the warp yarn sheds 30b are performed a predetermined number of times, the beat-up motion of the reed 39 is performed.

In the weaving of the general portion 19b, the beat-up motion is performed with a larger number of warp yarns 30 than in the weaving of the first starting end 220 and the second starting end 221 by an amount corresponding to the number of the first auxiliary yarns 32. Thus, the total number N in the general portion 19b is larger than the total number N in the first starting end 220 and the second starting end 221 in the circumferential direction Z of the liner 12. That is, the general portion 19b is larger than the first starting end 220 and the second starting end 221 in the amount of reinforced fibers that exist per unit length in the circumferential direction Z of the liner 12.

The second reinforced fiber bundles 41, which are thicker than the second reinforced fiber bundles 41, are arranged in the general portion 19b. This increases the thickness of the general portion 19b. Thus, in the reinforced fiber sheet 219, the thickness W40 of the first starting end 220 and the and the thickness W41 of the and the second finishing end 223 are smaller than the thickness W2 of the general portion 19b.

Further, at the start of the weaving of the general portion 19b, the first auxiliary yarns 32 in a state of fibers extend along the surface of the starting end 219a between the general portion 19b and the section where the first auxiliary yarns 32 are fixed on the outer circumferential surface 12a of the liner 12. When the weaving of the general portion 19b has progressed to a certain extent, the first auxiliary yarns 32 arranged between the general portion 19b and the section where the first auxiliary yarns 32 are fixed on the outer circumferential surface 12a of the liner 12 are removed.

When the number of laminated layers becomes the necessary one for the fabric 50 wound onto the outer circumferential surface 12a of the liner 12, the weaving of the general portion 19b shifts to the weaving of the second finishing end 223 of the reinforced fiber sheet 219. To weave the second finishing end 223, in the same manner as the weaving of the second starting end 221, the reinforced fiber heddle frames 233a, 233b, 233c are moved in the up-down direction while the auxiliary yarn heddle frame 234 is not moved in the up-down direction. This causes the warp yarn shed 30a to be created only by the first reinforced fiber bundles 31a, 31b, 31c. Every time the warp yarn shed 30a is created, the second auxiliary yarn 42 is inserted into the warp yarn shed 30a. After the creation of the warp yarn sheds 30a and the insertion of the second auxiliary yarns 42 into the warp yarn sheds 30a are performed a predetermined number of times, the beat-up motion of the reed 39 is performed. Thus, the above-described total number N in the second finishing end 223 is the same as the above-described total number N in the second starting end 221. Accordingly, the total number N in the general portion 19b is larger than the total number N in the second finishing end 223 in the circumferential direction Z of the liner 12. That is, the general portion 19b is larger than the second finishing end 223 in the amount of reinforced fibers that exist per unit length in the circumferential direction Z of the liner 12.

After the second finishing end 223 enters the state of extending in the predetermined range in the circumferential direction Z of the liner 12, the weaving of the second finishing end 223 shifts to the weaving of the first finishing end 222. To weave the first finishing end 222, in the same manner as the weaving of the first starting end 220 the reinforced fiber heddle frames 233a, 233b are moved in the up-down direction while the reinforced fiber heddle frame 233c and the auxiliary yarn heddle frame 234 are not moved in the up-down direction. This causes the warp yarn shed 30a to be created only by the first reinforced fiber bundles 31a, 31b. Every time the warp yarn shed 30a is created, the second auxiliary yarn 42 is inserted into the warp yarn shed 30a. After the creation of the warp yarn sheds 30a and the insertion of the second auxiliary yarns 42 into the warp yarn sheds 30a are performed a predetermined number of times, the beat-up motion of the reed 39 is performed. Thus, the above-described total number N in the first finishing end 222 is the same as the above-described total number N in the first starting end 220. Accordingly, the total number N in the general portion 19b is larger than the total number N in the first finishing end 222 in the circumferential direction Z of the liner 12. That is, the general portion 19b is larger than the first finishing end 222 in the amount of reinforced fibers that exist per unit length in the circumferential direction Z of the liner 12.

In the reinforced fiber sheet 219, the thickness W40 of the first finishing end 222 and the thickness W41 of the and the second finishing end 223 are smaller than the thickness W2 of the general portion 19b. The first auxiliary yarns 32 contribute to neither the weaving of the first finishing end 222 nor the weaving of the second finishing end 223. The first reinforced fiber bundles 31c do not contribute to the weaving of the first finishing end 222. For example, when the weaving of the general portion 19b is finished, the first auxiliary yarns 32 are removed from the reinforced fiber sheet 219 through cutting or the like of the first auxiliary yarns 32 at the end of the general portion 19b closer to the finishing end 219c. Further, for example, when the weaving of the general portion 19b is finished, the first reinforced fiber bundles 31c are removed from the reinforced fiber sheet 219 through cutting or the like of the first reinforced fiber bundle 31c at the extremity of the second finishing end 223 closer to the first finishing end 222.

The fifth embodiment provides the same advantages as the first embodiment. Further, the fifth embodiment provides the following advantage in addition to the same advantages as advantages (1-1), (1-3), and (1-4) of the first embodiment and advantage (4-1) of the fourth embodiment.

(5-1) In the circumferential direction Z of the liner 12, the thickness gradually increases in the order of the first starting end 220, the second starting end 221, and the general portion 19b. Thus, as compared with when the first starting end 220 and the second starting end 221 are set as a starting end having a fixed thickness, the steps produced in the surface of the high-pressure tank 10 are reduced. Further, in the circumferential direction Z of the liner 12, the thickness gradually increases in the order of the first finishing end 222, the second finishing end 223, and the general portion 19b. Thus, as compared with when the first finishing end 222 and the second finishing end 223 are set as a finishing end having a fixed thickness, the steps produced in the surface of the high-pressure tank 10 are reduced.

Sixth Embodiment

The sixth embodiment of the FRP tubular body and the method for manufacturing the FRP tubular body applied to the pressure vessel and the method for manufacturing the pressure vessel will now be described with reference to FIGS. 28 to 31. The components that are the same as those of the fourth embodiment, including the high-pressure tank 10, the liner 12, and the general portion 19b, will not be described.

Figure 28:
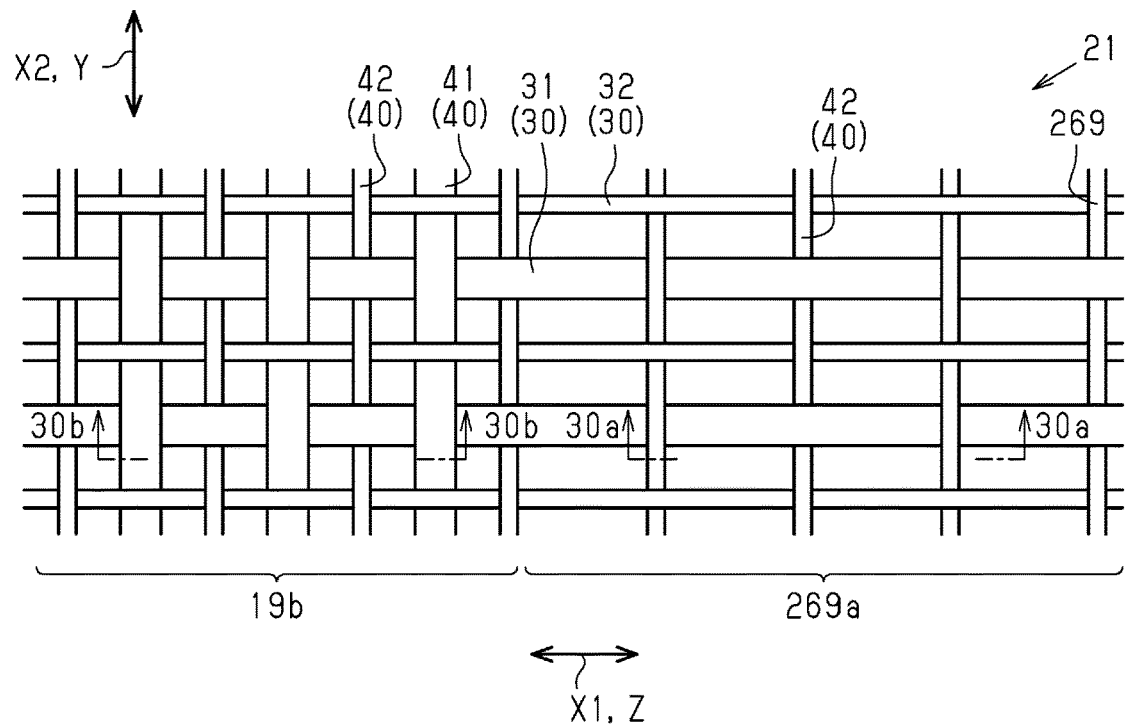
FIG. 28 is a diagram schematically showing the starting end and the general portion of the reinforced fiber sheet according to a sixth embodiment.
Figure 29:
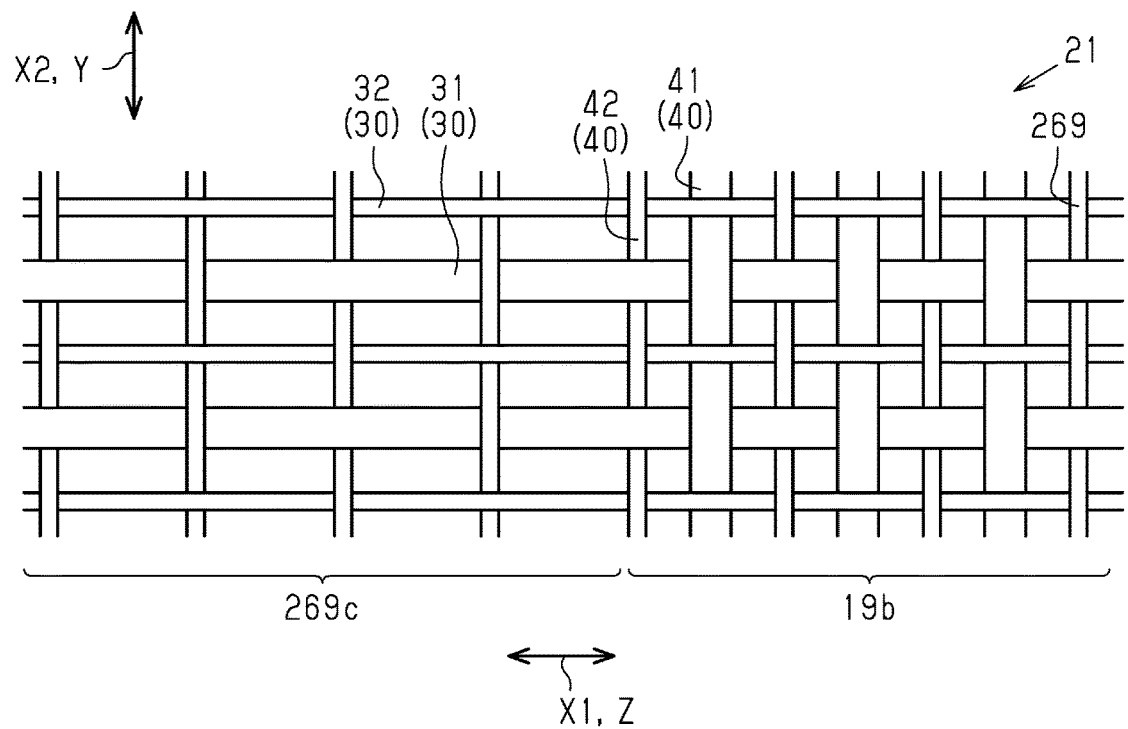
FIG. 29 is a diagram schematically showing the general portion and the finishing end of the reinforced fiber sheet according to the sixth embodiment.

As shown in FIGS. 28 and 29, the sixth embodiment includes a reinforced fiber sheet 269 with a starting end 269a and a finishing end 269c, which include the first reinforced fiber bundles 31 and the first auxiliary yarns 32 as the warp yarns 30 and the second auxiliary yarns 42 as the weft yarns 40. In the starting end 269a and the finishing end 269c, the second reinforced fiber bundles 41 are not arranged. Thus, the total number N of the first reinforced fiber bundles 31, the first auxiliary yarns 32, the second reinforced fiber bundles 41, and the second auxiliary yarns 42 that exist per unit length in the circumferential direction Z of the liner 12 is smaller in the starting end 269a and the finishing end 269c than in the general portion 19b. That is, the starting end 269a and the finishing end 269c are smaller than the general portion 19b in the amount of reinforced fibers per unit length in the circumferential direction Z of the liner 12. In the present embodiment, the starting end 269a and the finishing end 269c are both the decreased portions, which have a smaller total number N than the general portion 19b.

Figure 30A:
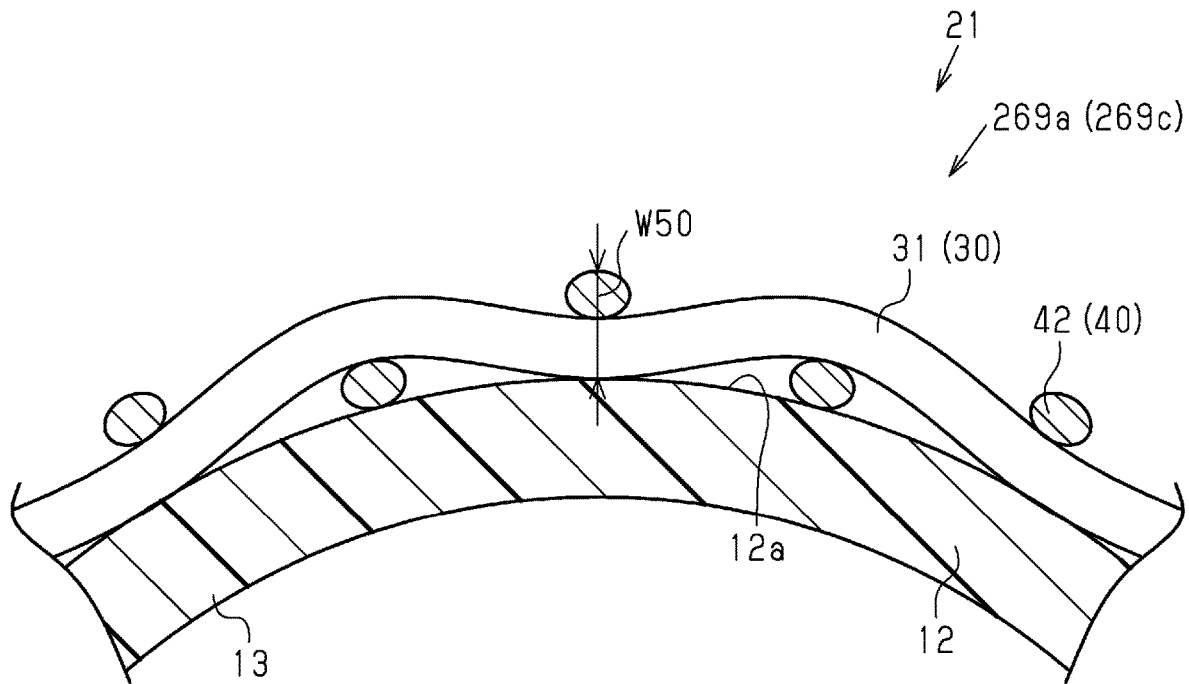
FIG. 30A is an enlarged cross-sectional view taken along line 30a-30a in FIG. 28, showing the starting end and the finishing end covering the liner according to the sixth embodiment.
Figure 30B:
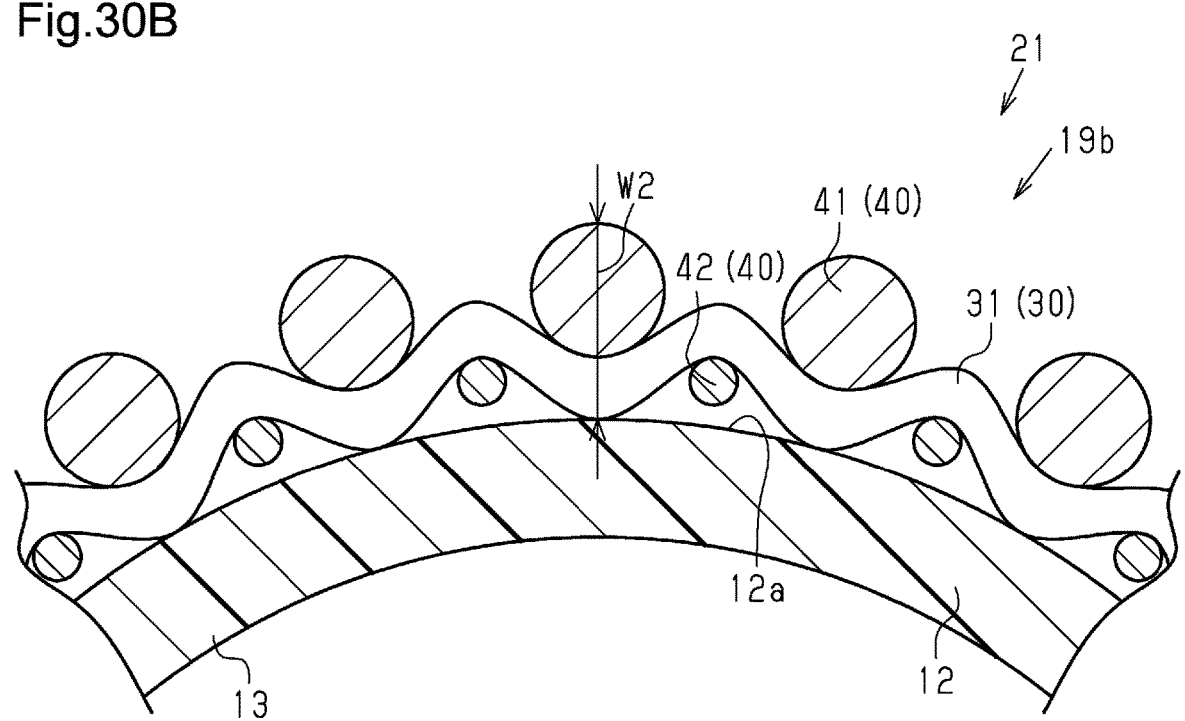
FIG. 30B is an enlarged cross-sectional view taken along line 30b-30b in FIG. 28, showing the general portion covering the liner according to the sixth embodiment.

As shown in FIG. 30A, in the starting end 269a and the finishing end 269c, the second reinforced fiber bundles 42 are flat, thin, and wide. In contrast, as shown in FIG. 30B, the second reinforced fiber bundles 42 of the general portion 19b are thicker and narrower than those of the starting end 269a and the finishing end 269c. As shown in FIGS. 30A and 30B, the second reinforced fiber bundles 41 arranged as the weft yarns 40 in the general portion 19b are thicker than the second auxiliary yarns 42 arranged as the weft yarns 40 in the starting end 269a and the finishing end 269c. Thus, in the reinforced fiber sheet 269, the thickness W50 of the starting end 269a and the finishing end 269c is smaller than the thickness W2 of the general portion 19b. Accordingly, the thickness of the reinforced fiber sheet 269 increases from the starting end 269a toward the general portion 19b and decreases from the general portion 19b toward the finishing end 269c in the circumferential direction Z of the liner 12. The thickness of the reinforced fiber sheet 269 gradually changes in the circumferential direction Z of the liner 12 between the thickness W50 of the starting end 269a and the finishing end 269c and the thickness W2 of the general portion 19b.

The method for manufacturing the high-pressure tank 10 according to the sixth embodiment will now be described.

Figure 31:
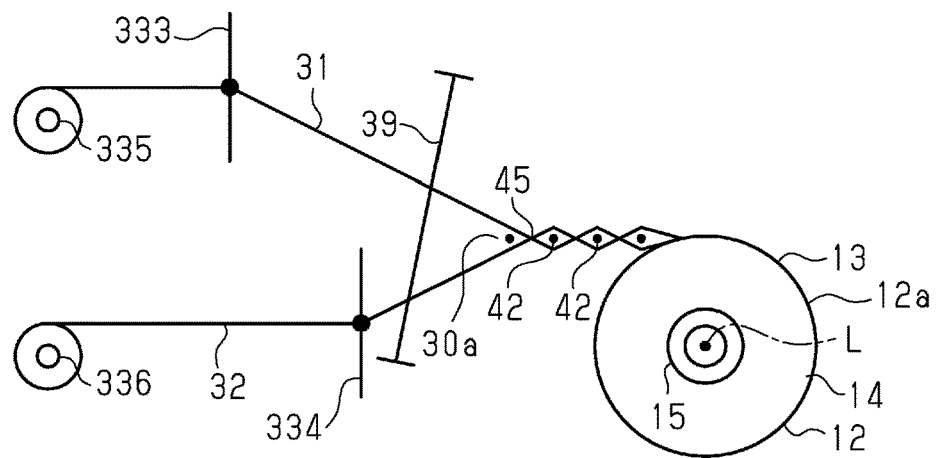
FIG. 31 is a diagram schematically showing a method for manufacturing the reinforced fiber sheet using the loom according to the sixth embodiment.

To manufacture the high-pressure tank 10 in the sixth embodiment, the plain weave loom shown in FIG. 31 is used to plainly weave the warp yarns 30 and the weft yarns 40 and wind the woven fabric 50 onto the liner 12. The plain weave loom of the present embodiment differs from the fourth embodiment in that the first reinforced fiber bundles 31 and the first auxiliary yarns 32 are employed as the warp yarns 30 to weave the starting end 269a and the finishing end 269c. Such difference from the fourth embodiment will be mainly described.

As shown in FIG. 31, the plain weave loom of the present embodiment includes a reinforced fiber heddle frame 333, which creates a shed in the first reinforced fiber bundle 31 serving as the warp yarn 30, and an auxiliary yarn heddle frame 334, which creates a shed in the first auxiliary yarn 32 serving as the warp yarn 30. The plain weave loom has a structure in which a warp beam 335, which supplies the first reinforced fiber bundle 31, and a warp beam 336, which supplies the first auxiliary yarn 32. The eyes of the reinforced fiber heddle frame 333 and the auxiliary yarn heddle frame 334 are shown by black circles in the drawings.

To weave the reinforced fiber sheet 269 using the above-described plain weave loom, the ends of the first reinforced fiber bundles 31 pulled out of the warp beam 335 and the ends of the first auxiliary yarns 32 pulled out of the warp beam 336 are fixed to the outer circumferential surface 12a of the liner 12 using, for example, adhesive. This causes the first reinforced fiber bundles 31 and the first auxiliary yarns 32 to stretch in a state of being arranged on the body 13 and the dorm portions 14 in the axial direction Y of the liner 12 (the direction perpendicular to the sheet of FIG. 31). The first reinforced fiber bundles 31 and the first auxiliary yarns 32 extend so as to alternately line up the axial direction Y of the liner 12.

To weave the starting end 269a, the reinforced fiber heddle frame 333 and the auxiliary yarn heddle frame 334 are alternately moved in the up-down direction such that the liner 12 does not rotate. This moves the reinforced fiber heddle frame 333 and the auxiliary yarn heddle frame 334 in opposite directions. As a result, the first reinforced fiber bundles 31 and the first auxiliary yarns 32 create the warp yarn sheds 30a. Every time adjacent ones of the first reinforced fiber bundles 31 and the first auxiliary yarns 32 are alternately opened up and down, the warp yarn shed 30a is created. Every time the warp yarn shed 30a is created, the second auxiliary yarn 42 is inserted into the warp yarn shed 30a. After the creation of the warp yarn sheds 30a and the insertion of the second auxiliary yarns 42 into the warp yarn sheds 30a are performed a predetermined number of times, the beat-up motion of the reed 39 is performed.

After the starting end 269a enters the state of extending in the predetermined range in the circumferential direction Z of the liner 12, the weaving of the starting end 269a shifts to the weaving of the general portion 19b of the reinforced fiber sheet 269. To weave the general portion 19b of the reinforced fiber sheet 269, the reinforced fiber heddle frame 333 and the auxiliary yarn heddle frame 334 are alternately moved in the same manner as the weaving of the starting end 269a. As a result, the first reinforced fiber bundles 31 and the first auxiliary yarns 32 create the warp yarn sheds 30a. Every time the warp yarn shed 30a is created, one of the second reinforced fiber bundle 41 and the second auxiliary yarn 42 is inserted into the warp yarn shed 30b. More specifically, when the first reinforced fiber bundle 31 is upwardly opened and the first auxiliary yarn 32 is downwardly opened, the second auxiliary yarn 42 is inserted into the created warp yarn shed 30a. When the first reinforced fiber bundle 31 is downwardly opened and the first auxiliary yarn 32 is upwardly opened, the second reinforced fiber bundle 41 is inserted into the created warp yarn shed 30a. After the creation of the warp yarn sheds 30b and the insertion of the second reinforced fiber bundle 41 and the second auxiliary yarn 42 into the warp yarn sheds 30a are performed a predetermined number of times, the beat-up motion of the reed 39 is performed.

The above-described predetermined number of times of weft insertion in the case of weaving the general portion 19b is the same as the predetermined number of times of weft insertion in the case of weaving the starting end 269a. For example, the beat-up motion of the reed 39 in the case of weaving the general portion 19b is performed when the insertion of the second auxiliary yarn 42 into the warp yarn shed 30a is performed the same number of times as the insertion of the second auxiliary yarn 42 into the warp yarn shed 30a in the case of weaving the starting end 269a. Thus, the beat-up motion is performed a larger number of times in the weaving of the general portion 19b than in the weaving of the starting end 269a by an amount corresponding to the number of times the second reinforced fiber bundle 41 is inserted into the warp yarn shed 30a. The total number N in the general portion 19b is larger than the total number N in the starting end 269a in the circumferential direction Z of the liner 12. That is, the general portion 19b is larger than the starting end 269a in the amount of reinforced fibers that exist per unit length in the circumferential direction Z of the liner 12. Further, in the general portion 19b, the arrangement of many weft yarns 40 causes adjacent ones of the weft yarns 40 to press each other. This changes the shapes of the weft yarns 40 so as to become thicker. Thus, in the reinforced fiber sheet 269, the thickness W50 of the starting end 269a is smaller than the thickness W2 of the general portion 19b.

When the number of laminated layers becomes the necessary one for the fabric 50 wound onto the outer circumferential surface 12a of the liner 12, the weaving of the general portion 19b shifts to the weaving of the finishing end 269c of the reinforced fiber sheet 269. To weave the finishing end 269c of the reinforced fiber sheet 269, in the same manner as the weaving of the starting end 269a, the reinforced fiber heddle frame 333 and the auxiliary yarn heddle frame 334 are moved in the up-down direction so that the first reinforced fiber bundle 31 and the first auxiliary yarn 32 create the warp yarn sheds 30a. Every time the warp yarn shed 30a is created, the second auxiliary yarn 42 is inserted into the warp yarn shed 30a. After the creation of the warp yarn sheds 30a and the insertion of the second auxiliary yarns 42 into the warp yarn sheds 30a are performed a predetermined number of times, the beat-up motion of the reed 39 is performed.

The predetermined number of times of weft insertion in the case of weaving the finishing end 269c is the same as the predetermined number of times of weft insertion in the case of weaving the starting end 269a. Thus, the total number N in the general portion 19b is larger than the total number N in the finishing end 269c in the circumferential direction Z of the liner 12. That is, the general portion 19b is larger than the finishing end 269c in the amount of reinforced fibers that exist per unit length in the circumferential direction Z of the liner 12. In the reinforced fiber sheet 269, the thickness W50 of the finishing end 269c is smaller than the thickness W2 of the general portion 19b.

The sixth embodiment provides the same advantages as the first embodiment. Further, the sixth embodiment provides the following advantage in addition to the same advantages as advantages (1-1), (1-3), and (1-4) of the first embodiment.

(6-1) The second reinforced fiber bundles 41 are not arranged in the starting end 269a and the finishing end 269c. Thus, the starting end 269a and the finishing end 269c are smaller than the general portion 19b in the amount of reinforced fibers and the number of auxiliary yarns per unit length in the circumferential direction Z of the liner 12. Such decrease in the amount of reinforced fibers allows the thickness of the starting end 269a and the finishing end 269c to be smaller than that of the general portion 19b.

Seventh Embodiment

The seventh embodiment of the FRP tubular body and the method for manufacturing the FRP tubular body applied to the pressure vessel and the method for manufacturing the pressure vessel will now be described with reference to FIGS. 32 to 36. The components that are the same as those of the first embodiment, including the high-pressure tank 10, the liner 12, and the general portion 19b, will not be described.

Figure 32:
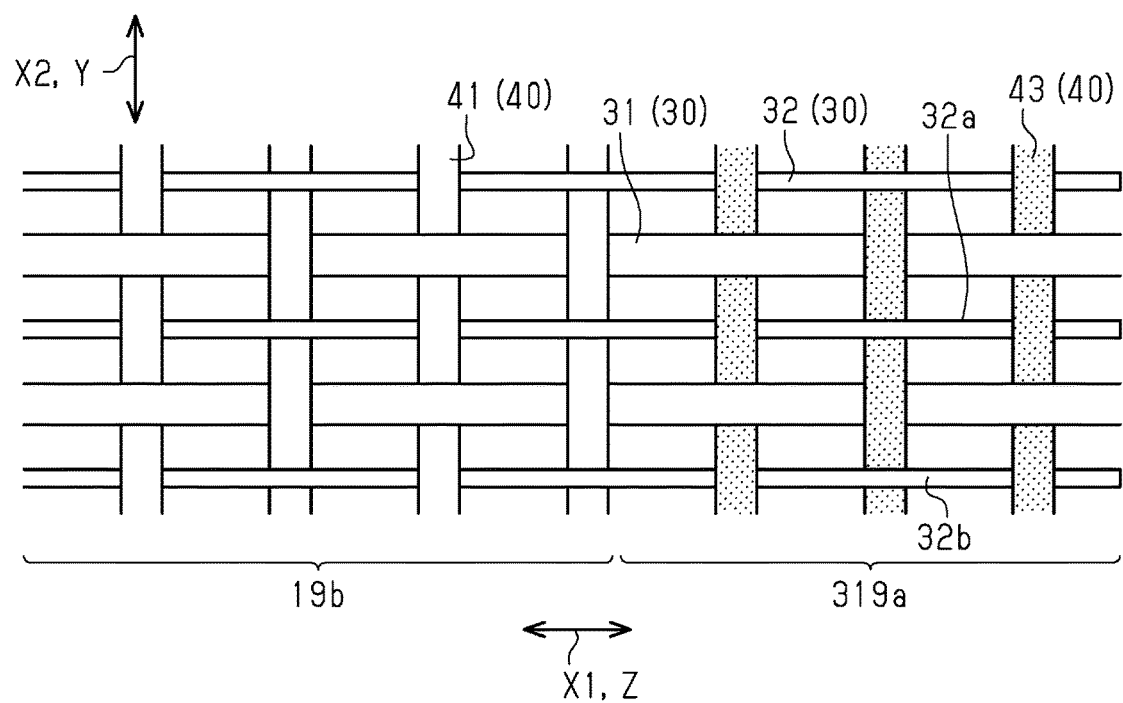
FIG. 32 is a diagram schematically showing the general portion and the starting end of the reinforced fiber sheet according to the seventh embodiment.
Figure 36:
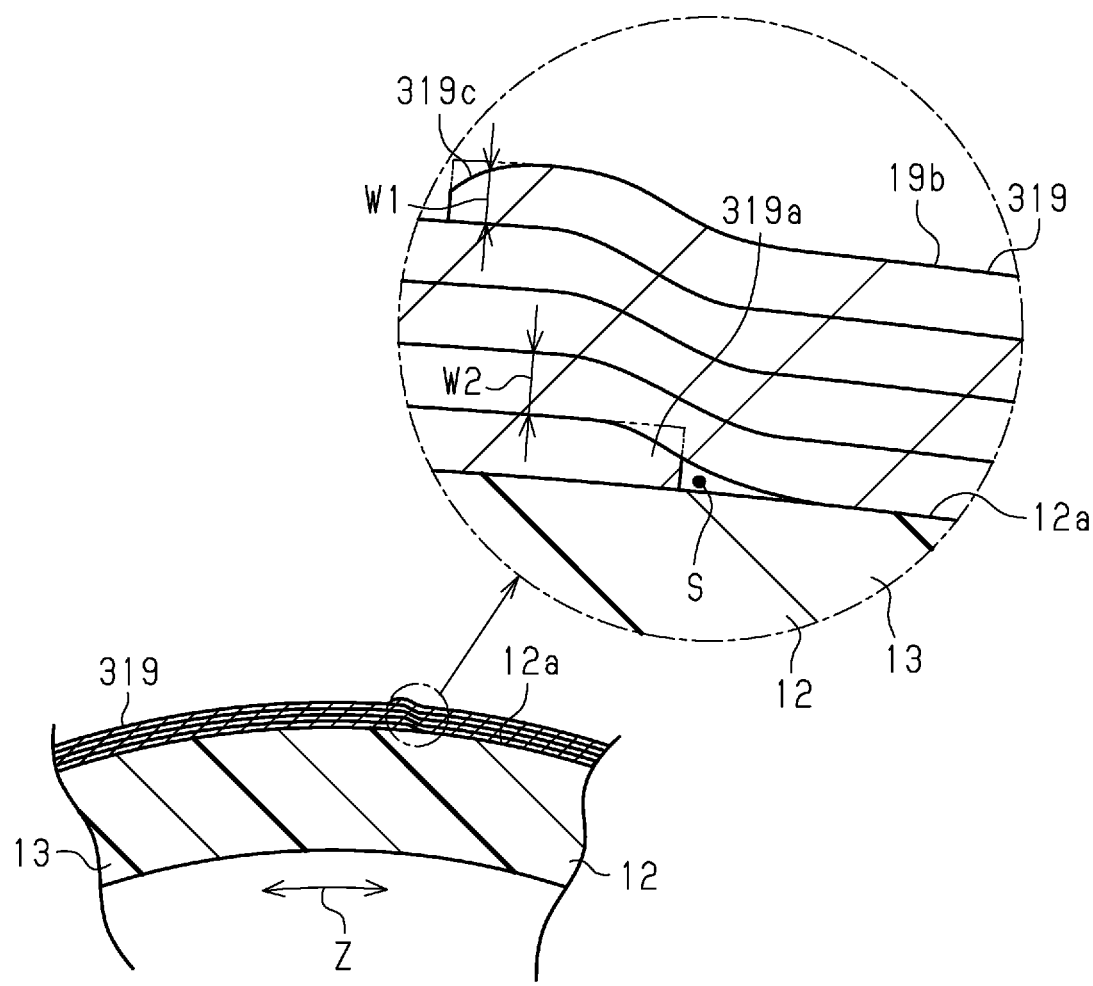
FIG. 36 is an enlarged partial cross-sectional view showing the winding start part and the winding finish part of the reinforced fiber sheet onto the liner according to the seventh embodiment.

As shown in FIG. 32 or 36, the seventh embodiment includes a reinforced fiber sheet 319 with a starting end 319a and a finishing end 319c, which include the first reinforced fiber bundles 31 and the first auxiliary yarns 32 as the warp yarns 30 and include second reinforced fiber bundles 43 as the weft yarns 40 as shown by the dotted hatching in FIG. 32.

The second reinforced fiber bundles 43 prior to being used to weave the starting end 319a and the finishing end 319c will now be described.

Figure 33:
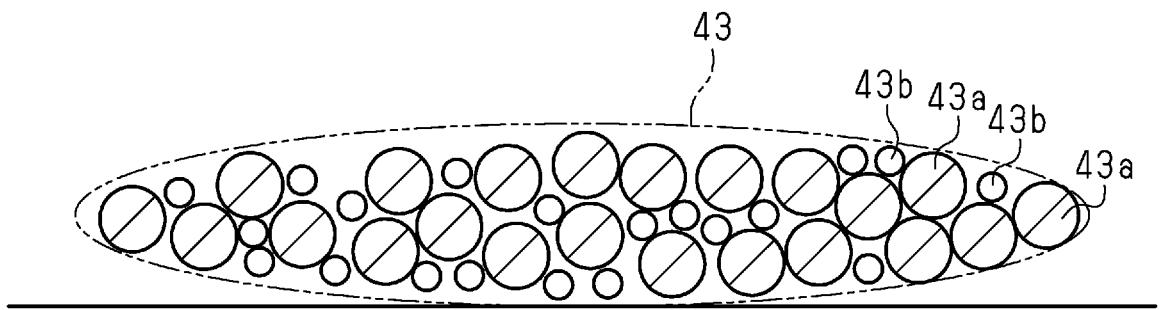
FIG. 33 is a diagram schematically showing the second reinforced fiber bundle prior to being heated.

Referring to FIG. 33, the second reinforced fiber bundle 43 prior to being used for weaving is a flat blended yarn spun by blending carbon fibers 43a, which serve as reinforced fibers, and thermoplastic fibers 43b. The reinforced fibers are not limited to carbon fibers and may be glass fibers, silicon carbide ceramic fibers, or aramid fibers. As long as the thermoplastic fibers 43b are resin fibers that melt at lower temperatures than carbon fibers, the thermoplastic fibers 43b may be any type of fibers. For example, while it is preferred that the thermoplastic fibers 43b be made of material that melts together with the matrix resin Ma through heating when the reinforced fiber sheet 319 is impregnated with the matrix resin Ma and the matrix resin Ma is cured, the thermoplastic fibers 43b may be made of resin fibers that do not melt. The thermoplastic fibers 43b are finer than the carbon fibers 43a.

Figure 34:
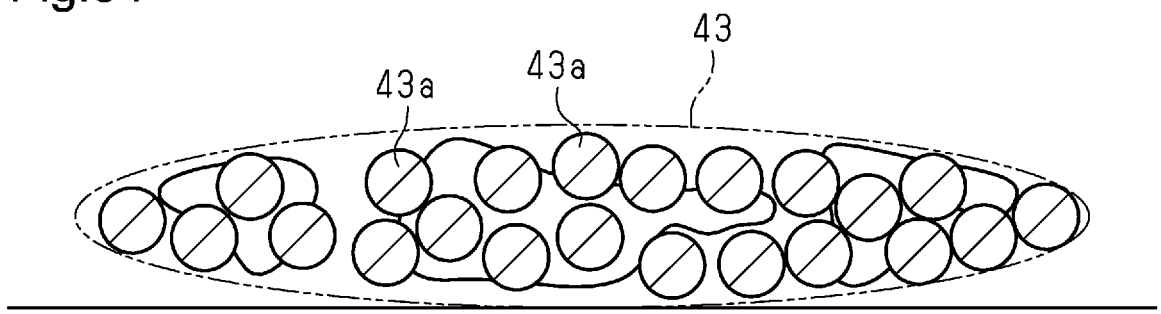
FIG. 34 is a diagram schematically showing the second reinforced fiber bundle subsequent to being heated.
Figure 35:
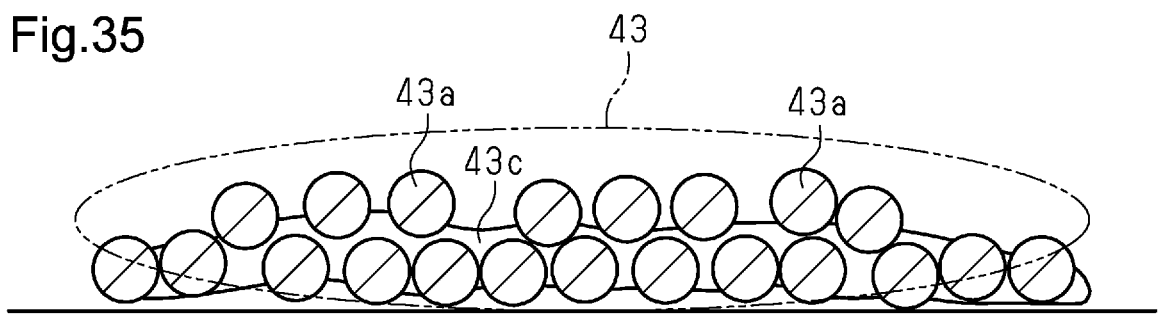
FIG. 35 is a diagram schematically showing the second reinforced fiber bundle subsequent to being pressurized.

Referring to FIG. 34, when the second reinforced fiber bundle 43 is heated to the melting point of the thermoplastic fibers 43b, the thermoplastic fibers 43b are melted without melting the carbon fibers 43a. Pressurizing the second reinforced fiber bundle 43 with the thermoplastic fibers 43b in a molten state causes the molten thermoplastic fibers 43b to be joined as a lump of plastics and enter between adjacent ones of the carbon fiber 43a as shown in FIG. 35. This causes the thickness of the second reinforced fiber bundle 43 to be smaller than prior to being heated and causes the second reinforced fiber bundle 43 subsequent to being heated and pressurized to include the carbon fibers 43a and cured resin 43c. During pressurization of the starting end 319a and the finishing end 319c, the pressurizing force is changed depending on a composition ratio of the carbon fibers 43a and the thermoplastic fibers 43b. As the number of the thermoplastic fibers 43b decreases (i.e., as the number of the carbon fibers 43a increases), the pressurizing force is increased. This is because the carbon fibers 43a resist deforming when pressurized and thus a large pressurizing force is needed to reduce the thicknesses of the starting end 319a and the finishing end 319c including the thermoplastic fibers 43b.

The starting end 319a and the finishing end 319c include the first reinforced fiber bundles 31, the first auxiliary yarns 32, and the second reinforced fiber bundles 43. Among them, the second reinforced fiber bundles 43 are heated and pressurized to decrease in thickness so that the thicknesses of the starting end 319a and the finishing end 319c including the second reinforced fiber bundles 43 are smaller than the thickness of the general portion 19b.

In the present embodiment, the starting end 319a is shaped by being pressurized so as to gradually increase in thickness from the extremity of the starting end 319a toward the general portion 19b in the circumferential direction Z. The finishing end 319c is shaped by being pressurized so as to gradually increase in thickness from the extremity of the finishing end 319c toward the general portion 19b in the circumferential direction Z. The thicknesses of the starting end 319a and the finishing end 319c may be fixed in the circumferential direction Z as long as they are smaller than the thickness of the general portion 19b.

In the starting end 319a and the finishing end 319c, the second auxiliary yarns 42 are not arranged. The second reinforced fiber bundle 43 includes the carbon fibers 43a, which serve as reinforced fibers, and the cured resin 43c, which are formed from the thermoplastic fibers 43b that have been melted and cured. Thus, the starting end 319a and the finishing end 319c are smaller than the general portion 19b in the amount of reinforced fibers that exist per unit length in the circumferential direction Z of the liner 12. In the present embodiment, the starting end 319a and the finishing end 319c are both the decreased portions, which have a smaller amount of reinforced fibers than the general portion 19b.

As shown in FIG. 36, in the reinforced fiber sheet 319, the thickness W1 of the starting end 319a and the finishing end 319c is smaller than the thickness W2 of the general portion 19b. Accordingly, the thickness of the reinforced fiber sheet 319 increases from the starting end 319a toward the general portion 19b and decreases from the general portion 19b toward the finishing end 319c in the circumferential direction Z of the liner 12. The thickness of the reinforced fiber sheet 319 gradually changes in the circumferential direction Z of the liner 12 between the thickness W1 of the starting end 319a and the finishing end 319c and the thickness W2 of the general portion 19b.

The method for manufacturing the high-pressure tank 10 according to the seventh embodiment will now be described.

To manufacture the high-pressure tank 10 in the seventh embodiment, the plain weave loom shown in FIGS. 9 and 10 is used to plainly weave the warp yarns 30 and the weft yarns 40 and wind the woven fabric 50 onto the liner 12 in the same manner as the first embodiment. Unlike the first embodiment, the first reinforced fiber bundles 31 contribute to the weaving of the starting end 319a in the seventh embodiment. That is, this weaves the starting end 319a of the reinforced fiber sheet 319 in which the first reinforced fiber bundles 31, the first auxiliary yarns 32a, 32b, and the second reinforced fiber bundles 43 are plainly woven and causes the starting end 319a to be integrated with the liner 12. Such weaving of the starting end 319a is continued until the starting end 319a enters a state of extending in the predetermined range in the circumferential direction Z of the liner 12.

After the starting end 319a enters the state of extending in the predetermined range in the circumferential direction Z of the liner 12, the weaving of the starting end 319a shifts to the weaving of the general portion 19b of the reinforced fiber sheet 319. Before the shifting, the starting end 319a is heated to the melting point of the thermoplastic fiber 43b. For example, a press-heating device is used to pressurize the starting end 319a while heating the outer circumferential surface of the liner 12.

After the thermoplastic fibers 43b are melted through heating, the starting end 319a is pressurized with the thermoplastic fibers 43b in a molten state. This causes the molten thermoplastic fibers 43b to be joined as a lump of plastics and enter between adjacent ones of the carbon fiber 43a as shown in FIG. 35. As a result, the lump of plastics move to the lower part of the second reinforced fiber bundles 43, and gaps are created between the carbon fibers 43a at the upper part of the second reinforced fiber bundles 43. Thus, the pressurization causes the gaps between the carbon fibers 43a to be downwardly pressed and reduces the thickness of the second reinforced fiber bundle 43. Consequently, the thickness of each second reinforced fiber bundle 43 of the starting end 319a is smaller than prior to being heated and pressurized. Further, the starting end 319a subsequent to being heated and pressurized is smaller than the starting end 319a prior to being heated and pressurized.

In the weaving of the general portion 19b, the woven fabric 50 is wound onto the liner 12 to cause the starting end 319a and the general portion 19b to be wound adjacently on the outer circumferential surface 12a of the liner 12. The weaving of the general portion 19b is continued until the number of laminated layers becomes the necessary one for the fabric 50 wound onto the outer circumferential surface 12*a* of the liner 12.

When the number of laminated layers becomes the necessary one for the fabric 50 wound onto the outer circumferential surface 12*a* of the liner 12, the weaving of the general portion 19*b* shifts to the weaving of the finishing end 319*c* of the reinforced fiber sheet 319.

In the same manner as the first embodiment, this weaves the finishing end 319*c* of the reinforced fiber sheet 319 in which the first reinforced fiber bundles 31, the first auxiliary yarns 32*a*, 32*b*, and the second reinforced fiber bundles 43 are plainly woven and causes the finishing end 319*c* to be integrated with the liner 12. Unlike the first embodiment, after the weaving of the finishing end 319*c*, the first reinforced fiber bundles 31 are not cut. Such weaving of the finishing end 319*c* is continued until the finishing end 319*c* enters the state of extending in the predetermined range in the circumferential direction Z of the liner 12.

The press-heating device is used to pressurize the finishing end 319*c* while heating the finishing end 319*c* to the melting point of the thermoplastic fiber 43*b*, After the thermoplastic fibers 43*b* are melted, the finishing end 319*c* is pressurized with the thermoplastic fibers 43*b* in a molten state. This causes the molten thermoplastic fibers 43*b* to be joined as a lump of plastics and enter between adjacent ones of the carbon fiber 43*a* as shown in FIG. 35. As a result, in the same manner as the starting end 319*a*, the thickness of each second reinforced fiber bundle 43 of the finishing end 319*c* is smaller than prior to being heated and pressurized. Further, the finishing end 319*c* subsequent to being heated and pressurized is smaller than the finishing end 319*c* prior to being heated and pressurized.

The seventh embodiment provides the same advantages as the first embodiment. Further, the seventh embodiment provides the following advantage in addition to the same advantages as advantages (1-1), (1-3), and (1-4) of the first embodiment.

(7-1) The second auxiliary yarns 42 are not arranged in the starting end 319*a* and the finishing end 319*c*. Further, the thermoplastic fibers 43*b* of the second reinforced fiber bundles 43 are melted. Thus, the starting end 319*a* and the finishing end 319*c* are smaller than the general portion 19*b* in the amount of reinforced fibers per unit length in the circumferential direction Z of the liner 12. Such decrease in the amount of reinforced fibers allows the thickness of the starting end 319*a* and the finishing end 319*c* to be smaller than that of the general portion 19*b*.

(7-2) With blended yarns used as the second reinforced fiber bundles 43, the starting end 319*a* and the finishing end 319*c* are heated and pressurized in a state where the thermoplastic fibers 43*b* are molten during the weaving of the starting end 319*a* and the finishing end 319*c*. This causes the thicknesses of the starting end 319*a* and the finishing end 319*c* to be smaller than the thickness of the general portion 19*b*. While the thermoplastic fibers 43*b* are melted, the carbon fibers 43*a* are not melted. Thus, the amount of reinforced fibers in the starting end 319*a* and the finishing end 319*c* is smaller than the amount of reinforced fibers in the general portion 19*b*. Accordingly, the thicknesses of the starting end 319*a* and the finishing end 319*c* including the second reinforced fiber bundles 43 are easily reduced.

The above-illustrated embodiment may be modified as follows. The above-described embodiments and the following modifications can be combined as long as the combined modifications remain technically consistent with each other.

In the fifth embodiment, the thickness of the starting end 219*a* in the circumferential direction Z of the liner 12 may change in two or more stages. In this case, as the weaving of the starting end 219*a* progresses, the number of the first reinforced fiber bundles 31 used as the warp yarns 30 is gradually increased. Further, in the fifth embodiment, the thickness of the finishing end 219*c* in the circumferential direction Z of the liner 12 may change in two or more stages. In this case, as the weaving of the finishing end 219*c* progresses, the number of the first reinforced fiber bundles 31 used as the warp yarns 30 is gradually decreased.

In the method for manufacturing the high-pressure tank 10 in the seventh embodiment, the fabric 50 is wound onto the outer circumferential surface 12*a* of the liner 12 and after the starting end 319*a* and the finishing end 319*c* are woven, the starting end 319*a* and the finishing end 319*c* are heated and pressurized to reduce their thicknesses. Instead, before the reinforced fiber sheet 319 is wound onto the liner 12, the starting end 319*a* and the finishing end 319*c* of the reinforced fiber sheet 319 may be heated and pressurized to reduce their thicknesses. Then, the reinforced fiber sheet 319 with the starting end 319*a* and the finishing end 319*c* reduced in thickness may be wound onto the liner 12 to manufacture the high-pressure tank 10.

The seventh embodiment may employ the first reinforced fiber bundle 31 and the first auxiliary yarn 32 as the warp yarns 30, employ the second reinforced fiber bundles 41 and the second auxiliary yarns 42 as the weft yarns 40, and use blended yarns for at least one of the first reinforced fiber bundles 31, the first auxiliary yarns 32, the second reinforced fiber bundles 41, and the second auxiliary yarns 42.

In the reinforced fiber sheet 19, 69, 119, 169, 219, 269, 319, only one of the starting end 19*a*, 69*a*, 119*a*, 169*a*, 219*a*, 269*a*, 319*a* and the finishing end 19*c*, 69*c*, 119*c*, 169*c*, 219*c*, 269*c*, 319*c* may be set as the decreased portion so that the thickness of the decreased portion is smaller than the thickness of the general portion 19*b*.

The reinforced fiber sheet 19, 69, 119, 169, 219, 269, 319 may be a multilayer fabric in which fiber layers including the first reinforced fiber bundles 31 and the first auxiliary yarns 32 and fiber layers including the second reinforced fiber bundles 41 and the second auxiliary yarns 42 are laminated and these fiber layers are bound in the laminating direction.

The fabric 50 may be woven using fiber bases that have been impregnated with resin in advance.

The liner 12 may be shaped such that the dorm portion 14 is continuous with one end of the body 13 in the axial direction and a flat end wall is continuous with the other end of the body 13 in the axial direction. In this case, the spinneret 15 is arranged at only the end where the dorm portion 14 exists in the axial direction.

The liner 12 does not have to include the dorm portions 14. For example, the liner 12 may be shaped such that flat end walls are continuous at the opposite ends of the body 13 in the axial direction. In this case, at least one end of the opposite ends of the body 13 in the axial direction is provided with the spinneret 15.

The entire liner 12 may be made of aluminum or made of aluminum alloy. The spinneret 15 may be made of metal other than stainless steel.

The high-pressure tank 10 does not need to be mounted and used as a hydrogen source for a fuel cell electric automobile. Instead, for example, the high-pressure tank 10 may be applied to a hydrogen source for a hydrogen engine or may be applied to a heat pump or the like. Alternatively, the high-pressure tank 10 may be used as a hydrogen source for a fuel cell of utility power.

The pressure vessel is not limited to a high-pressure tank that stores hydrogen. Instead, for example, a pressure vessel that stores gas other than hydrogen such as nitrogen or compressed natural gas may be used.

The FRP tubular body does not have to be applied to a pressure vessel and may be applied to a tubular body used for other purposes, such as sporting goods and automobile goods. The tubular body in this form is manufactured by, for example, winding a reinforced fiber sheet made of fabric on a pipe serving as a wound member.

DESCRIPTION OF THE REFERENCE NUMERALS

10) High-Pressure Tank; 12) Liner; 12a) Outer Circumferential Surface; 13) Body; 19, 69, 119, 169, 219, 269, 319) Reinforced Fiber Sheet; 19a, 69a, 119a, 169a, 219a, 269a, 319a) Starting End; 19b) General Portion; 19c, 69c, 119c, 169c, 219c, 269c, 319c) Finishing End; 21) Fiber Structure; 30) Warp Yarn; 31) First Reinforced Fiber Bundle; 32) First Auxiliary Yarn; 40) Weft Yarn; 41) Second Reinforced Fiber Bundle; 42) Second Auxiliary Yarn; 50) Fabric

The invention claimed is:

1. A FRP tubular body, comprising:
a tubular fiber structure formed by winding a reinforced fiber sheet made of fabric, the fiber structure being combined with matrix resin, wherein
the reinforced fiber sheet includes first reinforced fiber bundles arranged such that a yarn main axis direction of the first reinforced fiber bundles extends in a circumferential direction of the fiber structure and second reinforced fiber bundles arranged such that a yarn main axis direction of the second reinforced fiber bundles extends in an axial direction of the fiber structure, the first reinforced fiber bundles and the second reinforced fiber bundles being bundles of reinforced fibers,
the reinforced fiber sheet includes a starting end where winding is started in the circumferential direction of the fiber structure, the starting end extending in the axial direction of the fiber structure, a finishing end where winding is finished in the circumferential direction of the fiber structure, the finishing end extending in the axial direction of the fiber structure, and a general portion located between the starting end and the finishing end and connected to the starting end and the finishing end by the reinforced fibers,
the general portion includes the first reinforced fiber bundles and the second reinforced fiber bundles, and
at least one of the starting end or the finishing end is a decreased portion that is smaller than the general portion in an amount of the reinforced fibers per unit length in the circumferential direction of the fiber structure.

2. The FRP tubular body according to claim 1, wherein the reinforced fiber sheet further includes first auxiliary yarns arranged so as to be adjacent to the first reinforced fiber bundles in the axial direction of the fiber structure and second auxiliary yarns arranged so as to be adjacent to the second reinforced fiber bundles in the circumferential direction of the fiber structure,
the general portion further includes the first auxiliary yarns and the second auxiliary yarns in addition to the first reinforced fiber bundles and the second reinforced fiber bundles, and
at least one of the starting end or the finishing end is smaller than the general portion in a total number of the first reinforced fiber bundles, the first auxiliary yarns, the second reinforced fiber bundles, and the second auxiliary yarns per unit length in the circumferential direction of the fiber structure.

3. The FRP tubular body according to claim 2, wherein the decreased portion includes the second reinforced fiber bundles and the first auxiliary yarns.

4. The FRP tubular body according to claim 3, wherein an arrangement pitch size of adjacent ones of the second reinforced fiber bundles in the decreased portion is greater than or equal to an arrangement pitch size of the second reinforced fiber bundle and the second auxiliary yarn adjacent to each other in the general portion, and
the arrangement pitch size of the adjacent ones of the second reinforced fiber bundles in the decreased portion decreases as the general portion becomes closer in the circumferential direction of the fiber structure.

5. The FRP tubular body according to claim 2, wherein the decreased portion includes the second reinforced fiber bundles, the first auxiliary yarns, and the second auxiliary yarns.

6. The FRP tubular body according to claim 2, wherein the decreased portion includes the first reinforced fiber bundles and the second auxiliary yarns.

7. The FRP tubular body according to claim 6, wherein the decreased portion includes a first decreased portion and a second decreased portion, the first decreased portion being located closer to an extremity of the decreased portion in the circumferential direction of the fiber structure, the second decreased portion being located closer to the general portion in the circumferential direction of the fiber structure, and
the second decreased portion is larger than the first decreased portion in the number of the first reinforced fiber bundles per unit length in the circumferential direction of the fiber structure.

8. The FRP tubular body according to claim 2, wherein the decreased portion includes the first reinforced fiber bundles, the first auxiliary yarns, and the second auxiliary yarns.

9. The FRP tubular body according to claim 1, wherein the decreased portion is shaped using blended yarns of reinforced fibers and thermoplastic fibers for at least one of the first reinforced fiber bundles or the second reinforced fiber bundles, and
the decreased portion includes cured resin formed from the thermoplastic fibers that have been melted and cured.

10. The FRP tubular body according to claim 1, wherein in the fiber structure, the reinforced fiber sheet is wound onto an outer circumferential surface of a liner, having a cylindrical body, in a circumferential direction of the liner and an outer side of the liner is covered by the reinforced fiber sheet, and
the FRP tubular body is a pressure vessel.

11. A method for manufacturing a FRP tubular body, wherein
the FRP tubular body includes a fiber structure having a tubular wound member and a reinforced fiber sheet that covers an outer side of the wound member, the reinforced fiber sheet being made of fabric,
the fiber structure includes first reinforced fiber bundles and second reinforced fiber bundles, the first reinforced fiber bundles being bundles of reinforced fibers arranged on the wound member such that a yarn main axis direction of the first reinforced fiber bundles extends in a circumferential direction of the wound member, the second reinforced fiber bundles being bundles of reinforced fibers and forming the fabric together with the first reinforced fiber bundles, the method comprising:
- stretching the first reinforced fiber bundles in a state of being arranged in an axial direction of the wound member;
- inserting the second reinforced fiber bundles in the axial direction of the wound member into sheds created between adjacent ones of the first reinforced fiber bundles in the axial direction of the wound member;
- pushing the second reinforced fiber bundles toward the wound member through a beat-up motion to weave the fabric of the first reinforced fiber bundles and the second reinforced fiber bundles; and
- rotating the wound member about a central axis of the wound member to wind the woven fabric onto the wound member, wherein the reinforced fiber sheet includes a starting end where winding onto the wound member is started in the circumferential direction of the wound member, the starting end extending in the axial direction of the wound member, a finishing end where winding onto the wound member is finished in the circumferential direction of the wound member, the finishing end extending in the axial direction of the wound member, and a general portion located between the starting end and the finishing end and connected to the starting end and the finishing end by the reinforced fibers, the method further comprising:
- weaving the general portion using, as warp yarns, the first reinforced fiber bundles arranged on the wound member such that the yarn main axis direction of the first reinforced fiber bundles extends in the circumferential direction of the wound member and using, as weft yarns, the second reinforced fiber bundles arranged on the wound member such that a yarn main axis direction of the second reinforced fiber bundles extends in the axial direction of the wound member; and
- weaving at least one of the starting end or the finishing end as a decreased portion that is smaller than the general portion in an amount of the reinforced fibers per unit length in the circumferential direction of the wound member.

12. The method according to claim 11, further comprising impregnating, with matrix resin, the fabric wound onto the wound member to combine the fiber structure and the matrix resin.

13. The method according to claim 11, wherein
the wound member is a liner including a tubular body, and
the FRP tubular body is a pressure vessel.

14. A method for manufacturing a FRP tubular body, wherein
the FRP tubular body includes a fiber structure having a tubular wound member and a reinforced fiber sheet that covers an outer side of the wound member, the reinforced fiber sheet being made of fabric,
the fiber structure includes first reinforced fiber bundles and second reinforced fiber bundles, the first reinforced fiber bundles being bundles of reinforced fibers arranged on the wound member such that a yarn main axis direction of the first reinforced fiber bundles extends in a circumferential direction of the wound member, the second reinforced fiber bundles being bundles of reinforced fibers and forming the fabric together with the first reinforced fiber bundles, and
the reinforced fiber sheet made of the woven fabric includes a starting end where winding onto the wound member is started in the circumferential direction of the wound member, the starting end extending in the axial direction of the wound member, a finishing end where winding onto the wound member is finished in the circumferential direction of the wound member, the finishing end extending in the axial direction of the wound member, and a general portion located between the starting end and the finishing end and connected to the starting end and the finishing end by the reinforced fibers, the method comprising:
- using blended yarns of reinforced fibers and thermoplastic fibers for at least one of the first reinforced fiber bundles or the second reinforced fiber bundles;
- heating at least one of the starting end or the finishing end to melt the thermoplastic fibers so that the at least one of the starting end or the finishing end becomes a decreased portion that is smaller than the general portion in an amount of the reinforced fibers per unit length in the circumferential direction of the fiber structure; and
- pressurizing the at least one of the starting end or the finishing end to become smaller in thickness than the general portion.

15. The method according to claim 14, further comprising impregnating, with matrix resin, the fabric wound onto the wound member to combine the fiber structure and the matrix resin.

16. The method according to claim 14, wherein
the wound member is a liner including a cylindrical body, and
the FRP tubular body is a pressure vessel.

* * * * *